(12) United States Patent
Kubo et al.

(10) Patent No.: US 8,370,768 B2
(45) Date of Patent: Feb. 5, 2013

(54) IMAGE FORMING APPARATUS, CONTROL METHOD AND COMPUTER-READABLE RECORDING MEDIUM STORING CONTROL PROGRAM FOR CONTROLLING DISPLAYED MENU ITEMS

(75) Inventors: Naohiko Kubo, Kanagawa (JP); Naruhiko Ogasawara, Chiba (JP); Nobuyuki Iwata, Kanagawa (JP); Hiroya Uruta, Tokyo (JP); Takahiro Hirakawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 979 days.

(21) Appl. No.: 11/907,104

(22) Filed: Oct. 9, 2007

(65) Prior Publication Data

US 2008/0141167 A1 Jun. 12, 2008

(30) Foreign Application Priority Data

Oct. 11, 2006 (JP) ................................ 2006-278083

(51) Int. Cl.
*G06F 3/048* (2006.01)
(52) U.S. Cl. ...................................... 715/811
(58) Field of Classification Search .................... 715/811
See application file for complete search history.

(56) References Cited

U.S. PATENT DOCUMENTS

| | | | | |
|---|---|---|---|---|
| 5,396,264 A * | 3/1995 | Falcone et al. | ................. | 715/811 |
| 5,673,405 A * | 9/1997 | Tange | ............................ | 715/745 |
| 6,583,797 B1 * | 6/2003 | Roth | ............................. | 715/810 |
| 6,847,387 B2 * | 1/2005 | Roth | ............................. | 715/811 |
| 7,600,196 B2 * | 10/2009 | Oh | ................................. | 715/816 |
| 2001/0019338 A1 * | 9/2001 | Roth | ............................. | 345/811 |
| 2002/0007487 A1 * | 1/2002 | Matsumoto et al. | ............ | 725/37 |
| 2002/0054146 A1 | 5/2002 | Fukumoto et al. | | |
| 2005/0076308 A1 * | 4/2005 | Mansell et al. | ................ | 715/811 |
| 2005/0165497 A1 * | 7/2005 | Tanabe | ............................ | 700/23 |
| 2006/0212829 A1 | 9/2006 | Yahiro et al. | | |
| 2007/0261001 A1 * | 11/2007 | Nagiyama et al. | ............ | 715/810 |
| 2008/0034322 A1 * | 2/2008 | Kujirai et al. | ................. | 715/808 |

FOREIGN PATENT DOCUMENTS

| | | |
|---|---|---|
| CN | 1585463 | 2/2005 |
| JP | H09-305360 | 11/1997 |
| JP | 2001-045201 | 2/2001 |
| JP | 2002-183172 | 6/2002 |
| JP | 2003-029893 | 1/2003 |
| JP | 2005-267307 | 9/2005 |
| JP | 2006-260266 | 9/2006 |

OTHER PUBLICATIONS

Office Action dated Jun. 26, 2009 for corresponding Chinese Application No. 200101819157 and English translation thereof.
Japanese Office Action dated Apr. 19, 2011 for JP 2006-278083.

* cited by examiner

*Primary Examiner* — William Bashore
*Assistant Examiner* — Henry Orr
(74) *Attorney, Agent, or Firm* — Harness, Dickey & Pierce

(57) ABSTRACT

An image forming apparatus is disclosed. The image forming apparatus includes a displaying unit which displays a predetermined number of menu items in plural menu items on a screen, an inputting unit which selects a menu item from the menu items displayed on the screen by the displaying unit, and a storing unit which registers the menu item selected by the input unit in a user custom menu table for each user having registration regions where a predetermined number of menu items are stored.

18 Claims, 67 Drawing Sheets

FIG.5

MENU ITEM INFORMATION

| MENU ID | MENU ITEM | CONTENTS OF MENU ITEM |
|---|---|---|
| 1 | SYSTEM SETTING | DISPLAY MENU ITEMS IN LOWER LAYER IN SYSTEM SETTING |
| 2 | PAPER SETTING | DISPLAY MENU ITEMS IN LOWER LAYER IN PAPER SETTING |
| 9 | MIS-FEED RECOVERY | MAKE USER SELECT MIS-FEED RECOVERY/NON-RECOVERY AND OVERWRITE SELECTED RESULT AS SETTING VALUE |
| ... | ... | ... |
| N | REMAINING TONER AMOUNT DISPLAY | DISPLAY REMAINING AMOUNT OF TONER |

FIG.6

| MENU ITEM TYPE | EXPLANATION | EXAMPLE OF MENU ITEM |
|---|---|---|
| SETTING TYPE | WHEN SETTING TYPE IS SELECTED, VALUE IS SET OR CHANGED, OR ON/OFF IS SET, VIA APPARATUS MANAGING SECTION | MIS-FEED RECOVERY ERROR REPORT PRINT |
| INFORMATION DISPLAYING TYPE | WHEN INFORMATION DISPLAYING TYPE IS SELECTED, INFORMATION IS DISPLAYED VIA APPARATUS CONDITION MONITORING SECTION | REMAINING TONER AMOUNT DISPLAY REMAINING PAPER AMOUNT DISPLAY |
| BRANCH TYPE | WHEN BRANCH TYPE IS SELECTED, MENU ITEMS IN LOWER LAYER OF MENU TREE ARE DISPLAYED | SYSTEM SETTING ADJUSTMENT/MANAGEMENT |

FIG.22

USER CUSTOM MENU TABLE

| REGISTRATION REGION (PRIORITY ORDER) | MENU ID (MENU ITEM) | THE NUMBER OF USED TIMES |
|---|---|---|
| 1 | 9 (SYSTEM SETTING LIST PRINT) | 22 |
| 2 | 87 (ADDRESS BOOK REGISTRATION) | 4 |
| 3 | 7 (PAPER SETTING) | |
| ... | ... | ... |
| N | UNREGISTERED | 0 |

FIG.25

NORMAL TOP SCREEN

| JOB RESET | DOCUMENT PRINT | REMAINING AMOUNT |

YOU CAN PRINT

TOP SCREEN OF PRESENT EMBODIMENT

YOU CAN PRINT

TONER: C  M  Y  K

| JOB RESET | DOCUMENT PRINT | REMAINING AMOUNT |

USER CUSTOM MENU TABLE

| REGISTRATION REGION (PRIORITY ORDER) | MENU ID (MENU ITEM) |
|---|---|
| 1 | 9 (ERROR REPORT PRINT) |
| 2 | UNREGISTERED |
| 3 | 63 (REMAINING TONER AMOUNT) |

FIG.26

USER CUSTOM MENU TABLE

| REGISTRATION REGION (PRIORITY ORDER) | MENU ID (MENU ITEM) |
|---|---|
| 1 | 9 (ERROR REPORT PRINT) |
| 2 | 63 (REMAINING TONER AMOUNT) |
| 3 | 62 (REMAINING PAPER AMOUNT) |
| 4 | 65 (REMAINING PHOTOCONDUCTOR BODY SERVICE LIFE) |

NORMAL TOP SCREEN

YOU CAN PRINT

| JOB RESET | DOCUMENT PRINT | REMAINING AMOUNT |

TOP SCREEN OF PRESENT EMBODIMENT

YOU CAN PRINT

TONER: C M Y K

| JOB RESET | DOCUMENT PRINT | REMAINING AMOUNT |

⇕ PUSH UP-AND-DOWN KEY

YOU CAN PRINT

PHOTOCONDUCTOR BODY: C M Y K

| JOB RESET | DOCUMENT PRINT | REMAINING AMOUNT |

⇕ PUSH UP-AND-DOWN KEY

YOU CAN PRINT

TRAY: 1 2 3 4

| JOB RESET | DOCUMENT PRINT | REMAINING AMOUNT |

PUSH UP-AND-DOWN KEY

FIG.27

USER CUSTOM MENU TABLE

| REGISTRATION REGION (PRIORITY ORDER) | MENU ID (MENU ITEM) |
|---|---|
| 1 | 9 (ERROR REPORT PRINT) |
| 2 | 63 (REMAINING TONER AMOUNT) |
| 3 | 62 (REMAINING PAPER AMOUNT) |
| 4 | 65 (REMAINING PHOTOCONDUCTOR BODY SERVICE LIFE) |

NORMAL TOP SCREEN

YOU CAN PRINT

| JOB RESET | DOCUMENT PRINT | REMAINING AMOUNT |

TOP SCREEN OF PRESENT EMBODIMENT

YOU CAN PRINT

TONER : C M Y K

| JOB RESET | DOCUMENT PRINT | REMAINING AMOUNT |

X SECONDS HAVE PASSED ↑

YOU CAN PRINT

PHOTOCONDUCTOR BODY: C M Y K

| JOB RESET | DOCUMENT PRINT | REMAINING AMOUNT |

X SECONDS HAVE PASSED →

YOU CAN PRINT

TRAY : 1  2  3  4

| JOB RESET | DOCUMENT PRINT | REMAINING AMOUNT |

X SECONDS HAVE PASSED

FIG.28
(a)
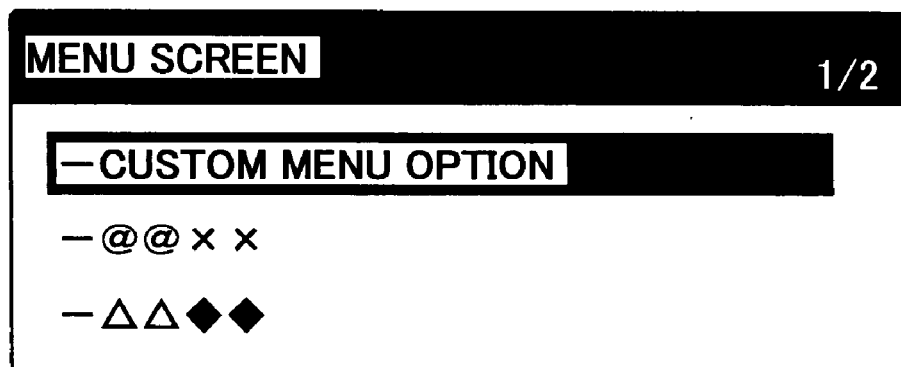
PUSH OK KEY
(b)
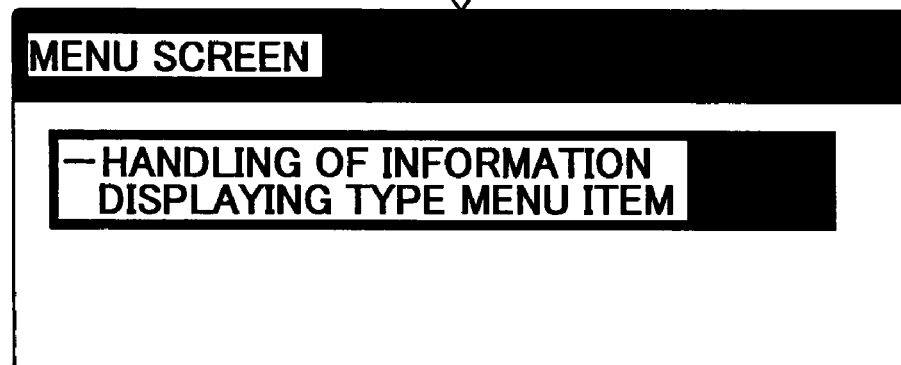
PUSH OK KEY
(c)
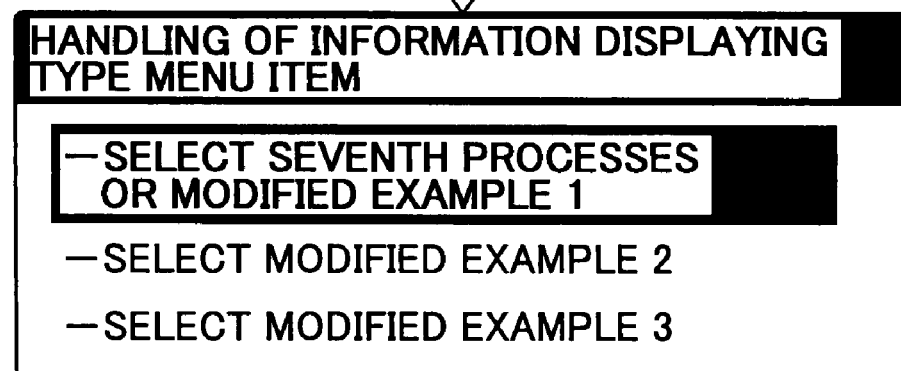

FIG.38

■ CLICK REGISTRATION REGION WHERE MENU ITEM IS REGISTERED

| CUSTOM MENU GROUP 1 | | CUSTOM MENU GROUP 2 | | CUSTOM MENU GROUP 3 | |
|---|---|---|---|---|---|
| REGISTRATION REGION | REGISTERED MENU ITEM | REGISTRATION REGION | REGISTERED MENU ITEM | REGISTRATION REGION | REGISTERED MENU ITEM |
| 1 | ERROR REPORT PRINT | 1 | MIS-FEED RECOVERY | 1 | TIMER SETTING |
| 2 | UNREGISTERED | 2 | REMAINING TONER AMOUNT | 2 | UNREGISTERED |
| 3 | REMAINING PAPER AMOUNT | 3 | UNREGISTERED | 3 | UNREGISTERED |
| 4 | REMAINING PHOTOCONDUCTOR BODY SERVICE LIFE | 4 | HDD MANAGEMENT | 4 | UNREGISTERED |
| 5 | UNREGISTERED | 5 | UNREGISTERED | 5 | UNREGISTERED |
| 6 | UNREGISTERED | 6 | UNREGISTERED | 6 | UNREGISTERED |
| 7 | UNREGISTERED | 7 | UNREGISTERED | 7 | UNREGISTERED |
| 8 | UNREGISTERED | 8 | UNREGISTERED | 8 | UNREGISTERED |
| 9 | UNREGISTERED | 9 | UNREGISTERED | 9 | UNREGISTERED |
| 10 | UNREGISTERED | 10 | UNREGISTERED | 10 | UNREGISTERED |

FIG.39

■ CLICK REGISTRATION REGION WHERE MENU ITEM IS REGISTERED

<STAMP SETTING>

| ON/OFF SETTING | SECURITY MANAGEMENT NUMBERING |
| --- | --- |
| | STAMPING |
| | USER STAMPING |
| | DATE STAMPING |
| | PAGE STAMPING |

<STAMP: SECURITY MANAGEMENT NUMBERING>

<STAMP: STAMPING>

| STAMPING | STAMPING:STAMP TYPE |
| --- | --- |
| | STAMPING:STAMP POSITION |
| | STAMPING:STAMP PAGE |
| | STAMPING:STAMP COLOR |

<STAMP: USER STAMPING>

<STAMP: STAMPING>

| | USER STAMPING:STAMP TYPE |
| --- | --- |

FIG.58

| AUTHENTICATION ID | OPERATION MODE |
|---|---|
| admin | APPARATUS MANAGEMENT |
| doc | DOCUMENT MANAGEMENT |
| taro | GENERAL MODE |
| jiro | DOCUMENT MANAGEMENT |
| hanako | MANAGEMENT |

FIG.63
(a)
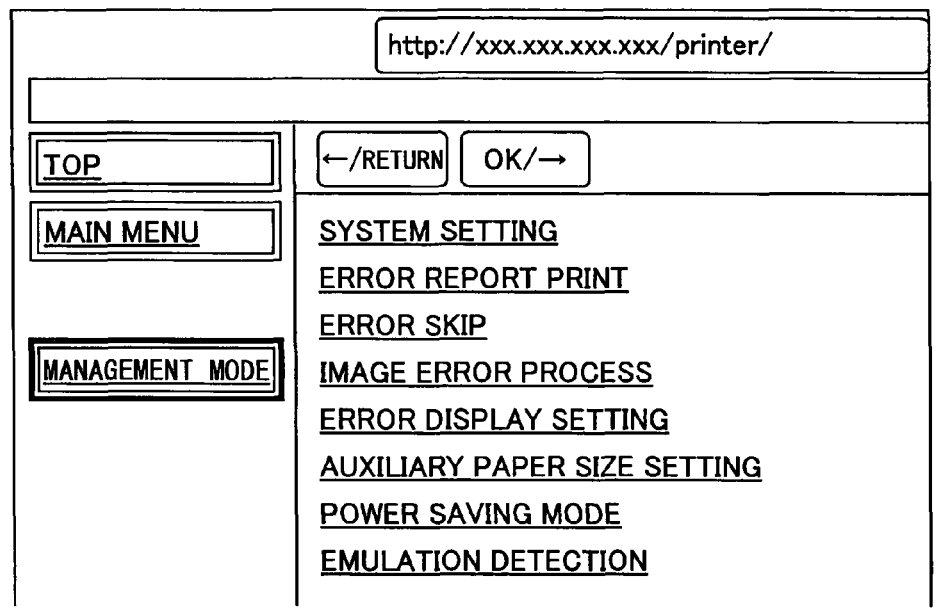
(b)
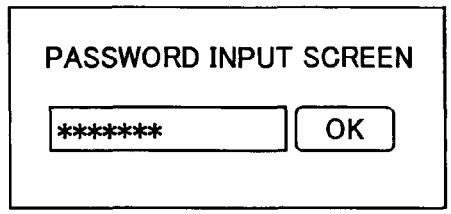
(c)
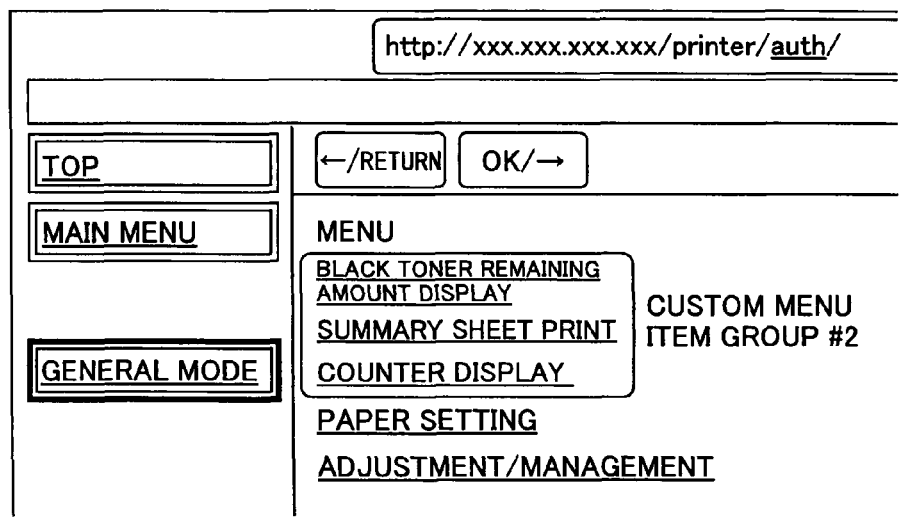

FIG.65

USER CUSTOM MENU TABLE (a)

| MENU ID (MENU ITEM) |
|---|
| 7 (PAPER SETTING) |
|  |
|  |
|  |

| ATTRIBUTE | |
|---|---|
| MAINTAIN MENU INFORMATION | PRESENCE |

USER CUSTOM MENU TABLE (b)

| MENU ID (MENU ITEM) | ATTRIBUTE |
|---|---|
| 7 (PAPER SETTING) | PRESENCE |
| 87 (ADDRESS BOOK REGISTRATION) | NON-PRESENCE |
|  |  |
|  |  |

IMAGE FORMING APPARATUS, CONTROL METHOD AND COMPUTER-READABLE RECORDING MEDIUM STORING CONTROL PROGRAM FOR CONTROLLING DISPLAYED MENU ITEMS

BACKGROUND OF THE INVENTION

1. Field of the Invention

The present invention generally relates to an image forming apparatus, a control method, and a computer-readable recording medium storing a control program in which menu items are controlled.

2. Description of the Related Art

Conventionally, an instrument, for example, an image forming apparatus or a mobile phone provides a menu, and a user can determine several kinds of settings, display information on a display, and operate the instrument by operating the menu. However, items in the menu have been numerous due to a large number of functions and complexity of operations in the instrument. Consequently, it takes time for the user to find a desired item in the menu and the operability of the instrument is lowered.

In order to solve the above problem, the items in the menu are categorized and categorized items are further arrayed in different layers, and further, items which are frequently used by the user are customized for the user and the customized items are disposed at a position findable by the user. With this, the operability of the instrument is increased.

That is, several technologies have been developed for increasing the operability in the menu.

In Patent Document 1, an input device is disclosed. The input device provides a displaying unit, a controlling unit, an inputting unit, a counting unit, and a memory unit. The displaying unit displays information on a display, the controlling unit makes the display unit display item information in which items are layered in from an upper layer to a lower layer, the inputting unit selects a menu item for displaying information or a menu item for setting operations, the counting unit counts the number of selected times of the menu item, and the memory unit stores the counted number of the menu item selections. The input device further provides a short cut inputting section in the inputting unit. The controlling unit allocates a menu item having a high counted value to a short cut menu which is operated by the short cut inputting section. With this, the user can directly operate the high counted menu item in a short cut menu operated by the short cut inputting section.

In Patent Document 2, a digital multifunctional apparatus is disclosed. In the digital multifunctional apparatus, when a user pushes an initial setting key, a menu A is displayed on an operation displaying section, and when the user selects a one touch registration menu in plural initial settings on the menu A, a menu B is displayed. A register-able function list, in which register-able functions are listed, is displayed on the menu B. When the user selects one function, for example, a function to reduce to 71% of the original image size, on the menu B, the selected function is registered in a one touch list. With this, the operability is increased.

In Patent Document 3, a menu processing device is disclosed. The menu processing device can add a menu item and change the menu item by having an operating screen of, for example, a digital TV system. The menu processing device provides a menu item database, a selecting unit, a category determining unit, and an installing unit. The menu item database stores menu items and category information of the menu items in which a category of each menu item is expressed. The selecting unit selects a desirable menu item from the menu item database. The category determining unit determines whether a category exists to which a selected menu is installed. The installing unit installs the selected menu item in the category menu when the category is one to which the selected menu item is to be installed. With this, a menu item is added or the menu item is changed at a suitable position by a simple operation.

[Patent Document 1] Japanese Laid-Open Patent Application No. 2003-29893

[Patent Document 2] Japanese Laid-Open Patent Application No. 2001-45201

[Patent Document 3] Japanese Laid-Open Patent Application No. 2002-183172

In Patent Document 1, frequently used menu items are automatically disposed in a menu operated by the short cut inputting section. However, when plural users operate the input device and the frequently used menu items are different among the plural users, a short cut menu suitable to each user cannot be formed.

In Patent Documents 2 and 3, when plural users use the apparatus, similar to the Patent Document 1 case, a suitable menu cannot be provided to each user. That is, when a suitable menu for a specific user is provided and unspecified users use the apparatus, the suitable menu for the specific user cannot be suitably used by the unspecified users.

That is, in Patent Documents 1 through 3, the operability has a problem when plural users use a menu in the apparatus.

SUMMARY OF THE INVENTION

In a preferred embodiment of the present invention, there is provided an image forming apparatus, a control method, and a computer-readable recording medium storing a control program in which operability is increased when plural users use a menu item in the image forming apparatus.

Features and advantages of the present invention are set forth in the description that follows, and in part will become apparent from the description and the accompanying drawings, or may be learned by practice of the invention according to the teachings provided in the description. Features and advantages of the present invention will be realized and attained by an image forming apparatus, a control method, and a computer-readable recording medium storing a control program particularly pointed out in the specification in such full, clear, concise, and exact terms so as to enable a person having ordinary skill in the art to practice the invention.

To achieve one or more of these and other advantages, according to one aspect of the present invention, there is provided an image forming apparatus. The image forming apparatus includes a displaying unit which displays a predetermined number of menu items in plural menu items on a screen, an inputting unit which selects a menu item from the menu items displayed on the screen by the displaying unit, and a storing unit which registers the menu item selected by the input unit in a user custom menu table for each user having registration regions where a predetermined number of menu items are stored.

According to another aspect of the present invention, there is provided a control method in an image forming apparatus. The control method includes the steps of displaying a predetermined number of menu items in plural menu items on a screen, selecting a menu item from the menu items displayed on the screen, registering the selected menu item in a registration region of a user custom menu table for each user having plural registration regions where a predetermined number of menu items are registered, selecting a menu item registered in the registration region of the user custom menu table, and executing a job of the selected menu item.

According to another aspect of the present invention, there is provided a computer-readable recording medium storing a control program. The control program includes the steps of displaying a predetermined number of menu items in plural menu items on a screen, selecting a menu item from the menu items displayed on the screen, registering the selected menu item in a registration region of a user custom menu table for each user having plural registration regions where a predetermined number of menu items are registered, selecting a menu item registered in the registration region of the user custom menu table and executing a job of the selected menu item.

EFFECT OF THE INVENTION

According to an embodiment of the present invention, an image forming apparatus includes three types of user custom menu tables, namely an individual user custom menu table, a positional user custom menu table, and a common user custom menu table. An individual user registers menu items in the individual user custom menu table and uses the registered menu items, only specific users having corresponding specific positions in an organization register menu items in the positional user custom menu table and use the registered menu items, and when the user custom menu table is used in common by all users, all the users register menu items in the common user custom menu table and use the registered menu items. Therefore, operability is increased when plural users use a menu item in the image forming apparatus.

BRIEF DESCRIPTION OF THE DRAWINGS

Features and advantages of the present invention will become more apparent from the following detailed description when read in conjunction with the accompanying drawings, in which:

FIG. 5 is a table showing menu item information of the menu items stored in a menu item storing section shown in FIG. 3;

FIG. 6 is a table showing menu types of the menu items stored in the menu item storing section shown in FIG. 3;

FIG. 22 is a user custom menu table in the user information storing section of the sixth processes shown in FIG. 20;

FIG. 25 is a diagram showing a screen change in a modified example 1 of the seventh processes shown in FIG. 23;

FIG. 26 is a diagram showing a screen change in a modified example 2 of the seventh processes shown in FIG. 23;

FIG. 27 is a diagram showing a screen change in a modified example 3 of the seventh processes shown in FIG. 23;

FIG. 28 is a diagram showing a screen change in a modified example 4 of the seventh processes shown in FIG. 23;

FIG. 38 is a diagram showing a first screen in the twelfth processes shown in FIG. 37;

FIG. 39 is a diagram showing a second screen in the twelfth processes shown in FIG. 37;

FIG. 58 is a diagram showing an authentication and operation mode relationship table according to the third embodiment of the present invention;

FIG. 63 is a diagram showing a screen change in the third processes shown in FIG. 62;

FIG. 65 is a diagram showing an individual user custom menu table according to the fourth embodiment of the present invention;

DESCRIPTION OF THE PREFERRED EMBODIMENT

Best Mode of Carrying Out the Invention

The best mode of carrying out the present invention is described with reference to the accompanying drawings.

Embodiments of the present invention are described by using an image forming apparatus. However, the apparatus is not limited to the image forming apparatus, and can be an information processing apparatus or an image processing apparatus which has menu items expressed by a layered structure.

[First Embodiment]

Referring to FIGS. 1 through 39, a first embodiment of the present invention is described.

[Network Structure]

Figure 1:
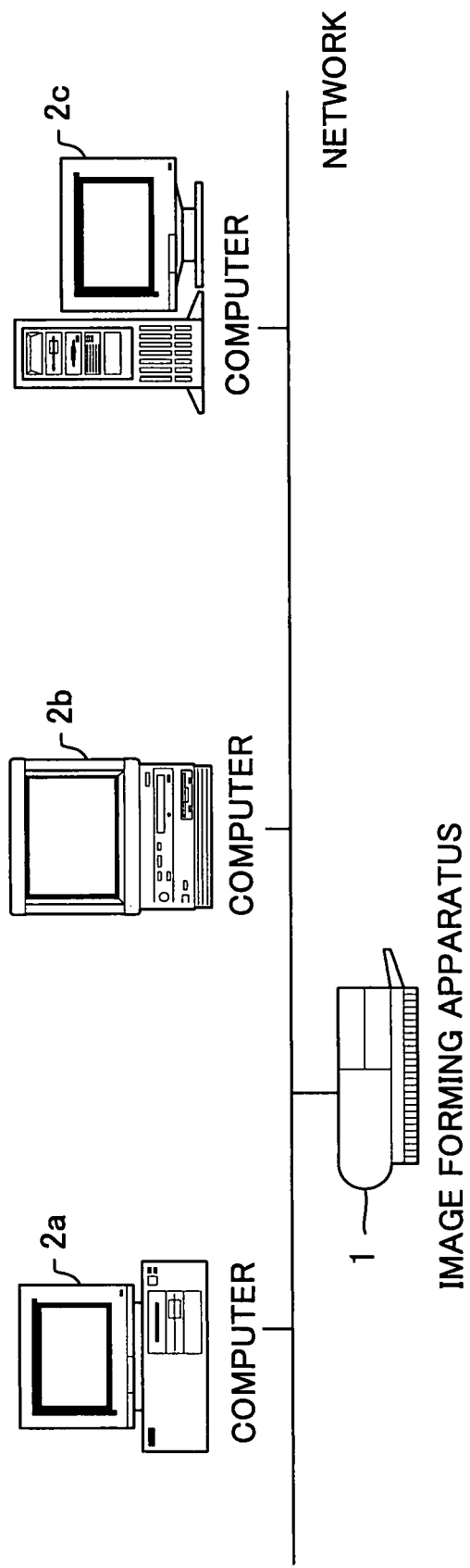
FIG. 1 is a diagram showing a network structure including an image forming apparatus according to a first embodiment of the present invention.

First, a network structure including an image forming apparatus according to the first embodiment of the present invention is described. FIG. 1 is a diagram showing the network structure including the image forming apparatus according to the first embodiment of the present invention.

As shown in FIG. 1, in the network structure, an image forming apparatus 1 is connected to computers 2a, 2b, and 2c via a network such as a LAN (local area network).

In FIG. 1, the image forming apparatus 1 receives an image forming request, for example, an image printing request, from each of the computers 2a through 2c, and forms an image on a recording medium. The image forming apparatus 1 is, for example, an MFP (multifunctional peripheral), an information processing apparatus, or a printer. The computers 2a through 2c can be connected to the image forming apparatus 1 via an interface such as IEEE 1284 and USB instead of via the network. When the computers 2a through 2c are connected to the image forming apparatus 1 via the network, the computers 2a through 2c can operate the image forming apparatus 1 by using a Web browser.

[Hardware Structure]

Figure 2:
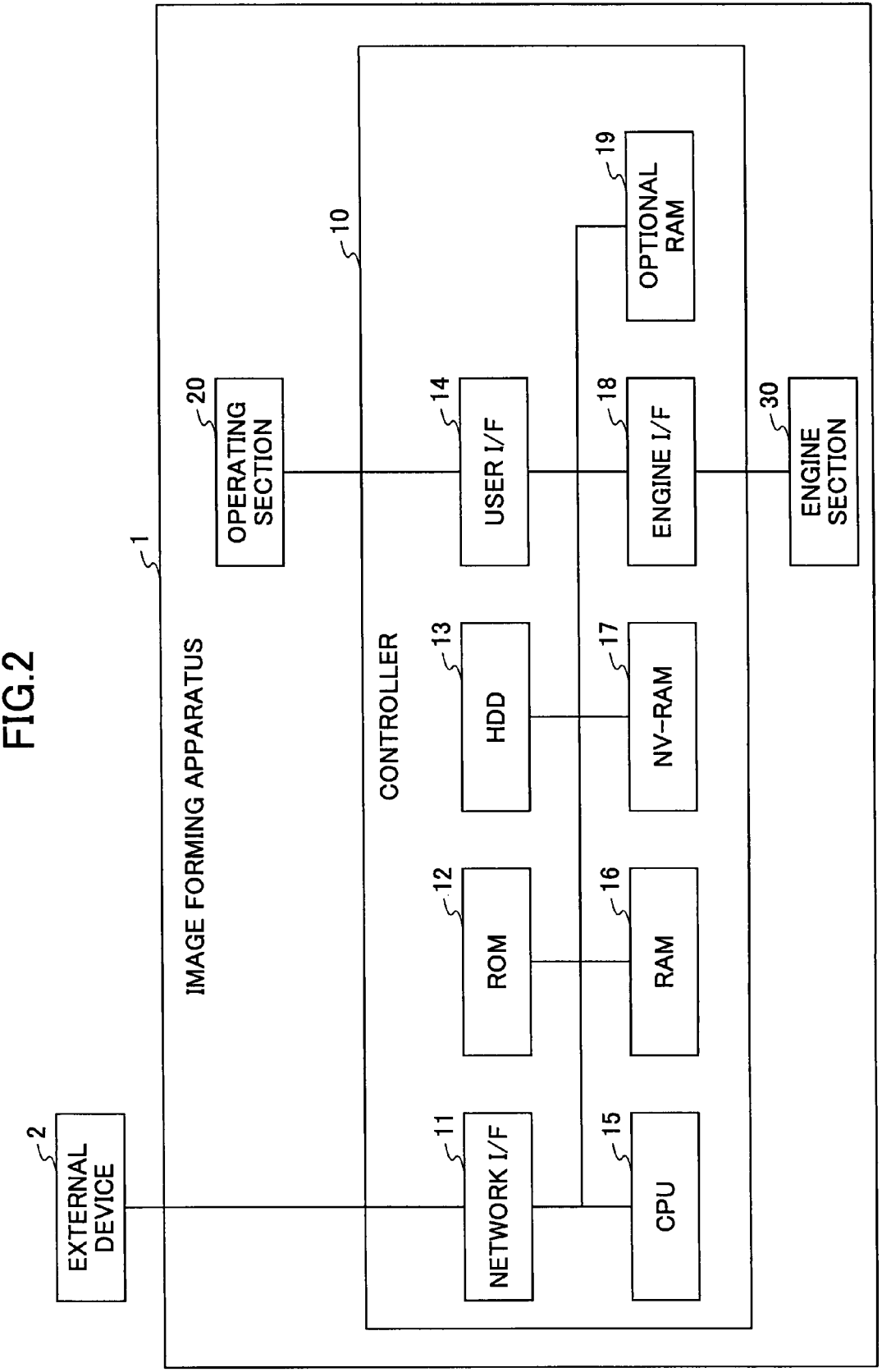
FIG. 2 is a diagram showing a hardware structure of the image forming apparatus according to the first embodiment of the present invention.

Next, referring to FIG. 2, a hardware structure of the image forming apparatus 1 is described. FIG. 2 is a diagram showing the hardware structure of the image forming apparatus 1 according to the first embodiment of the present invention.

As shown in FIG. 2, the image forming apparatus 1 includes a controller 10, an operating section 20, and an engine section 30. The controller 10 includes a network I/F (interface) 11, a ROM 12, an HDD (hard disk drive) 13, a user I/F 14, a CPU 15, a RAM 16, a NV-RAM 17, an engine I/F 18, and an optional RAM 19.

The controller 10 controls all elements in the image forming apparatus 1. For example, the controller 10 receives data such as a print command from an external device 2 and processes the received data to form print data and requests the engine section 30 to form an image by using the print data.

The network I/F 11 receives/transmits data from/to the external device 2. The ROM 12 stores control programs such as a control program for the engine section 30. The HDD 13 stores data necessary for processes in the image forming apparatus 1.

The user I/F 14 receives/sends data from/to the operating section 20. The CPU 15 controls the image forming apparatus 1 by executing the programs in the ROM 12 and by a command input form the operating section 20. The RAM 16 is a volatile memory which is used as a working memory of the CPU 15 and as a buffer memory for input data.

The NV-RAM 17 is a non-volatile memory which stores error history of the engine section 30, instructions from the operating section 20, and so on. The engine I/F 18 receives/sends data from/to the engine section 30.

The operating section 20 is formed of a display section, hard keys, and so on including, for example, a touch panel. A user inputs an instruction by using the operating section 20, and operating conditions of the image forming apparatus 1 are displayed on the operating section 20. The engine section 30 receives a command of an image forming request from the controller 10, and forms an image on a recording medium.

By the hardware structure shown in FIG. 2, the image forming apparatus 1 receives data, for example, an image forming request from the external device 2 (one of the computers 2a through 2c shown in FIG. 1), by using the network I/F 11 via a network. In addition, the image forming apparatus 1 receives data input on the operating section 20 via the user I/F 14.

[Functional Structure]

Figure 3:
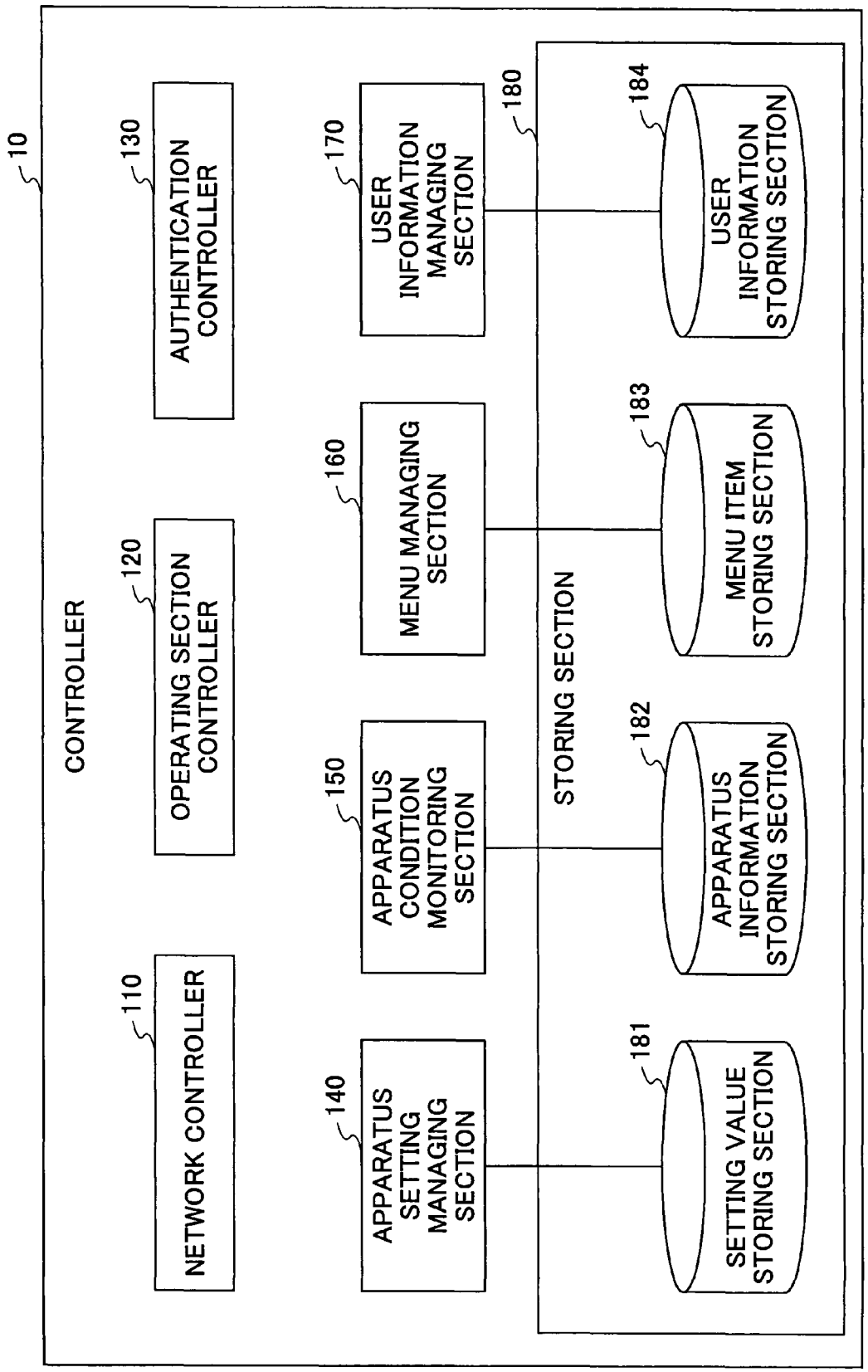
FIG. 3 is a diagram showing a functional structure of a controller in the image forming apparatus according to the first embodiment of the present invention.

Referring to FIG. 3, a functional structure of the controller 10 in the image forming apparatus 1 is described. FIG. 3 is a diagram showing the functional structure of the controller 10 in the image forming apparatus 1 according to the first embodiment of the present invention.

As shown in FIG. 3, the controller 10 of the image forming apparatus 1 includes a network controller 110, an operating section controller 120, an authentication controller 130, an apparatus setting managing section 140, an apparatus condition monitoring section 150, a menu managing section 160, a user information managing section 170, and a storing section 180. The storing section 180 includes a setting value storing section 181, an apparatus information storing section 182, a menu item storing section 183, and a user information storing section 184.

The network controller 110 controls data transmitted via a network. For example, the network controller 110 processes data input from the network I/F 11 via a network transmitted from the external device 2. Then the network controller 110 sends the processed data to the operating section controller 120, the authentication controller 130, and data managing sections (the apparatus setting managing section 140 through the user information managing section 170).

The operating section controller 120 controls the operating section 20. For example, the operating section controller 120 processes data input from the operating section 20 and sends the processed data to the network controller 110, the authentication controller 130, and the data managing sections (the apparatus setting managing section 140 through the user information managing section 170).

The authentication controller 130 authenticates a user who operates the image forming apparatus 1 and user operating rights for the image forming apparatus 1.

The apparatus setting managing section 140 manages basic settings in a system of the image forming apparatus 1 by using data stored in the setting value storing section 181.

The apparatus condition monitoring section 150 monitors the conditions of the image forming apparatus 1, for example, remaining amounts of consumable items in the image forming apparatus 1 by using data stored in the apparatus information storing section 182.

The menu managing section 160 managed menu items in a layered structure by using data stored in the menu item storing section 183.

The user information managing section 170 manages user information, for example, receives user information from the network controller 110 or the operating section controller 120 and stores the received user information in the user information storing section 184.

The storing section 180 stores various kinds of data, and is, for example, the RAM 16 shown in FIG. 2.

The setting value storing section 181 stores setting items together with corresponding setting values, for example, an error skip setting, a stored document automatically deleting setting after 3 days of stored date, and a temporarily stored document automatically deleting setting.

The apparatus information storing section 182 stores apparatus specific information, for example, a remaining amount of black toner, and a remaining amount of sheets in a first tray and a second tray, and a remaining service life of a cyan photoconductor body.

The menu item storing section 183 stores menu items (described below in detail). The user information storing section 184 stores user information (described below in detail).

The above functions are operated by an OS (operating system) on the image forming apparatus 1, control the hardware sections shown in FIG. 2, and manage the setting information.

[Menu Tree and Menu Items]

Figure 4:
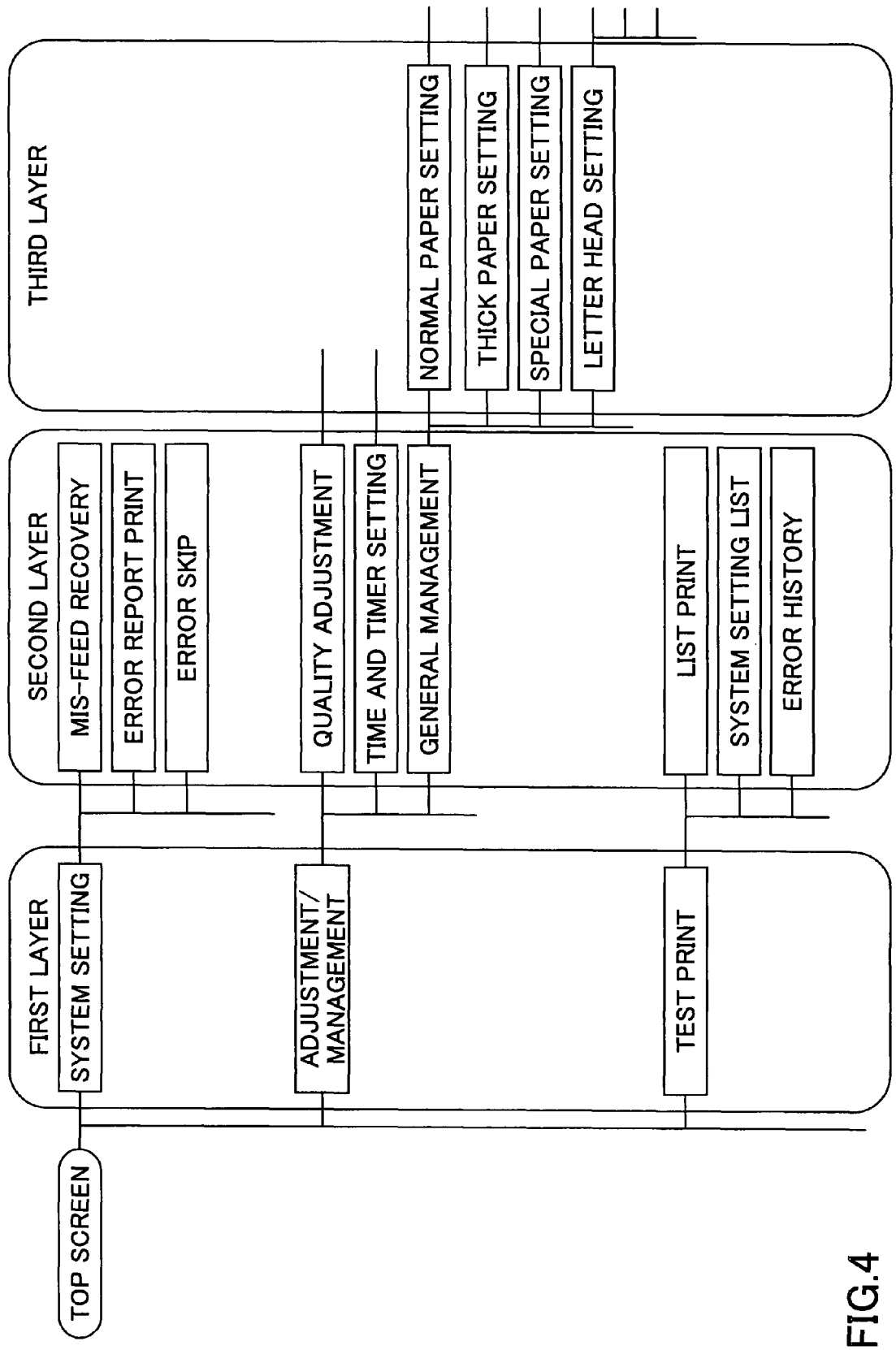
FIG. 4 is a diagram showing a menu tree of menu items stored in a menu item storing section shown in FIG. 3.

Next, referring to FIGS. 4 through 6, data to be stored in the menu item storing section 183 are described. FIG. 4 is a diagram showing a menu tree of menu items stored in the menu item storing section 183 according to the first embodiment of the present invention. FIG. 5 is a table showing menu item information of the menu items stored in the menu item storing section 183. FIG. 6 is a table showing menu types of the menu items stored in the menu item storing section 183.

As shown in FIG. 4, menu items are categorized into a layered structure (tree structure). Each menu item shown in the tree structure of FIG. 4 is formed of menu item information shown in FIG. 5. The menu item information includes a menu ID (identifier), a menu item name (to be displayed on the operating section 20), and contents of the menu item to be executed when a menu item is selected. In addition, the menu items are classified into plural types based on the contents of the menu items to be executed when the menu items are selected.

As shown in FIG. 6, the menu items are classified into a setting type, an information displaying type, and a branch type. The above structure and types are one example, and can be changed to simplified types or complex types.

Generally, when a user selects a menu item, the user traces from a higher layer to a lower layer in the menu tree by using an inputting unit such as an up-down and right-left moving key and a touch panel. When the user finds a desirable menu item, the user selects the menu item. In addition, the user can trace the menu tree from the lower layer to the higher layer.

[User Information]

Figure 7:
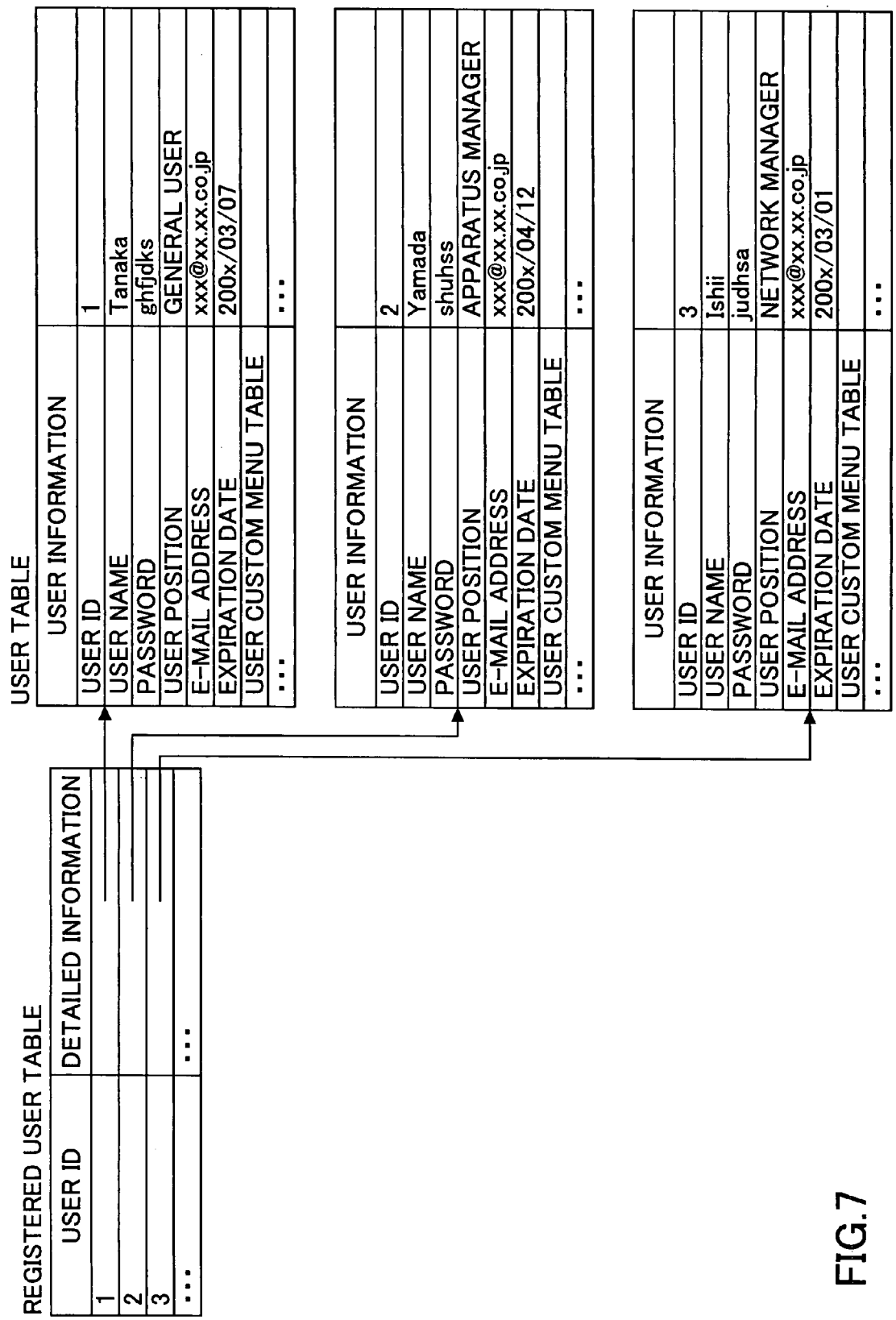
FIG. 7 is a diagram showing a registered user table and user tables stored in a user information storing section shown in FIG. 3.
Figure 8:
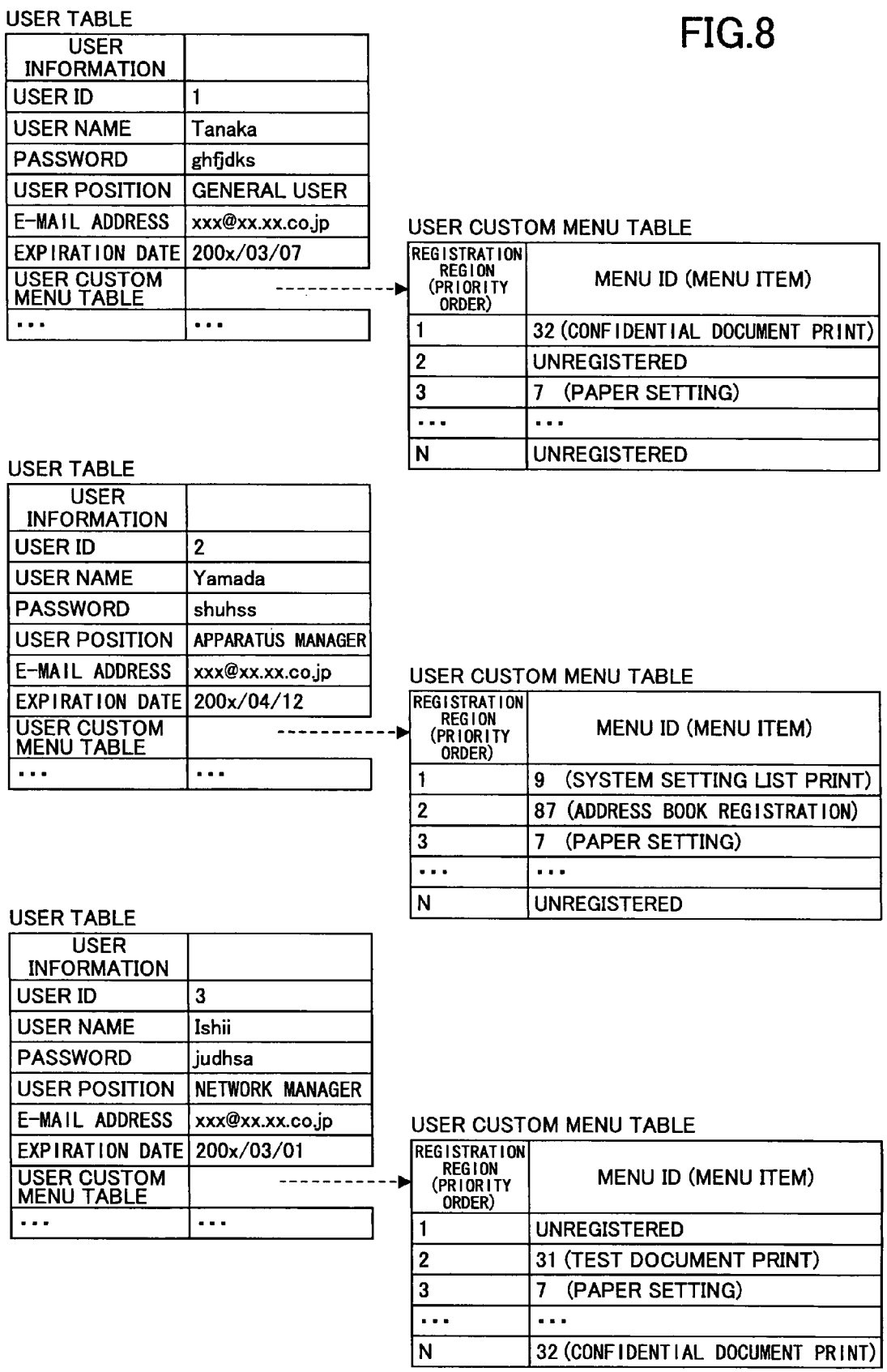
FIG. 8 is a diagram showing the user tables and user custom menu tables stored in the user information storing section shown in FIG. 3.

Next, referring to FIGS. 7 and 8, data which are stored in the user information storing section 184 are described. FIG. 7 is a diagram showing a registered user table and user tables stored in the user information storing section 184. FIG. 8 is a diagram showing the user tables and user custom menu tables stored in the user information storing section 184.

As shown in FIG. 7, the user information is stored in a registered user table and an individual user table for each user. In the registered user table, user IDs of registered users are stored in the order of IDs and detailed information of each user ID is described in each individual user table. Further, as shown in FIG. 8, the corresponding user custom menu table is provided in each user table.

As shown in FIG. 8, the user custom menu table includes a registration region where a menu item having a menu ID is registered. A predetermined number of the registration regions are provided in the user custom menu table, and the priority order for displaying a menu item can be given in each registration region. Corresponding to each registration region, the menu ID including the menu item is described.

The user custom menu table can be formed by an individual user unit, a user position (role) unit (for example, a general user unit, or an apparatus manager unit), a common unit for all users, a user group unit, or a combination of the above units. The user custom menu table can be stored in other storing sections instead of in the user information storing section 184.

When a menu item to be executed is selected on the user custom menu table, the menu ID of the menu item is specified and the contents of the menu item are executed by referring to the menu item information shown in FIG. 5.

[Functional Blocks]

Figure 9:
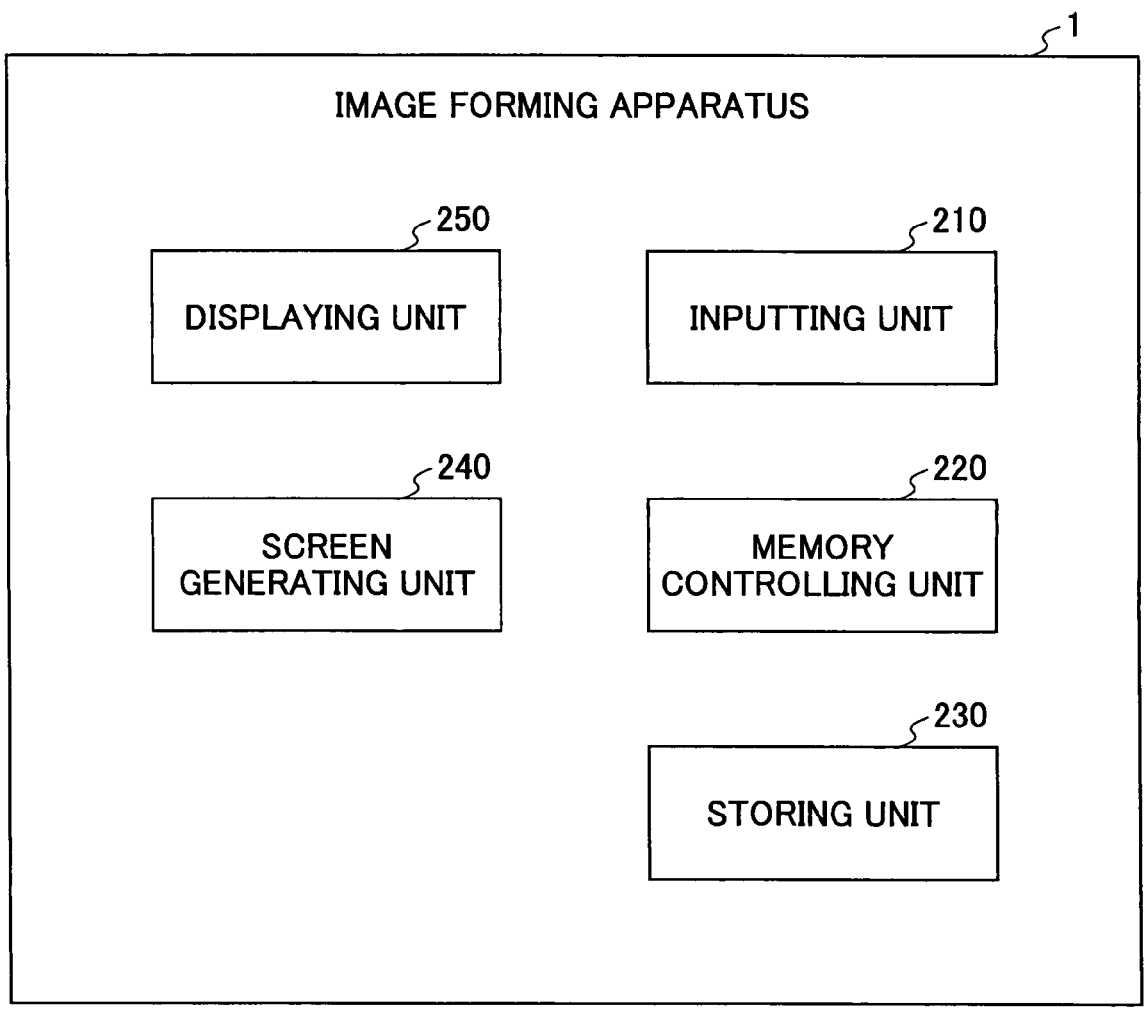
FIG. 9 is a diagram showing functional blocks of the image forming apparatus according to the first embodiment of the present invention.

Next, referring to FIG. 9, functional blocks of the image forming apparatus 1 according to the first embodiment of the present invention are described. FIG. 9 is a diagram showing the functional blocks of the image forming apparatus 1 according to the first embodiment of the present invention.

As shown in FIG. 9, the image forming apparatus 1 includes an inputting unit 210, a memory controlling unit 220, a storing unit 230, a screen generating unit 240, and a displaying unit 250.

A user selects a menu item displayed on the displaying unit 250 by using the inputting unit 210. The inputting unit 210 is, for example, hard keys and/or a touch panel on the operating section 20 shown in FIG. 2.

The memory controlling unit 220 controls to store/read data in/from the storing unit 230. The memory controlling unit 220 corresponds to the apparatus setting managing section 140, the apparatus condition monitoring section 150, the menu managing section 160, and the user information managing section 170 shown in FIG. 3.

The storing unit 230 stores the menu item selected by the inputting unit 210. The storing unit 230 corresponds to the storing section 180 shown in FIG. 3.

The screen generating unit 240 generates a screen which is displayed by the displaying unit 250. The screen generating unit 240 corresponds to the operating section controller 120 shown in FIG. 3.

The displaying unit 250 displays the screen generated by the screen generating unit 240. For example, the screen generating unit 240 generates a screen on which a predetermined number of menu items of plural menu items are displayed, and the displaying unit 250 displays the screen. The displaying unit 250 corresponds to the displaying section of the operating section 20 shown in FIG. 2.

By the functional blocks shown in FIG. 9 in the image forming apparatus 1, a menu item input from the inputting unit 210 is registered in a user custom menu table, and the menu item on the user custom menu table stored in the storing unit 230 is displayed on a screen generated by the screen generating unit 240.

Next, referring to the drawings, processes storing a menu item in a user custom menu table and reading the menu item stored in the user custom menu table are described. In the processes, an LCD (liquid crystal panel) capable of displaying four lines of letters is used as the displaying unit 250 and hard keys are used as the inputting unit 210. However, the displaying unit 250 and the inputting unit 210 are not limited to the above devices; the displaying unit 250 can have the four lines or more or less depending on the desirable resolution, and the inputting unit 210 can be a touch panel or another panel.

[First Processes in First Embodiment]

Figure 10:
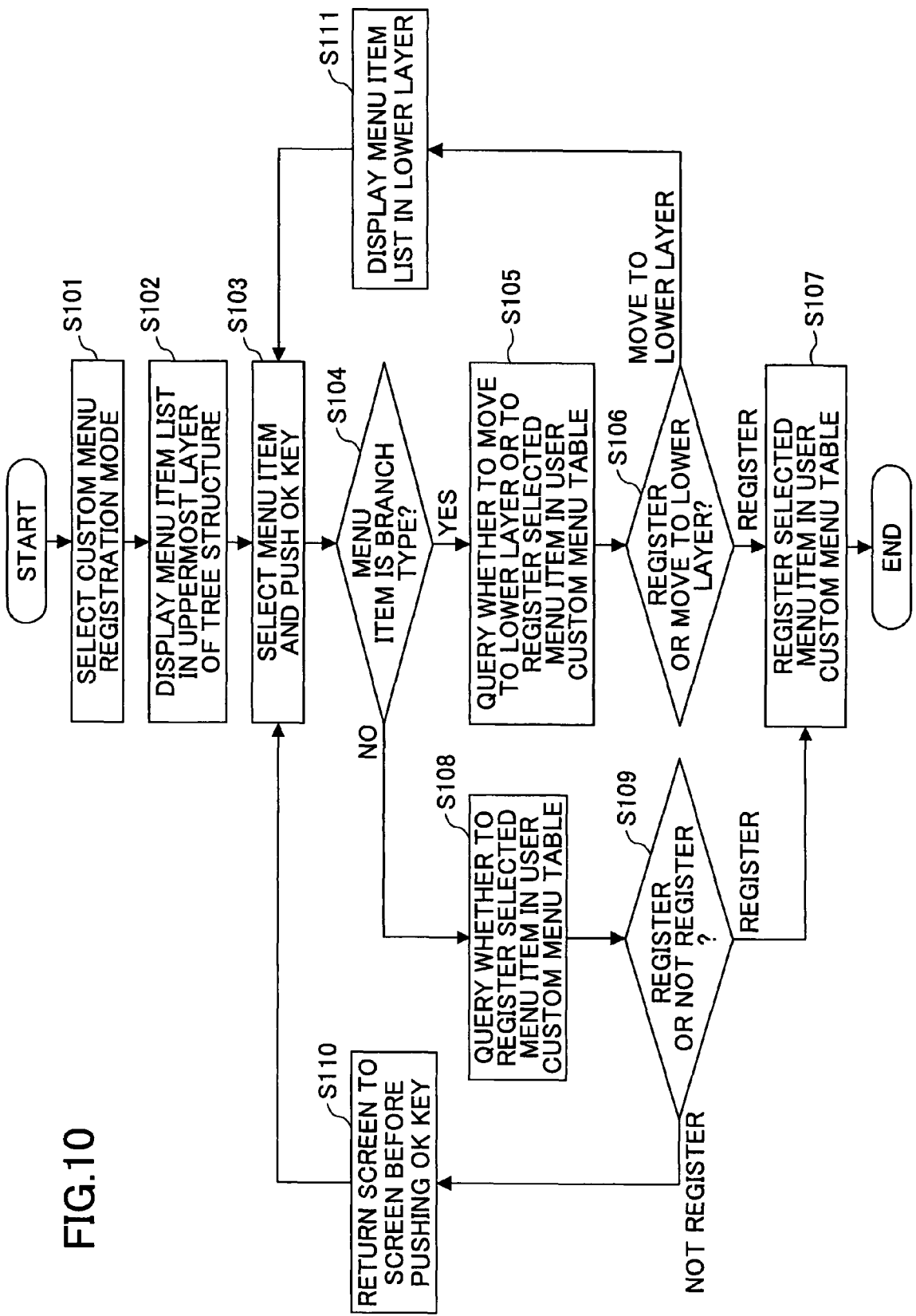
FIG. 10 is a flowchart showing first processes in the image forming apparatus according to the first embodiment of the present invention.

Referring to FIGS. 2 through 11, first processes in the image forming apparatus 1 according to the first embodiment of the present invention are described. FIG. 10 is a flowchart showing the first processes in the image forming apparatus 1 according to the first embodiment of the present invention.

In the first processes, a user A selects a menu item and registers the selected menu item in a user custom menu table.

First, the user A selects a custom menu registration mode on a menu screen of the image forming apparatus 1 (S101).

The operating section controller 120 displays a menu item list in the uppermost layer (the first layer) of the tree structure (S102). In detail, the menu managing section 160 extracts the menu item list in the uppermost layer of the tree structure from the menu item storing section 183. The operating section controller 120 displays the extracted menu item list of the uppermost layer on the operating section 20.

Next, the user A selects a menu item on the operating section 20 and pushes an OK key (S103). The user A selects a menu item which the user A desires to register in a user custom menu table from the uppermost layer. The operating section controller 120 receives information of the selected menu item and the push of the OK key.

The menu managing section 160 determines whether the selected menu item is a branch type based on information stored in the menu item storing section 183 (S104). When the selected menu item is a branch type (YES in S104), the operating section controller 120 queries the user A whether to move to a lower layer or to register the selected menu item in the user custom menu table (S105). In detail, the screen generating unit 240 generates a query screen and the displaying unit 250 displays the query screen. The query screen displays information whether to move to a lower layer or to register the selected menu item in the user custom menu table.

The operating section controller 120 determines whether a user A instruction is to move to a lower layer or to register the selected menu item in the user custom menu table (S106). When the user A instruction is to register the selected menu item in the user custom menu table (REGISTER in S106), the user information managing section 170 registers the selected menu item in the user custom menu table of the user A in the user information storing section 184 (S107).

When the user A instruction is to move to a lower layer (Move to Lower Layer in S106), the operating section controller 120 displays a menu item list in the lower layer (the second layer) of the tree structure (S111). Then the process returns to S103.

When the selected menu item is not a branch type (NO in S104), the operating section controller 120 queries the user A whether to register the selected menu item in the user custom menu table (S108). In detail, the screen generating unit 240 generates a query screen and the displaying unit 250 displays the query screen. The query screen displays information whether to register the selected menu item in the user custom menu table.

The operating section controller 120 determines whether a user A instruction is to register the selected menu item in the user custom menu table (S109). When the user A instruction is to register the selected menu item in the user custom menu table (REGISTER in S109), the user information managing section 170 registers the selected menu item in the user custom menu table of the user A in the user information storing section 184 (S107).

When the user A instruction is not to register the selected menu item in the user custom menu table (NOT REGISTER in S109), the operating section controller 120 returns the screen to the screen before pushing the OK key (S110). In detail, the screen generating unit 240 generates a screen before an input process in S103 and the displaying unit 250 displays the generated screen. Then the process returns to S103.

As described above, by the first processes shown in FIG. 10, a menu item which is desired (selected) by the user A is registered in the user custom menu table of the user A.

[Screen Change in First Processes]

Figure 11:
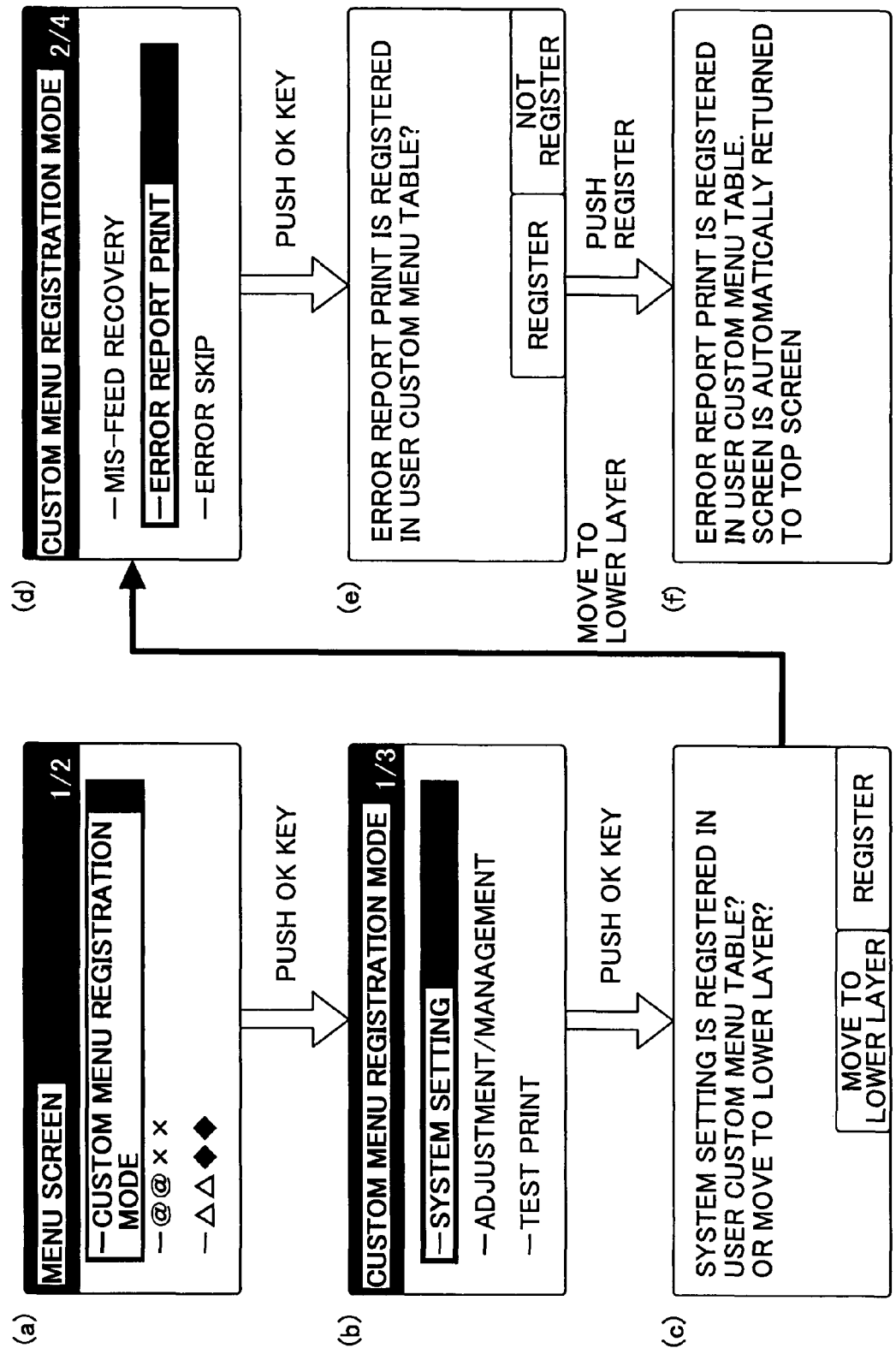
FIG. 11 is a diagram showing a screen change in the first processes shown in FIG. 10.

FIG. 11 is a diagram showing a screen change in the first processes. Referring to FIGS. 2 through 11, the screen change in the first processes is described.

In the following, a number is described at the upper right end in the screen. The number signifies a page of total pages. For example, the number "1/2" is described in FIG. 11(a), and the number "1/2" signifies the first page of total 2 pages.

In FIG. 11, a menu screen at "START" in FIG. 10 is shown in FIG. 11(a). When the user A selects "CUSTOM MENU REGISTRATION MODE" on the menu screen and pushes an OK key (S101), as shown in FIG. 11(b), a menu item list in the uppermost layer (the first layer) of the tree structure is displayed (S102). When the user A selects a menu item, for example, "SYSTEM SETTING", and pushes the OK key (S103), a screen shown in FIG. 11(c) is displayed (YES in S104) and the user A is queried whether to move to a lower layer or to register the selected menu item in the user custom menu table (S105). When the user A selects "MOVE TO LOWER LAYER" (MOVE TO LOWER LAYER in S106), the screen is changed to "CUSTOM MENU REGISTRATION MODE" as shown in FIG. 11(d). That is, a menu item list in the lower layer is displayed (S111). When the user A selects, for example, "ERROR REPORT PRINT" (S103), since "ERROR REPORT PRINT" is not a branch type (NO in S104), "ERROR REPORT PRINT IS REGISTERED IN USER CUSTOM MENU TABLE?" is displayed as shown in FIG. 11(e) (S108). When the user A selects "REGISTER" (REGISTER in S109), a screen shown in FIG. 11(f) is displayed. That is, "ERROR REPORT PRINT IS REGISTERED IN USER CUSTOM MENU TABLE. SCREEN IS AUTOMATICALLY RETURNED TO TOP SCREEN" is displayed (S107). In FIG. 11(f), it is displayed that the screen is automatically returned to the top screen; however, the screen can be changed to another screen.

As described above, the user A selects the menu item "ERROR REPORT PRINT" which the user A desires to register and registers the menu item "ERROR REPORT PRINT" in the user custom menu table of the user A.

According to the first processes, when the user A desires to register a menu item in the user custom menu table of the user A, a special key and special processes are not required.

When the custom menu registration mode is changed to the normal mode, the menu screen is also changed to a normal screen.

[Second Processes in First Embodiment]

Figure 12:
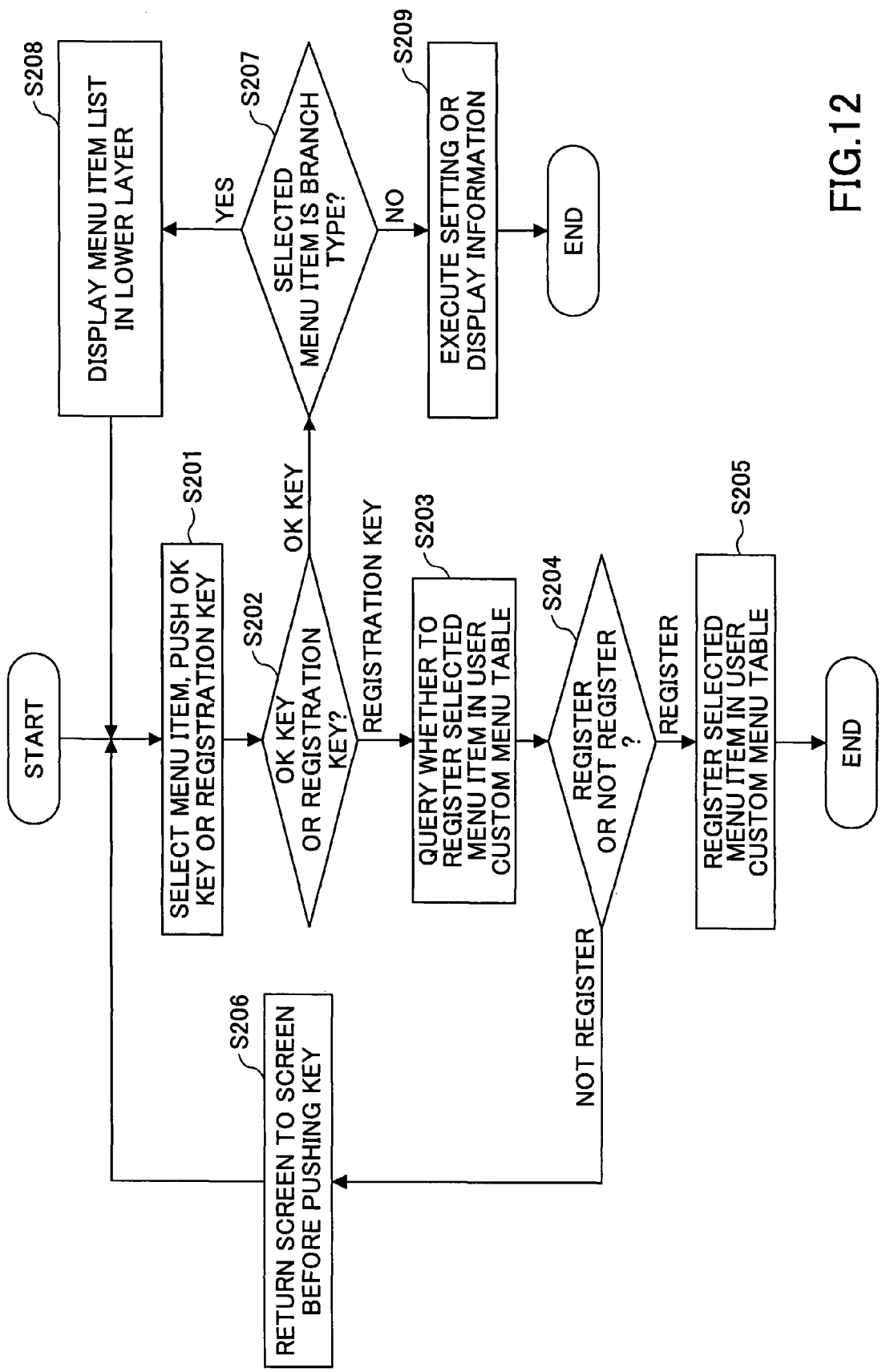
FIG. 12 is a flowchart showing second processes in the image forming apparatus according to the first embodiment of the present invention.
Figure 13:
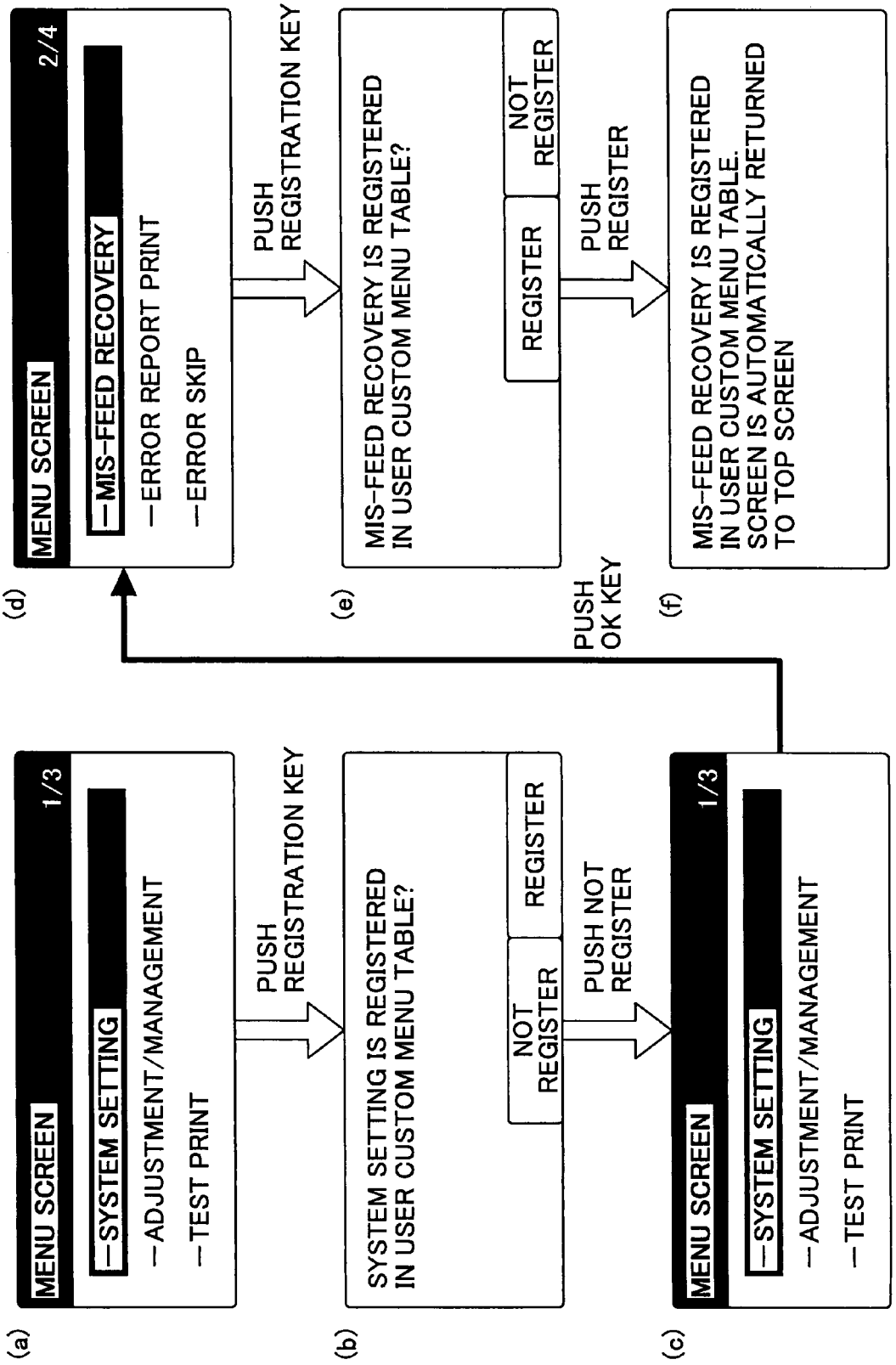
FIG. 13 is a diagram showing a screen change in the second processes shown in FIG. 12.

Referring to FIGS. 2 through 9, and 12 and 13, second processes in the image forming apparatus 1 according to the first embodiment of the present invention are described. FIG. 12 is a flowchart showing the second processes in the image forming apparatus 1 according to the first embodiment of the present invention. FIG. 13 is a diagram showing a screen change in the second processes.

First, referring to FIG. 12, the second processes in the image forming apparatus 1 according to the first embodiment of the present invention are described. In the first processes, when the user A selects a menu item and registers the selected menu item in the user custom menu table, the custom menu registration mode is used for registering the selected menu item in the user custom menu table. However, in the second processes, the normal mode is used instead of using the custom menu registration mode. In the following description of the second processes, the operating section 20 is displaying menu items in any one of layers in the tree structure.

First, the user A selects a menu item on the operating section 20, and pushes an OK key or a registration key (S201). The user A selects a menu item which the user A desires to register in a user custom menu table from the first layer in the menu tree. The operating section controller 120 receives information of the selected menu item and the push of the OK key or the registration key (the push of REGISTER).

The operating section controller 120 determines whether the pushed key is the OK key or the registration key (S202).

When the pushed key is the registration key (REGISTRATION KEY in S202), the operating section controller 120 queries the user A whether to register the selected menu item in the user custom menu table on the operating section 20 (S203).

The operating section controller 120 determines whether a user A instruction is to register the selected menu item in the user custom menu table (S204). When the user A instruction is to register the selected menu item in the user custom menu table (REGISTER in S204), the user information managing section 170 registers the selected menu item in the user custom menu table of the user A in the user information storing section 184 (S205).

When the user A instruction is not to register the selected menu item in the user custom menu table (NOT REGISTER in S204), the operating section controller 120 returns the screen to the screen before pushing the key (S206), and the process returns to S201.

When the pushed key is the OK key (OK KEY in S202), the menu managing section 160 determines whether the selected menu item is a branch type (S207). When the selected menu item is a branch type (YES in S207), the operating section controller 120 displays a menu item list in a lower layer (the second layer) of the tree structure on the operating section 20 (S208). Then the process returns to S201.

When the selected menu item is not a branch type (NO in S207), since the selected menu item is a setting type or an information displaying type, the operating section controller 120 execute the setting or displays information of the selected menu item (S209).

As described above, by the second processes shown in FIG. 12, a menu item which is desired (selected) by the user A is registered in the user custom menu table of the user A.

[Screen Change in Second Processes]

In FIG. 13, a menu screen at "START" in FIG. 12 is shown in FIG. 13(a). When the user A selects "SYSTEM SETTING" on the menu screen and pushes a registration key (S201 and REGISTRATION KEY in S202), as shown in FIG. 13(b), the user A is queried whether to register the selected menu item in the user custom menu table (S203). When the user A selects "NOT REGISTER" (NOT REGISTER in S204), as shown in FIG. 13 (c), the screen returns to the menu screen (S206). When the user A selects "SYSTEM SETTING" by pushing an OK key (OK KEY in S202), since "SYSTEM SETTING" is a branch type (YES in S207), as shown in FIG. 13(d), a menu item list in a lower layer of the system setting is shown (S208). When the user A selects "MIS-FEED RECOVERY" on the menu screen shown in FIG. 13(d), and the registration key is pushed (S201, s202), as shown in FIG. 13(e), "MISS-FEED RECOVERY IS REGISTERED IN USER CUSTOM MENU TABLE?" is displayed (S203) and when the user A selects "REGISTER" (REGISTER in (S204), as shown in FIG. 13(f), "MIS-FEED RECOVERY IS REGISTERED IN USER CUSTOM MENU TABLE. SCREEN IS AUTOMATICALLY RETURNED TO TOP SCREEN" is displayed (S205).

In FIG. 13(f), it is displayed that the screen is automatically returned to the top screen; however, the screen can be changed to another screen.

As described above, the user A selects the menu item "MIS-FEED RECOVERY" which the user A desires to register and registers the menu item "MIS-FEED RECOVERY" in the user custom menu table of the user A.

According to the second processes, when the user A pushes a key (OK key or registration key) while a menu screen is displayed, the user A can select a menu item and register the menu item in the user custom menu table of the user A.

[Third Processes in First Embodiment]

Figure 14:
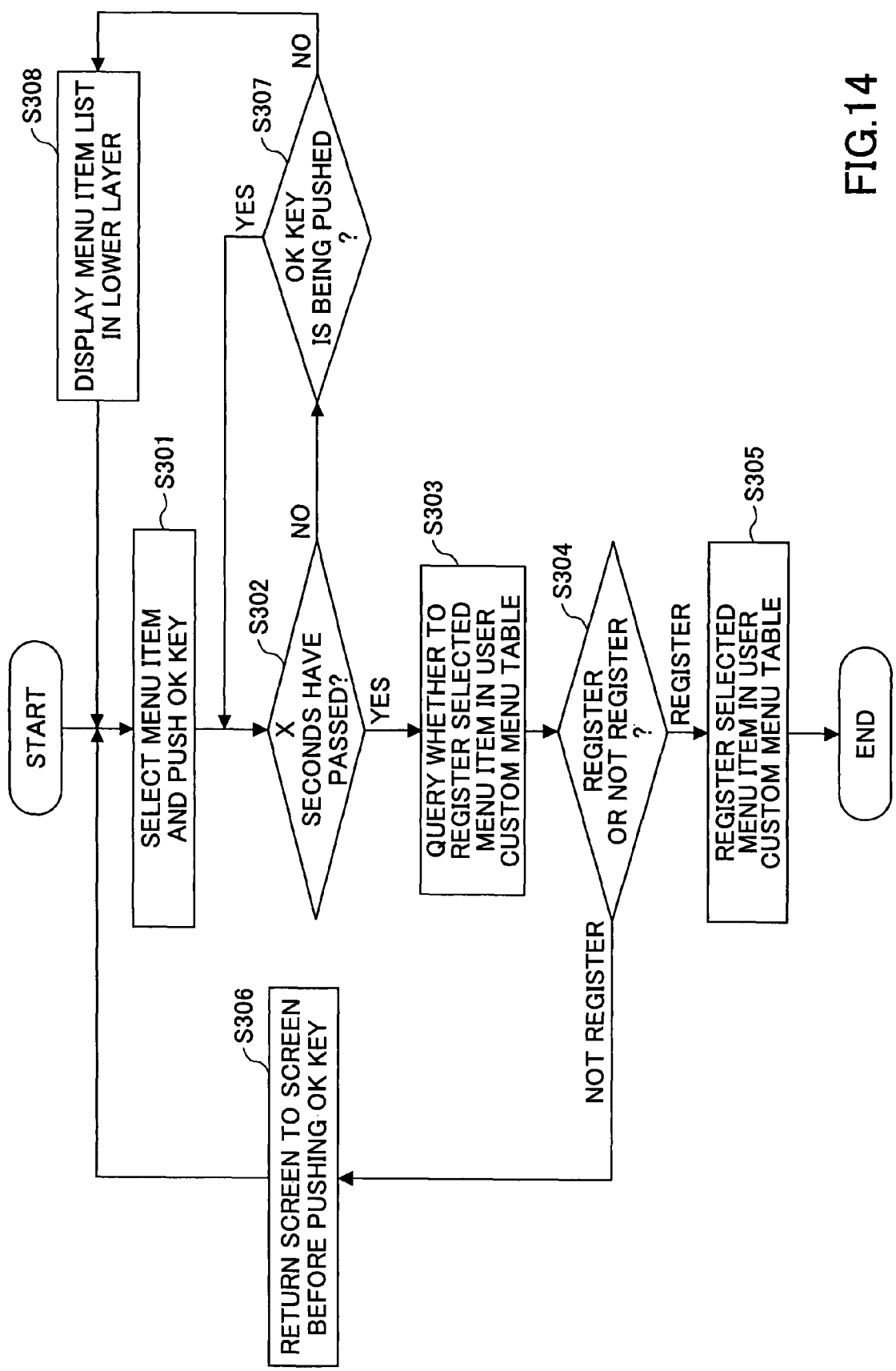
FIG. 14 is a flowchart showing third processes in the image forming apparatus according to the first embodiment of the present invention.
Figure 15:
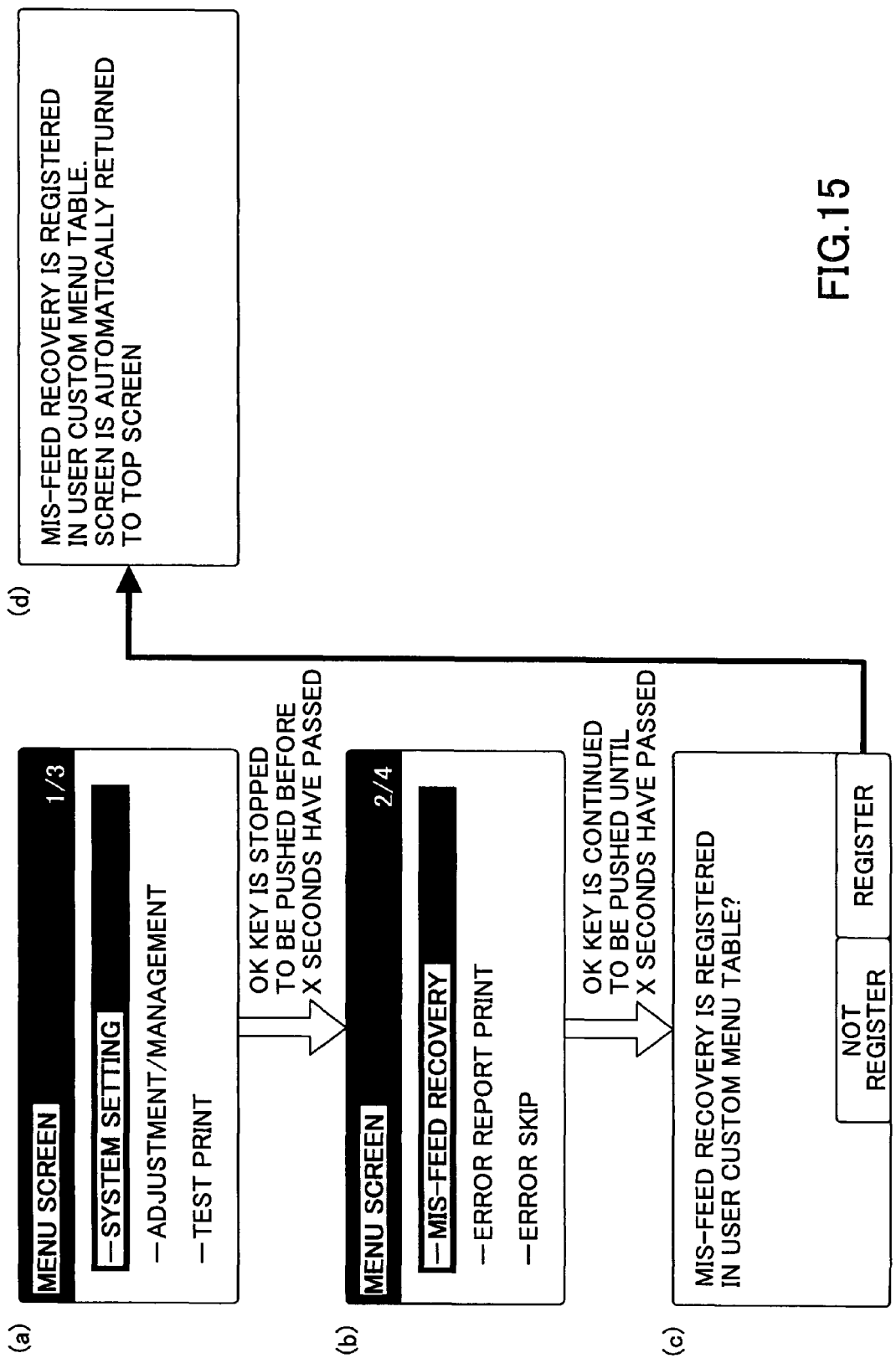
FIG. 15 is a diagram showing a screen change in the third processes shown in FIG. 14.

Referring to FIGS. 2 through 9, and 14 and 15, third processes in the image forming apparatus 1 according to the first embodiment of the present invention are described. FIG. 14 is a flowchart showing the third processes in the image forming apparatus 1 according to the first embodiment of the present invention. FIG. 15 is a diagram showing a screen change in the third processes.

First, referring to FIG. 14, the third processes in the image forming apparatus 1 according to the first embodiment of the present invention are described. In the second processes, when the user A registers a selected menu item in the user custom menu table, the registration key is used to register the selected menu item in the user custom menu table. In the third processes, a special key is used for registering the selected menu item in the user custom menu table. The special key can be pushed for a long period of time. Pushing time of the special key from the start of the push to the release from the push is measured. When the pushing time passes over (exceeds) a predetermined time, the selected menu item is registered in the user custom menu table, and when pushing the special key is stopped before passing over the predetermined time, the layer in the tree structure is moved to a lower layer or a process assigned to the menu item is executed. In the following description of the third processes, the operating section 20 is displaying menu items in any one of layers in the tree structure.

First, the user A selects a menu item on the operating section 20, and pushes an OK key (S301). The user A selects a menu item which the user A desires to register in a user custom menu table from the first layer of the menu tree. The operating section controller 120 receives information of the selected menu item and the push of the OK key.

The operating section controller 120 determines whether the OK key pushing time passes over X seconds (S302). When the OK key pushing time passes over X seconds (YES in S302), the operating section controller 120 queries the user A whether to register the selected menu item in the user custom menu table on the operating section 20 (S303). The operating section controller 120 determines whether a user A instruction is to register the selected menu item in the user custom menu table (S304). When the user A instruction is to register the selected menu item in the user custom menu table (REGISTER in S304), the user information managing section 170 registers the selected menu item in the user custom menu table of the user A in the user information storing section 184 (S305).

When the user A instruction is not to register the selected menu item in the user custom menu table (NOT REGISTER in S304), the operating section controller 120 returns the screen to the screen before pushing the key (S306), and the process returns to S301.

When the OK key pushing time does not pass over X seconds (NQ in S302), it is determined whether the OK key is being pushed (S307). When the OK key is being pushed (YES in S307), the process returns to S302. When the OK key is not being pushed (NO in S307), the operating section controller 120 displays a menu item list in a lower layer (the second layer) of the tree structure on the operating section 20 (S308). Then the process returns to S301.

As described above, by the third processes shown in FIG. 14, a menu item which is desired (selected) by the user A is registered in the user custom menu table of the user A by using a special key.

[Screen Change in Third Processes]

In FIG. 15, a menu screen at "START" in FIG. 14 is shown in FIG. 15(a). When the user A selects "SYSTEM SETTING" on the menu screen and the user A stops pushing the OK key before passing over X seconds (S301, NO in S302, and NO in S307), as shown in FIG. 15(b), a menu screen of the second layer is shown (S308). Then the process goes to S301 and when the user A selects "MIS-FEED RECOVERY" and pushes the OK key for over X seconds (YES in S302), as shown in FIG. 15 (c), "MIS-FEED RECOVERY IS REGISTERED IN USER CUSTOM MENU TABLE?" is displayed on the operating section 20 (S303). When the user A instruction is to register (REGISTER in S304), as shown in FIG. 15(d), "MIS-FEED RECOVERY IS REGISTERED IN USER CUSTOM MENU TABLE. SCREEN IS AUTOMATICALLY RETURNED TO TOP SCREEN" is displayed (S305).

In FIG. 15(d), it is displayed that the screen is automatically returned to the top screen; however, the screen can be changed to another screen.

As described above, the user A selects the menu item "MIS-FEED RECOVERY" which the user A desires to register and registers the menu item "MIS-FEED RECOVERY" in the user custom menu table of the user A. In the third processes, the special key is provided so that the OK key has a special function for determining the process. Pushing time of the OK key from the start of the push to the release from the push is measured. When the pushing time passes over X seconds, the selected menu item is registered in the user custom menu table, and when pushing the OK key is stopped before passing over X seconds, the layer in the tree structure is moved to a lower layer.

According to the third processes, when the user A continues to push the OK key while the menu screen is displayed, the user A can select a menu item and register the menu item in the user custom menu table of the user A.

[Fourth Processes in First Embodiment]

Figure 16:
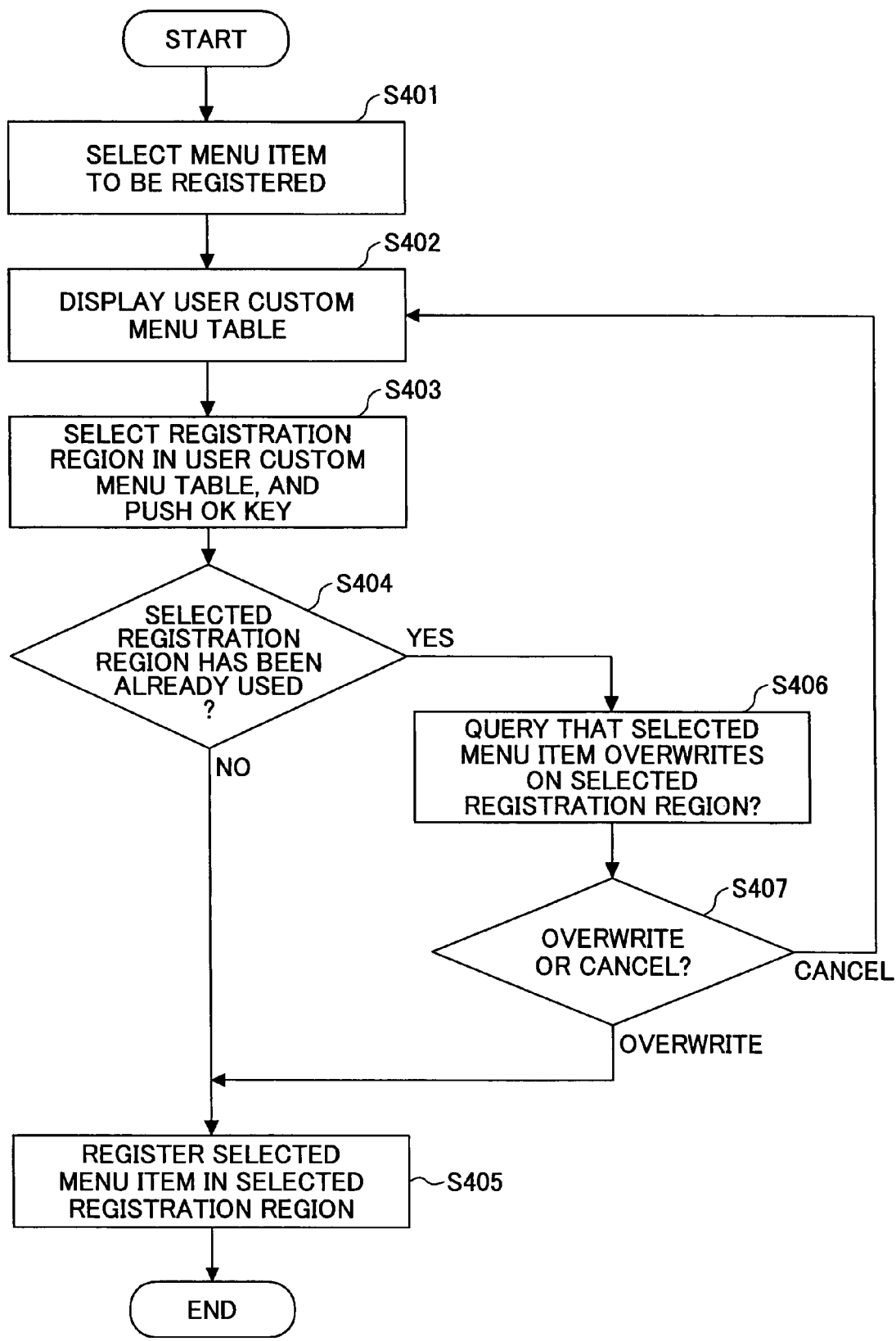
FIG. 16 is a flowchart showing fourth processes in the image forming apparatus according to the first embodiment of the present invention.
Figure 17:
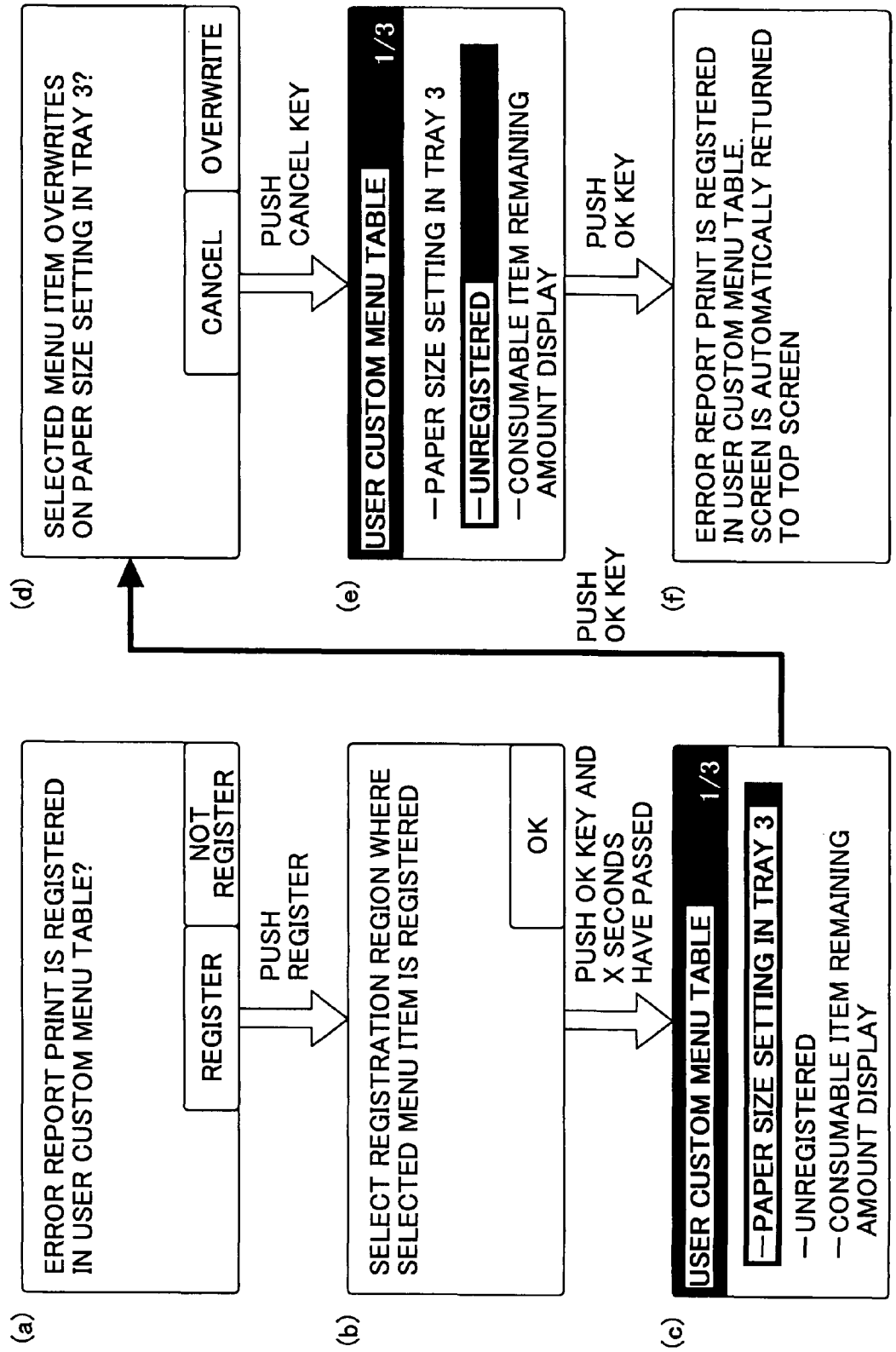
FIG. 17 is a diagram showing a screen change in the fourth processes shown in FIG. 16.

Referring to FIGS. 2 through 9, and 16 and 17, fourth processes in the image forming apparatus 1 according to the first embodiment of the present invention are described. FIG. 16 is a flowchart showing the fourth processes in the image forming apparatus 1 according to the first embodiment of the present invention. FIG. 17 is a diagram showing a screen change in the fourth processes.

First, referring to FIG. 16, the fourth processes in the image forming apparatus 1 according to the first embodiment of the present invention are described. In the second processes, the OK key and the registration key are provided, and in the third processes, the OK key having a special function is provided. In the fourth processes, after the user A selects a menu item to be registered, a registration region where the selected menu item is registered is determined.

First, the user A selects a menu item which the user A desires to register (S401). The menu item is selected by any one of the processes described in the first through third processes. The operating section controller 120 receives information of the selected menu item.

The operating section controller 120 displays the user custom menu table of the user A (S402). In detail, the user information managing section 170 extracts the user custom menu table from the user information storing section 184, and the operating section controller 120 displays the extracted user custom menu table including the registration regions on the operating section 20.

The user A selects a registration region in the user custom menu table on the operating section 20 and pushes the OK key (S403). The operating section controller 120 receives information of the selected registration region and the push of the OK key.

The user information managing section 170 determines whether the selected registration region has been already used in the user custom menu table (S404). When the selected registration region has not been used in the user custom menu table (NO in S404), the user information managing section 170 registers the selected menu item in the registration region selected in S403 (S405).

When the selected registration region has been already used in the user custom menu table (YES in S404), the operating section controller 120 queries the user A whether the selected menu item overwrites on the selected registration region on the operating section 20 (S406).

The operating section controller 120 determines whether a user A instruction is that the selected menu item overwrites on the selected registration region on the operating section 20 (S407). When the user A instruction is "OVERWRITE", the selected menu item is registered in the selected registration region (S405). When the user A instruction is "CANCEL", the process returns to S402.

As described above, in the fourth processes, after selecting a menu item to be registered, the registration region in the user custom menu table where the selected menu item is registered is determined.

[Screen Change in Fourth Processes]

First, a screen in S401 is shown in FIG. 17(a). In FIG. 17(a), for example, a menu item "ERROR REPORT PRINT" is selected and "ERROR REPORT PRINT IS REGISTERED IN USER CUSTOM MENU TABLE?" is displayed. The screen shown in FIG. 17(a) is similar to the screen shown in FIG. 15(c). When the user A selects "REGISTER", as shown in FIG. 17(b), "SELECT REGISTRATION REGION WHERE SELECTED MENU ITEM IS REGISTERED" is displayed, and the OK key is pushed. As shown in FIG. 17(b), a user custom menu table is displayed (S402) and a registration region where "PAPER SIZE SETTING IN TRAY 3" is selected (S403, YES in S404). Then "SELECTED MENU ITEM OVERWRITES ON REGISTRATION REGION OF PAPER SIZE SETTING IN TRAY 3?" is displayed as shown in FIG. 17(d) (S406). When the user A selects "CANCEL" (CANCEL in S407) and selects a second registration region in the user custom menu table and pushes the OK key (S402, S403), as shown in FIG. 17(e), a registration region of "UNREGISTERED" is selected (NO in S404). When the user A pushes the OK key, "ERROR REPORT PRINT IS REGISTERED IN USER CUSTOM MENU TABLE, SCREEN IS AUTOMATICALLY RETURNED TO TOP SCREEN" is displayed (S405).

In FIG. 17(f), it is displayed that the screen is automatically returned to the top screen; however, the screen can be changed to another screen.

As described above, the user A selects the menu item "ERROR REPORT PRINT" which the user A desires to register and registers the menu item "ERROR REPORT PRINT" in the user custom menu table of the user A. In the fourth processes, a registration region is selected in the user custom menu table where the user A desires to register the selected menu item.

According to the fourth processes, when the user A registers a desirable menu item in the user custom menu table, the user can select a registration region where the selected menu item is registered in the user custom menu table.

In the fourth processes, when a menu item is registered in the user custom menu table, the menu item can be selected after selecting a registration region in the user custom menu table.

[Fifth Processes in First Embodiment]

Figure 18:
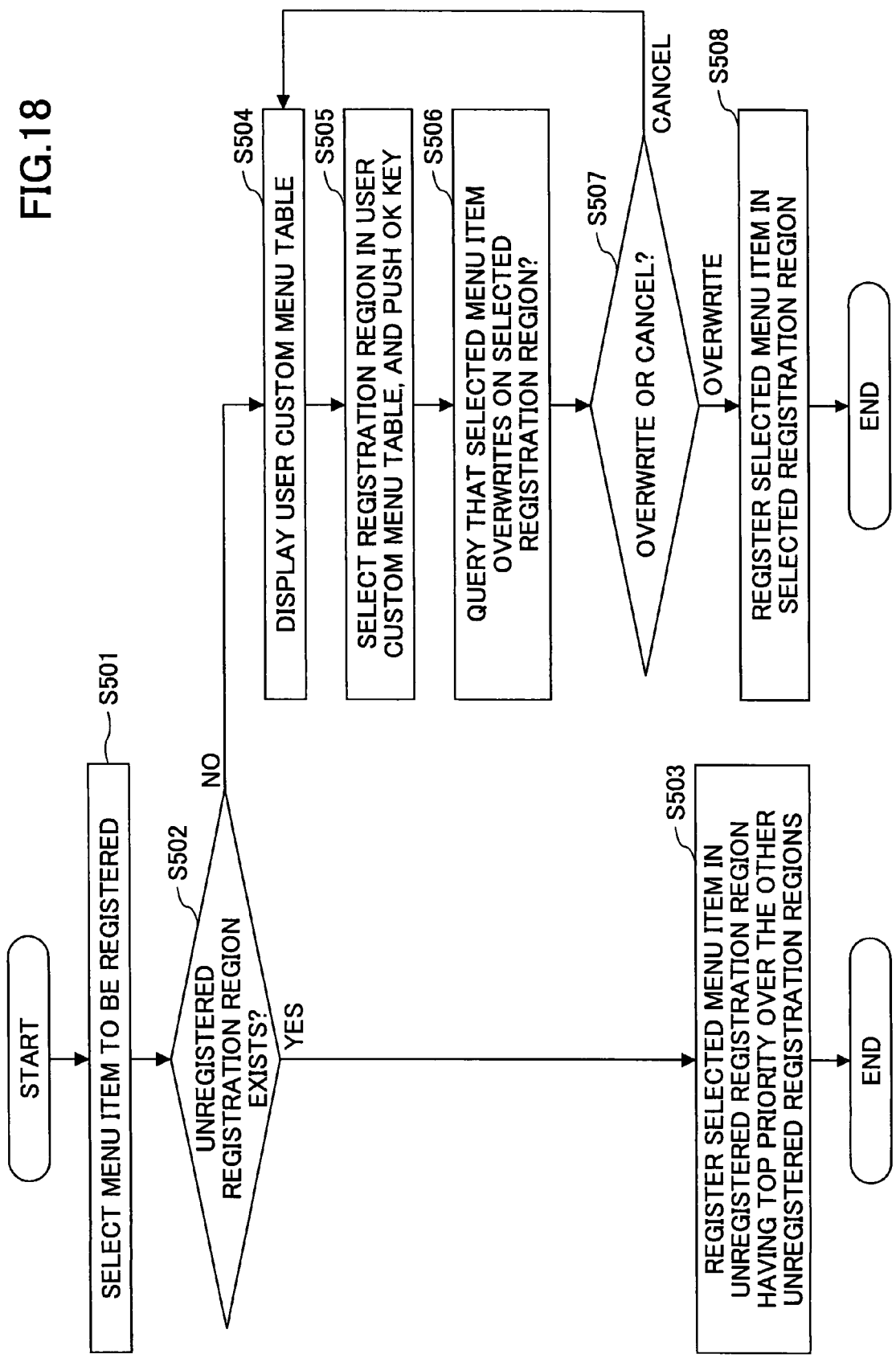
FIG. 18 is a flowchart showing fifth processes in the image forming apparatus according to the first embodiment of the present invention.
Figure 19:
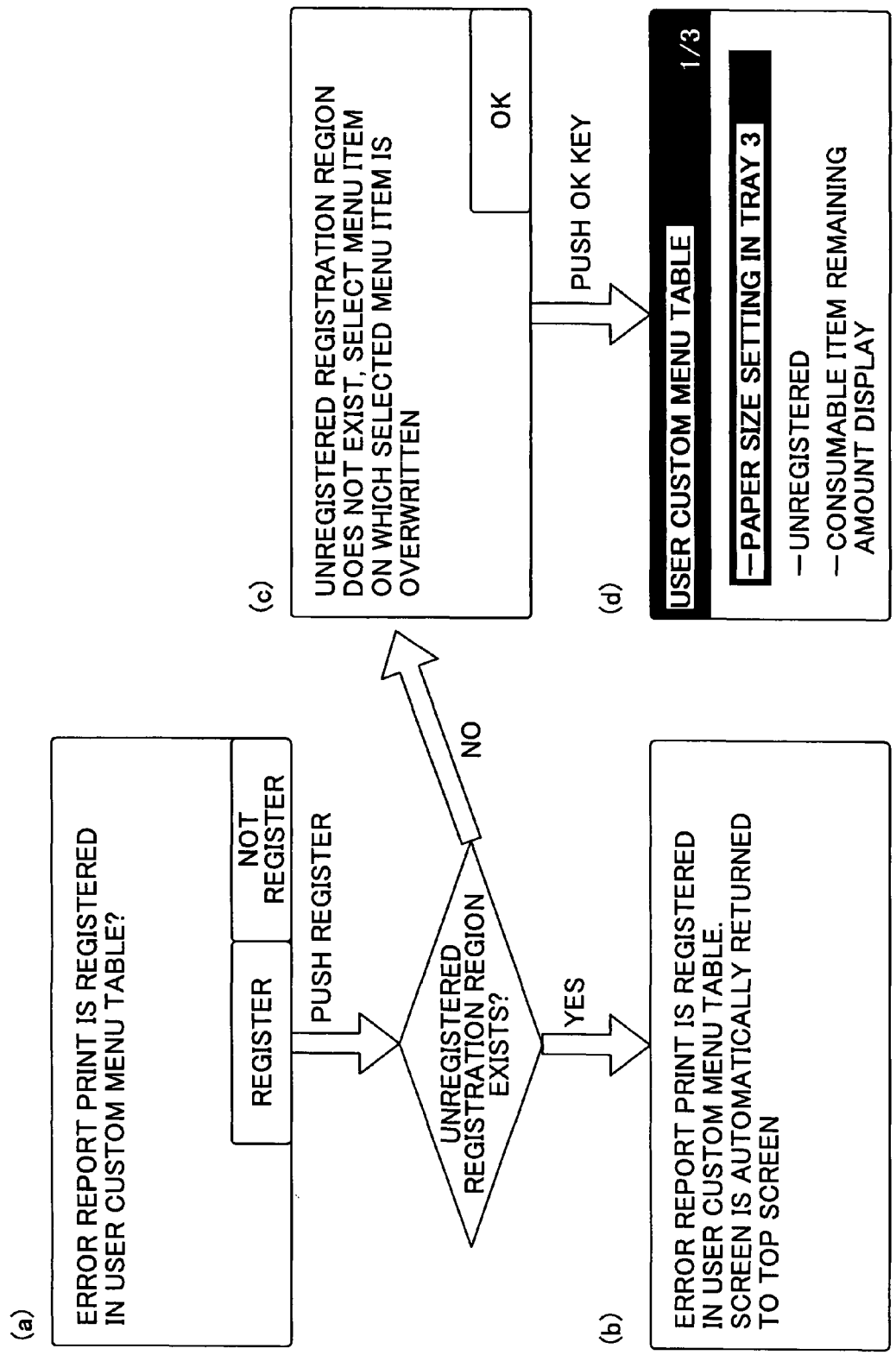
FIG. 19 is a diagram showing a screen change in the fifth processes shown in FIG. 18.

Referring to FIGS. 2 through 9, and 18 and 19, fifth processes in the image forming apparatus 1 according to the first embodiment of the present invention are described. FIG. 18 is a flowchart showing the fifth processes in the image forming apparatus 1 according to the first embodiment of the present invention. FIG. 19 is a diagram showing a screen change in the fifth processes.

First, referring to FIG. 18, the fifth processes in the image forming apparatus 1 according to the first embodiment of the present invention are described. In the fourth processes, a registration region in the user custom menu table is selected after selecting a menu item to be registered. In the fifth processes, after selecting a menu item which the user A desires to register, it is determined whether a registration region exists where the selected menu item is registered.

In FIG. 18, processes in S504 through S508 are the same as the processes in the corresponding S402, S403, S406, S407, and S405. Therefore, the same description is omitted.

First, the user A selects a menu item which the user A desires to register (S501). The menu item is selected by any one of the processes described in the first through third processes. The operating section controller 120 receives information of the selected menu item.

The user information managing section 170 determines whether an unregistered registration region exists in the user custom menu table (S502).

In detail, the user information managing section 170 determines whether an unregistered registration region exists by referring to the user custom menu table in the user information storing section 184. When an unregistered registration region exists (YES in S502), the user information managing section 170 registers the selected menu item in an unregistered registration region which has top priority over the other unregistered registration regions in displaying the selected menu item (S503).

When an unregistered registration region does not exist (NO in S502), the processes in S504 through S508 are executed. As described above, the processes are the same as those shown in FIG. 16; therefore, the same description is omitted.

[Screen Change in Fifth Processes]

Referring to FIGS. 18 and 19, a screen change in the fifth processes is described. First, a screen in S501 is shown in FIG. 19(a). In the screen shown in FIG. 19(a), "ERROR REPORT PRINT IS REGISTERED IN USER CUSTOM MENU TABLE?" is displayed, and when the user A pushes "REGISTER", it is determined whether an unregistered registration region exists (S502). When an unregistered registration region exists (YES in S502), as shown in FIG. 19(b), "ERROR REPORT PRINT IS REGISTERED IN USER CUSTOM MENU TABLE. SCREEN IS AUTOMATICALLY RETURNED TO TOP SCREEN" is displayed (S503).

When an unregistered registration region does not exist (NO in S502), as shown in FIG. 19(c), "UNREGISTERED REGISTRATION REGION DOES NOT EXIST, SELECT A MENU ITEM ON WHICH SELECTED MENU ITEM IS OVERWRITTEN" is displayed. When the user A pushes an OK key, as shown in FIG. 19(d), a user custom menu table is displayed, and when the user A selects "PAPER SIZE SETTING IN TRAY 3" on which the selected menu item is overwritten, the error report print overwrites on the paper size setting in tray 3.

In FIG. 19(b), it is displayed that the screen is automatically returned to the top screen; however, the screen can be changed to another screen.

As described above, the user A selects the menu item "ERROR REPORT PRINT" which the user A desires to register and registers the menu item "ERROR REPORT PRINT" in the user custom menu table of the user A by selecting an unregistered registration region or overwriting on a registration region where a menu item has been registered.

In the fifth processes, when an unregistered registration region exists, the user A does not need to intentionally select an unregistered registration region. That is, an unnecessary labor hour does not need.

[Sixth Processes in First Embodiment]

Figure 20:
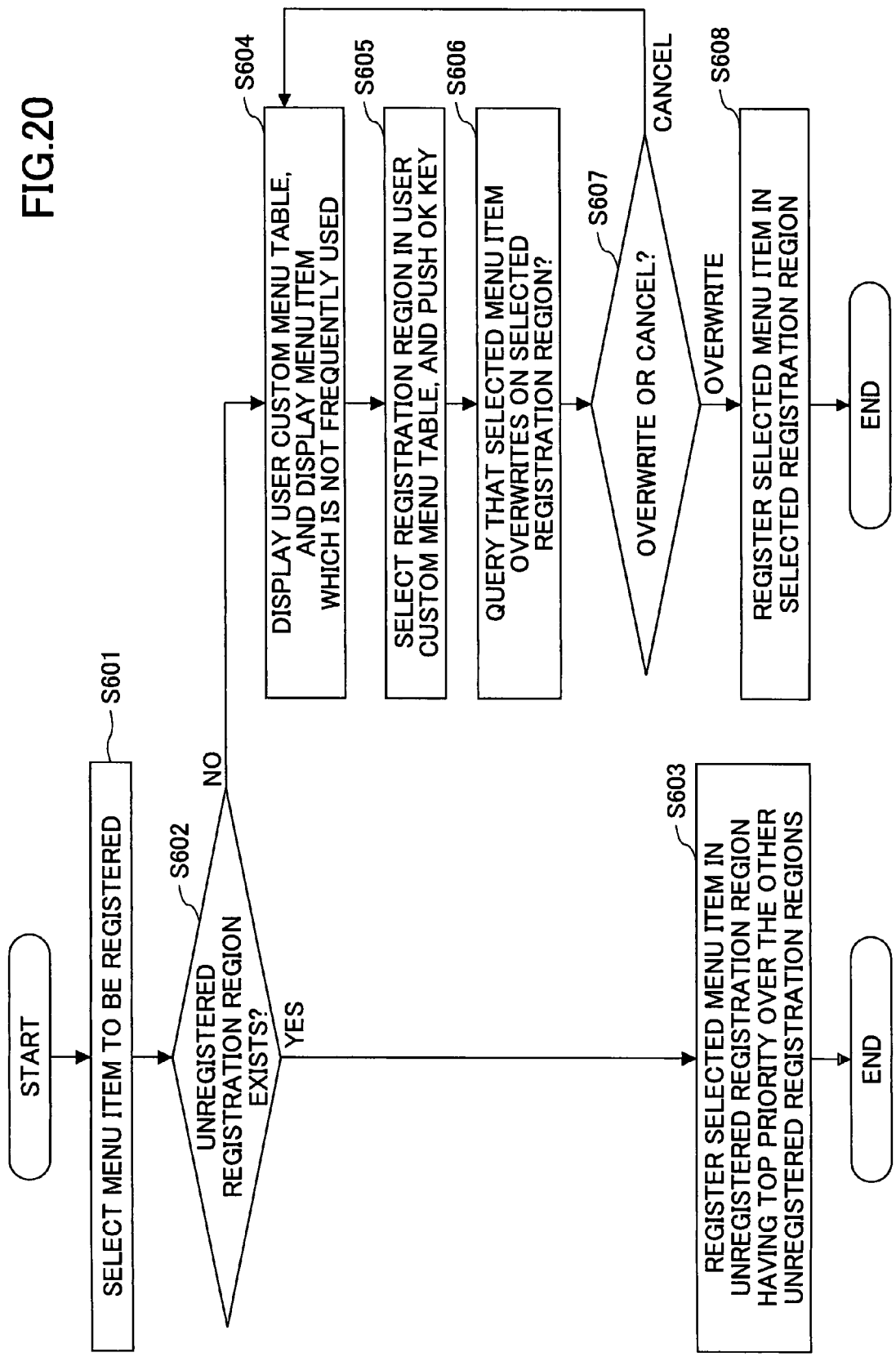
FIG. 20 is a flowchart showing sixth processes in the image forming apparatus according to the first embodiment of the present invention.
Figure 21:
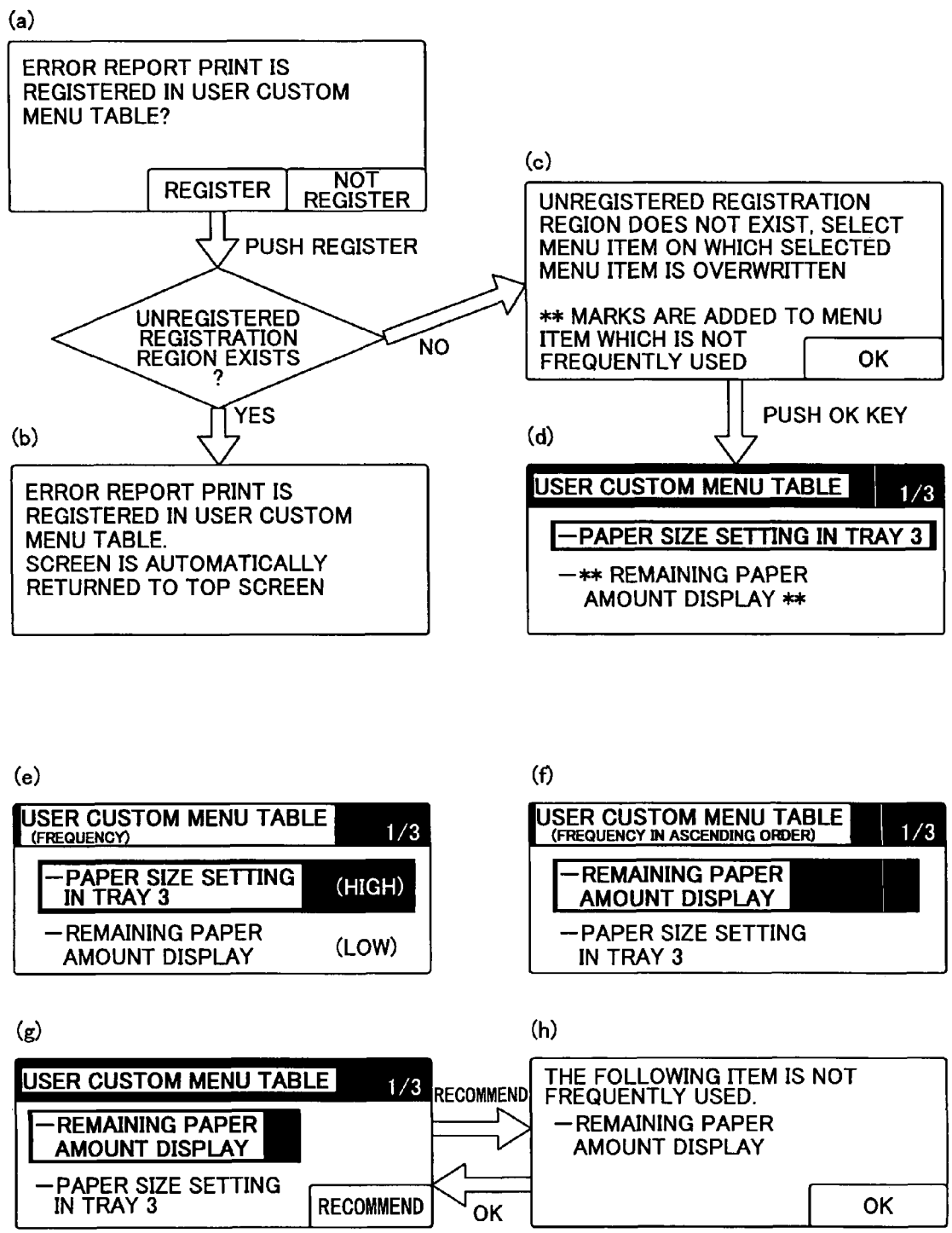
FIG. 21 is a diagram showing a screen change in the sixth processes shown in FIG. 20.

Referring to FIGS. 2 through 9, and 20, 21 and 22, sixth processes in the image forming apparatus 1 according to the first embodiment of the present invention are described. FIG. 20 is a flowchart showing the sixth processes in the image forming apparatus 1 according to the first embodiment of the present invention. FIG. 21 is a diagram showing a screen change in the sixth processes. FIG. 22 is a user custom menu table in the user information storing section 184 of the sixth processes.

First, referring to FIG. 18, the sixth processes in the image forming apparatus 1 according to the first embodiment of the present invention are described. In the fifth processes, it is determined whether an unregistered registration region exists after selecting a menu item to be registered. In the sixth processes, when an unregistered registration region does not exist, the user A is urged to select a menu item which is not frequently used in the user custom menu table, and a menu item to be registered is registered in the registration region of the menu item which is not frequently used in the user custom menu table. In FIG. 20, processes except for in S604 are the same as the processes except for in S504 shown in FIG. 18. Therefore, the same description is omitted.

When an unregistered registration region does not exist (NO in S602), the operating section controller 120 displays the user custom menu table of the user A, and displays a menu item which is not frequently used (S604). In detail, the user information managing section 170 extracts the user custom menu table of the user A from the user information storing section 184. The operating section controller 120 displays the extracted user custom menu table on the operating section 20.

As shown in FIG. 22, in the user custom menu table of the sixth processes, the number of used times (the number of times used) of each menu item is newly added. The number of used times of each menu item is counted by a counter. When the number of used times is low, even if a menu item whose number of used times is low is overwritten by the selected menu item, damage on the user A may be low.

[Screen Change in Sixth Processes]

Referring to FIGS. 20 and 21, a screen change in the sixth processes is described.

First, a screen in S601 is shown in FIG. 20(a). In the screen shown in FIG. 21(a), "ERROR REPORT PRINT IS REGISTERED IN USER CUSTOM MENU TABLE?", and when the user A pushes "REGISTER", it is determined whether an unregistered registration region exists (S602). When an unregistered registration region exists (YES in S502), as shown in FIG. 20(b), "ERROR REPORT PRINT IS REGISTERED IN USER CUSTOM MENU TABLE. SCREEN IS AUTOMATICALLY RETURNED TO TOP SCREEN" is displayed.

When an unregistered registration region does not exist (NO in S602), as shown in FIG. 21(c), "UNREGISTERED REGISTRATION REGION DOES NOT EXIST, SELECT MENU ITEM ON WHICH SELECTED MENU ITEM OVERWRITES, MENU ITEM WHOSE NUMBER OF USED TIMES IS LOW HAS MARKS OF " is displayed. When the user A pushes an OK key, a user custom menu table is displayed. In FIG. 21(d), a menu item whose number of used times is low is displayed with  marks.

In FIG. 21(b), it is displayed that the screen is automatically returned to the top screen; however, the screen can be changed to another screen.

When an unregistered registration region does not exist, a menu item is suggested on which the selected menu item overwrites.

In FIG. 21, instead of the screen shown in FIG. 21(d), any one of screens shown in FIG. 21(e), 21(f), and 21(g) can be used. In FIG. 21(e), the number of used times is shown by a letter of "HIGH" or "LOW", in FIG. 21(f), menu items are displayed in ascending order of the number of used times, and in FIG. 21(g), menu items whose number of used times is low are displayed.

In addition, in the sixth processes, the counter for counting the number of used times of each menu item is required and also a memory unit for storing the number of used times of each menu item is required.

In FIG. 22, when the user A registers a menu item in the user custom menu table, "0" is stored in the number of used times of the menu item. Each time when the menu item is used, the number of used times of the menu item is increased by "1". When a selected menu item overwrites on a menu item, the number of used times of the selected menu item is returned to "0", or when a menu item is deleted, the number of used times of the menu item is returned to "0".

In a case where a menu item is registered in the user custom menu table, when an unregistered registration region does not exist, the image forming apparatus 1 refers to the number of used times of each menu item and displays menu items in the user custom menu table in ascending order of the number of used times of the menu item.

[Seventh Processes in First Embodiment]

Figure 23:
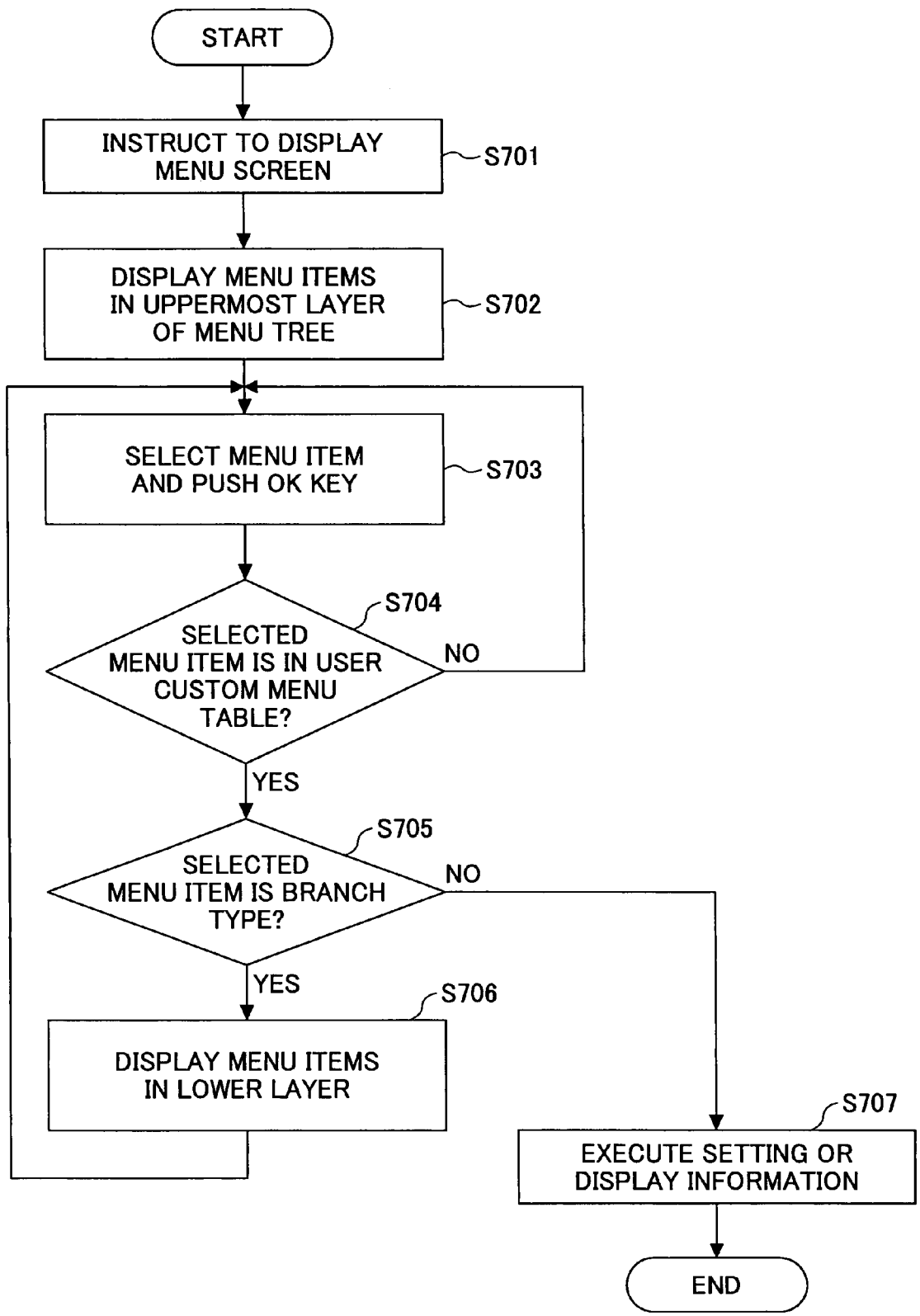
FIG. 23 is a flowchart showing seventh processes in the image forming apparatus according to the first embodiment of the present invention.
Figure 24:
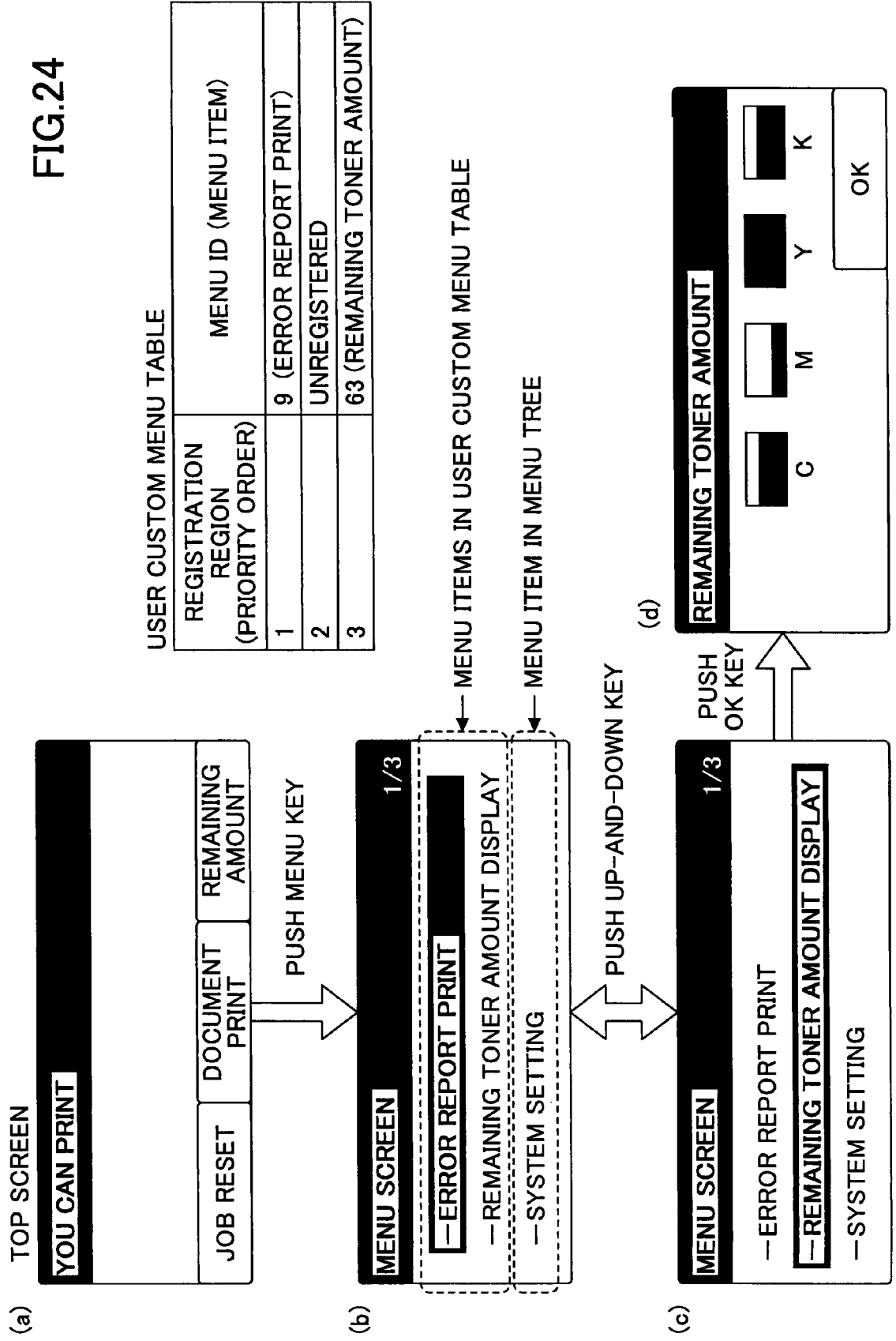
FIG. 24 is a diagram showing a screen change in the seventh processes shown in FIG. 23.

Referring to FIGS. 2 through 9, and 23 and 24, seventh processes in the image forming apparatus 1 according to the first embodiment of the present invention are described. FIG. 23 is a flowchart showing the seventh processes in the image forming apparatus 1 according to the first embodiment of the present invention. FIG. 24 is a diagram showing a screen change in the seventh processes.

First, referring to FIG. 23, the seventh processes in the image forming apparatus 1 according to the first embodiment of the present invention are described. In the seventh processes, the user A calls up a menu item registered in the user custom menu table.

First, the user A instructs to display a menu screen (S701). In detail, the user A instructs to display a menu screen by pushing a menu key on the operating section 20. The operating section controller 120 receives a menu screen displaying instruction.

The operating section controller 120 displays menu items in the user custom menu table and menu items in the uppermost layer of the tree structure (S702). In detail, the user information managing section 170 extracts menu items in the user custom menu table by referring to information in the user information storing section 184 and the menu managing section 160 extracts menu items in the uppermost layer from the menu item storing section 183.

The operating section controller 120 displays the menu items in the user custom menu table with priority over the menu items in the menu tree.

A menu item is selected on the operating section 20 and the OK key is pushed (S703). In detail, the user A selects a menu item from the menu items in the user custom menu table and in the uppermost layer and pushes the OK key. The operating section controller 120 receives the selected menu item and the push of the OK key.

The operating section controller 120 determines whether the selected menu item is a menu item in the user custom menu table (S704). When the selected menu item is in the user custom menu table (YES in S704), the operating section controller 120 determines whether the selected menu item is a branch type (S705). When the selected menu item is the branch type (YES in S705), menu items in the lower layer are displayed (S706). Then the process returns to S703.

When the selected menu item is not a menu item in the user custom menu table (NO in S704), the process returns to S703.

When the selected menu item is not the branch type (NO in S705), the setting of the selected menu item is executed or information of the selected menu item is displayed depending on the type of the selected menu item (S707).

As described above, in the seventh processes, a menu item in the user custom menu table of the user A can be called up.

[Screen Change in Seventh Processes]

Referring to FIGS. 23 and 24, a screen change in the seventh processes is described.

First, a screen at "START" in FIG. 23 is shown in FIG. 24(a). When the user A pushes a menu key (S701), a menu screen shown in FIG. 24(b) is displayed. In the menu screen shown in FIG. 24(b), menu items in the user custom menu table and menu items in the uppermost layer of the tree structure are displayed (S702). The user A selects a menu item in the menu screen shown in FIG. 24(b) by using an up-and-down key, then a menu screen shown in FIG. 24(c) is displayed, and the user A pushes an OK key (S703, YES in S704, and NO in S705). In this case, a menu item "TONER REMAINING AMOUNT" in the user custom menu table is displayed.

In the seventh processes, the custom menu item "TONER REMAINING AMOUNT" in the user custom menu table of the user A is called up.

As described above, in the seventh processes, a menu item in the user custom menu table can be called up by almost the same process as a menu item is selected form the menu tree. In addition, a special key for calling up a custom menu item is not required.

In the menu screen shown in FIG. 24(b), "UNREGISTERED" is not displayed. However, "UNREGISTERED" can be displayed.

[Modified Example 1 of Seventh Processes in First Embodiment]

Referring to FIG. 25, a modified example 1 of the seventh processes is described. FIG. 25 is a diagram showing a screen change in the modified example 1 of the seventh processes.

In a case where a menu item of an information displaying type is included in the user custom menu table, when a menu item in the user custom menu table is called up, as shown in FIG. 25, information of the called up menu item is displayed in a blank region of the top screen. The processes to select the menu item in the user custom menu table are the same as the processes shown in FIG. 23. Therefore, the description of the processes is omitted.

In the modified example 1 of the seventh processes, since a menu item of the information displaying type can be always displayed on the top screen, when a menu item which is frequently used by the user A is registered in the user custom menu table, the information of the menu item can be easily displayed.

A menu item of an information displaying type which is determined to be displayed on the top screen can remain or cannot remain on the menu screen of the user custom menu table.

[Modified Example 2 of Seventh Processes in First Embodiment]

Referring to FIG. 26, a modified example 2 of the seventh processes is described. FIG. 26 is a diagram showing a screen change in the modified example 2 of the seventh processes.

In the modified example 2 of the seventh processes, when plural menu items of the information displaying type are included in the user custom menu table and the plural menu items cannot be displayed at the same time, as shown in FIG. 26, the plural menu items are displayed one by one by using an up-and-down key. In FIG. 26, the remaining toner amount, the remaining paper amount, and the remaining photoconductor body service life are displayed one by one on the top screen.

In FIG. 26, the up-and-down key is used. However, another key or a touch panel or a combination of keys can be used instead of the up-and-down key for changing the information on the top screen. In addition, the changing order of the menu items is not limited to the order shown in FIG. 26, and the changing order can be in reverse.

Further, in FIG. 26, one menu item is displayed on one screen; however, when the blank region in the top screen is not sufficient to display one menu item, the menu item can be divided into plural parts and the plural parts are displayed one by one by using a key. Or when the blank region in the top screen is sufficient to display plural menu items at the same time, the plural menu items can be displayed on the top screen at the same time.

The processes from selecting a menu item in the user custom menu table to displaying the menu item are the same as those in the seventh processes; therefore, the same description is omitted.

In the modified example 2 of the seventh processes, since a menu items of the information displaying type can be always displayed on the top screen, when a menu item which is frequently used by the user A is registered in the user custom menu table, the menu item can be easily displayed. In addition, when plural menu items of the information displaying type are frequently used, the plural menu items can be displayed one by one by using a key. Or when information of one menu item is too large to be displayed on the black region of the top screen, the information can be displayed by being divided.

A menu item of an information displaying type which is determined to be displayed on the top screen can remain or cannot remain on a menu screen.

[Modified Example 3 of Seventh Processes in First Embodiment]

Referring to FIG. 27, a modified example 3 of the seventh processes is described. FIG. 27 is a diagram showing a screen change in the modified example 3 of the seventh processes.

In the modified example 3 of the seventh processes, when plural menu items of the information displaying type are included in the user custom menu table and the plural menu items cannot be displayed at the same time, as shown in FIG. 27, the plural menu items are displayed one by one at each time when a predetermined time (X seconds) has passed. In FIG. 27, the remaining toner amount, the remaining paper amount, and the remaining photoconductor body service life are displayed one by one on the top screen when a predetermined time (X seconds) has passed.

In FIG. 27, the changing order of the menu items is determined by the priority order. However the changing order is not limited to the priority order. The changing order can be instructed by the user A. In this case, a menu screen for changing the displaying order of the menu items is provided.

Further, in FIG. 27, one menu item is displayed on one screen; however, when the blank region in the top screen is not sufficient to display one menu item, the menu item can be divided into plural parts and the plural parts are displayed one by one at each time when the predetermined time has passed. Or when the blank region in the top screen is sufficient to display plural menu items at the same time, the plural menu items can be displayed on the top screen at the same time.

The processes from selecting a menu item in the user custom menu table to displaying the menu item are the same as those in the seventh processes; therefore, the same description is omitted.

In the modified example 3 of the seventh processes, since a menu items of the information displaying type can be always displayed on the top screen, when a menu item which is frequently used by the user A is registered in the user custom menu table, the menu item can be easily displayed. In addition, when plural menu items of the information displaying type are frequently used, the plural menu items can be displayed one by one at each time when a predetermined time has passed. Or when information of one menu item is too large to be displayed on the black region of the top screen, the information can be displayed by being divided.

A menu item of an information displaying type which is determined to be displayed on the top screen can remain or not remain on a menu screen.

[Modified Example 4 of Seventh Processes in First Embodiment]

Referring to FIG. 28, a modified example 4 of the seventh processes is described. FIG. 28 is a diagram showing a screen change in the modified example 4 of the seventh processes.

In the modified examples 2 and 3, when the plural menu items of the information displaying type are included in the user custom menu table, the plural menu items are displayed one by one by using a key or each time when a predetermined time has passed. In the modified example 4, the plural menu items are displayed one by one by settings of the user A.

In the modified example 4, as shown in FIG. 28(a), "CUSTOM MENU OPTION" is provided in a menu screen. When the user A pushes the OK key on the menu screen shown in FIG. 28(a), as shown in FIG. 28(b), a menu screen is displayed in which "HANDLING OF INFORMATION DISPLAYING TYPE MENU ITEM" is displayed. When the user selects "HANDLING OF INFORMATION DISPLAYING TYPE MENU ITEM" on the menu screen shown in FIG. 28(b) and pushes the OK key, as shown in FIG. 28(c), a screen of "HANDLING OF INFORMATION DISPLAYING TYPE MENU ITEM" is displayed. Then when the user A selects one item on the screen of "HANDLING OF INFORMATION DISPLAYING TYPE MENU ITEM", the user A can selects one of the seventh processes including the modified example 1, the modified example 2, or the modified example 3 of the seventh processes.

In the modified example 4 of the seventh processes, the user A can arbitrarily select processes from the seventh processes, the modified example 1, the modified example 2, or the modified example 3 of the seventh processes by an instruction of the user A.

A menu item of an information displaying type which is determined to be displayed on the top screen can remain or not remain on a menu screen.

[Eighth Processes in First Embodiment]

Figure 29:
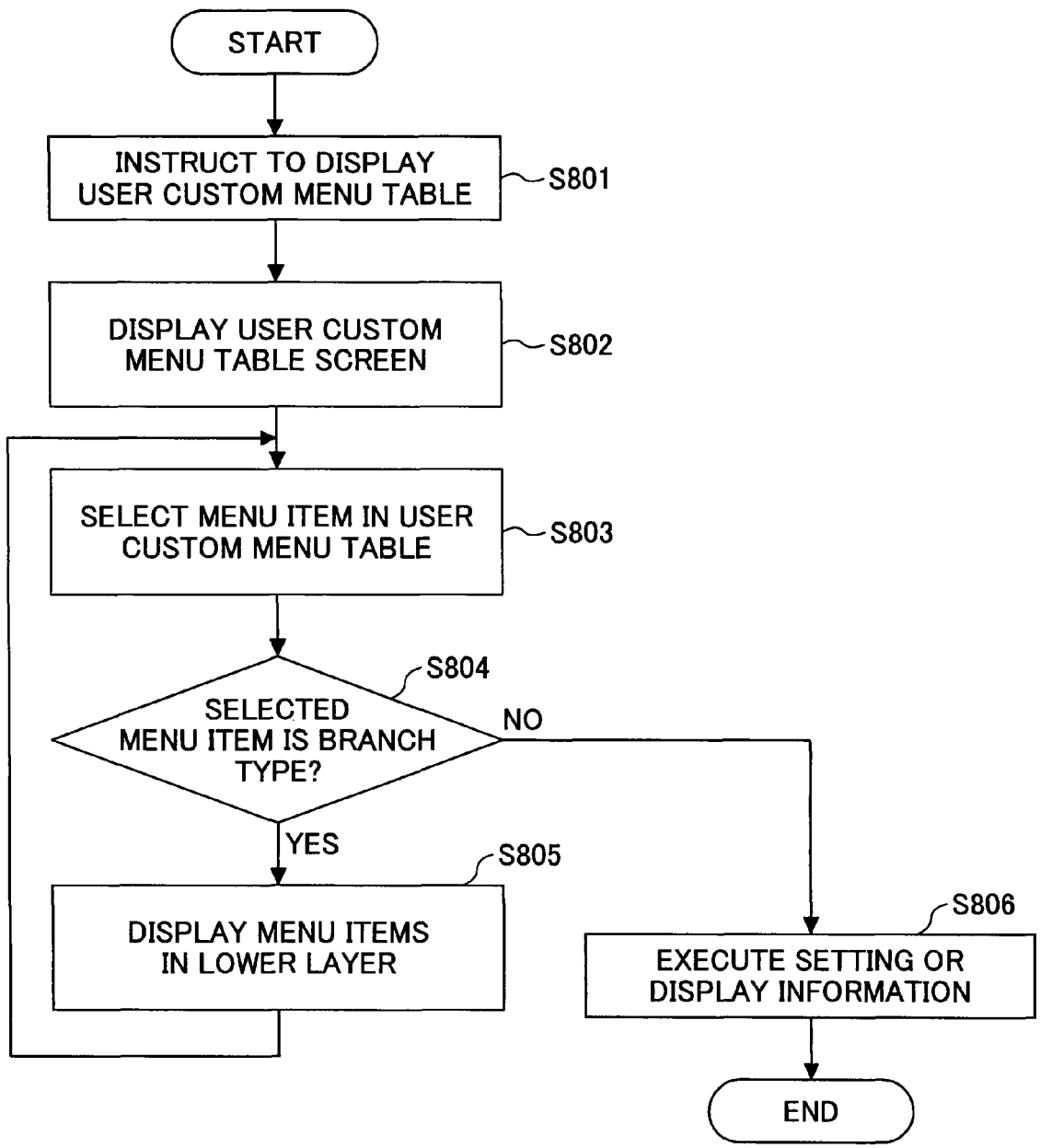
FIG. 29 is a flowchart showing eighth processes in the image forming apparatus according to the first embodiment of the present invention.
Figure 30:
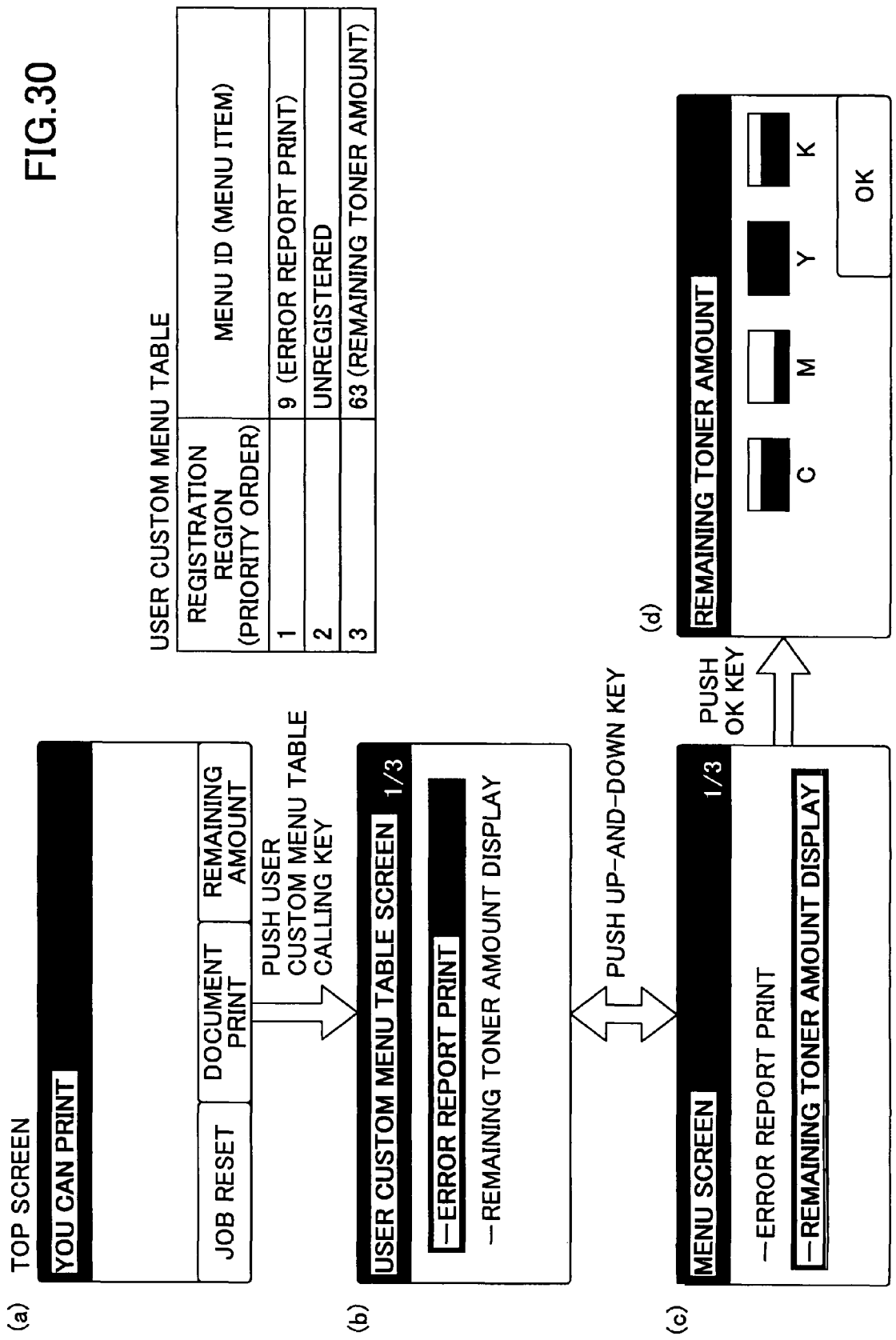
FIG. 30 is a diagram showing a screen change in the eighth processes shown in FIG. 29.

Referring to FIGS. 2 through 9, and 29 and 30, eighth processes in the image forming apparatus 1 according to the first embodiment of the present invention are described. FIG. 29 is a flowchart showing the eighth processes in the image forming apparatus 1 according to the first embodiment of the present invention. FIG. 30 is a diagram showing a screen change in the eighth processes.

First, referring to FIG. 29, the eighth processes in the image forming apparatus 1 according to the first embodiment of the present invention are described.

In the seventh processes, in a case where the user A calls up menu items registered in the user custom menu table, when a menu screen is displayed by pushing a menu key, the menu items registered in the user custom menu table are displayed with priority over menu items described in the menu tree. In the eighth processes, when a user custom menu table screen is displayed, menu items in the user custom menu table are displayed in the priority order of the menu items.

In FIG. 29, processes from S804 through S806 are the same as the corresponding processes from S705 through S707 shown in FIG. 23 of the seventh processes. Therefore, the same description is omitted.

First, the user A instructs to display a user custom menu table by pushing a user custom menu table calling key (S801). In detail, the user A instructs to display a user custom menu table by pushing a key on the operating section 20. The operating section controller 120 receives the instruction for displaying the user custom menu table.

The operating section controller 120 displays the user custom menu table screen on the operating section 20 (S802). In detail, the user information managing section 170 extracts menu items from the user custom menu table stored in the user information storing section 184. The operating section controller 120 displays the extracted menu items in the user custom menu table screen on the operating section 20. The menu items are displayed in the priority order in the user custom menu table (FIG. 30).

The user A selects a menu item on the operating section 20 and pushes the OK key (S803). The operating section controller 120 receives information of the selected menu item and the push of the OK key.

In the processes from S801 through S803, the menu items in the user custom menu table are displayed in the priority order in the user custom menu table.

[Screen Change in Eighth Processes]

Referring to FIGS. 29 and 30, a screen change in the eighth processes is described.

First, a screen at "START" in FIG. 29 is shown in FIG. 30(a). When the user A pushes a user custom menu table calling key (S801), as shown in FIG. 30 (b), a user custom menu table screen is displayed. When the user A selects a menu item by using an up-and-down key, a screen shown in FIG. 30 (c) is displayed. When the user A pushes the OK key (S803), as shown in FIG. 30(d), the selected menu item is displayed (NO in S804, S807). In this case, the remaining toner amount is displayed.

In the eighth processes, menu items registered in the user custom menu table are displayed.

In addition, in the eighth processes, the menu items are displayed in the priority order in user custom menu table.

In the eighth processes, a user custom menu table can be displayed even if the image forming apparatus 1 is displaying another screen.

On the menu screen shown in FIG. 30(c), "UNREGISTERED" in the user custom menu table is not displayed. However, "UNREGISTERED" can be displayed so as to report that a menu item is not registered in the registration region 2. In this case, when the user A selects "UNREGISTERED" and pushes the OK key, the mode is changed to the custom menu registration mode.

As described above, in the eighth processes, in order that the user A instructs to display the user custom menu table, the user custom menu table calling key is provided. When the user A pushes the user custom menu table calling key, the user custom menu table is displayed and the user A can select a custom menu item from the user custom menu table.

The user custom menu table calling key is not limited to a special key, and can be another key, a touch panel, a combination of keys, or a combination of a key and the touch panel.

[Ninth Processes in First Embodiment]

Figure 31:
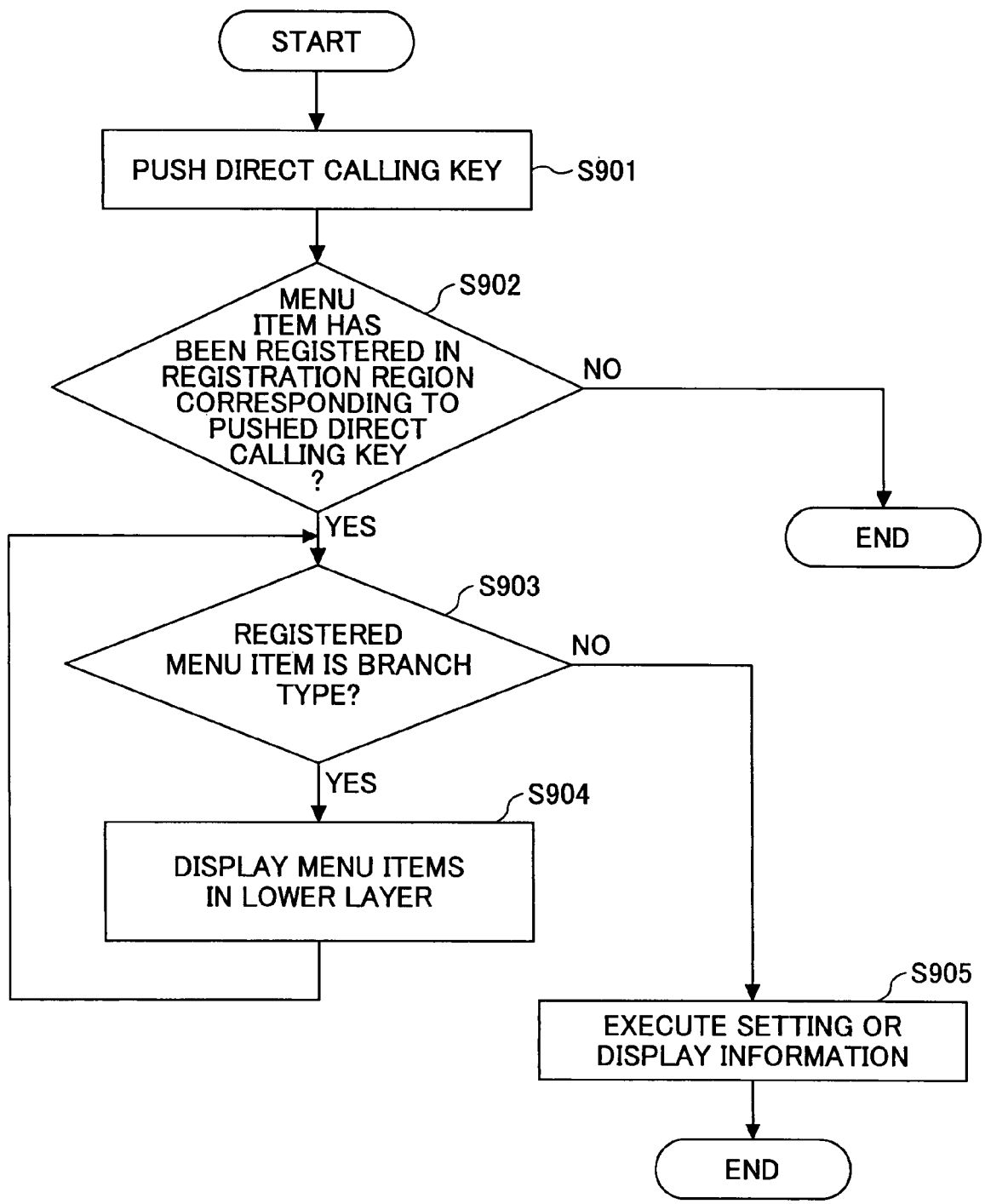
FIG. 31 is a flowchart showing ninth processes in the image forming apparatus according to the first embodiment of the present invention.
Figure 32:
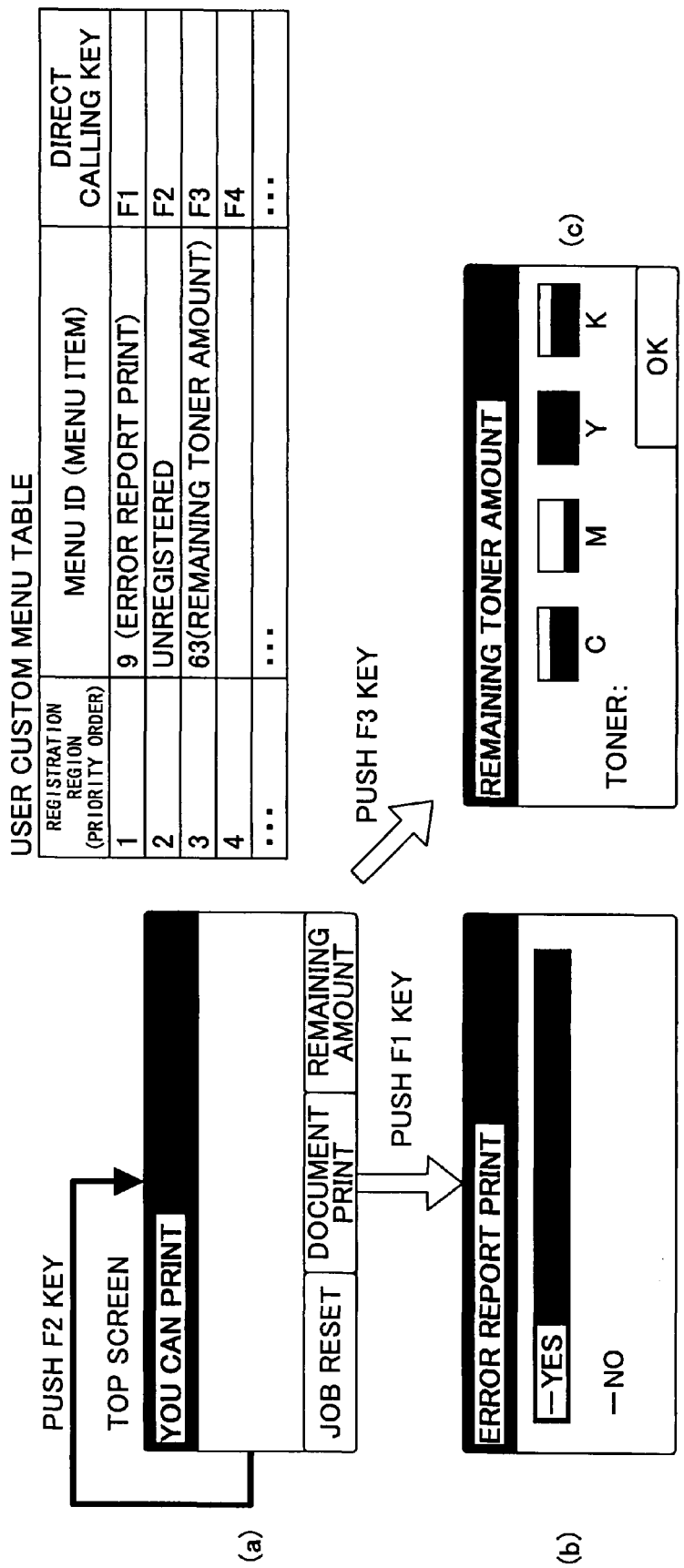
FIG. 32 is a diagram showing a screen change in the ninth processes shown in FIG. 31.

Referring to FIGS. 2 through 9, and 31 and 32, ninth processes in the image forming apparatus 1 according to the first embodiment of the present invention are described. FIG. 31 is a flowchart showing the ninth processes in the image forming apparatus 2 according to the first embodiment of the present invention. FIG. 32 is a diagram showing a screen change in the ninth processes.

First, referring to FIG. 31, the ninth processes in the image forming apparatus 1 according to the first embodiment of the present invention are described.

In the ninth processes, a menu item registered in the user custom menu table is selected by pushing a direct calling key.

In FIG. 31, processes from S903 through S905 are the same as the corresponding processes from S705 through S707 shown in FIG. 23 of the seventh processes. Therefore, the same description is omitted.

First, the user A pushes a direct calling key on the operating section 20 (S901). The operating section controller 120 receives information of the push of the direct calling key. The direct calling key is, for example, a function key F1 or F2, and one key is set for each menu item in the user custom menu table. The direct calling key is described in detail in FIG. 32.

The operating section controller 120 determines whether a menu item is registered in a registration region corresponding to the pushed direct calling key in the user custom menu table (S902). When a menu item is registered in a registration region corresponding to the pushed direct calling key in the user custom menu table (YES in S902), the process goes to S903. When a custom menu item is not registered in a registration region corresponding to the pushed direct calling key in the user custom menu table (NO in S902), the process ends.

In detail, the user information managing section 170 determines whether a menu item is registered in a registration region corresponding to the pushed direct calling key in the user custom menu table stored in the user information storing section 184, and sends the determined result to the operating section controller 120.

By the processes described above, a menu item is called up from the user custom menu table by pushing the direct calling key.

[Screen Change in Ninth Processes]

Referring to FIGS. 31 and 32, a screen change in the ninth processes is described.

First, a screen at "START" in FIG. 31 is shown in FIG. 32(a). When the user A pushes the direct calling key, for example, a F1 key (S901), since the F1 key corresponds to "ERROR REPORT PRINT" and "ERROR REPORT PRINT" is not a branch type (YES in S902, NO in S903, S905), as shown in FIG. 32(b), "ERROR REPORT PRINT" is displayed. When a F2 key is pushed in the screen shown in FIG. 32(a) (S901, NO in S902), the screen shown in FIG. 32(a) stays as it is. When a F3 key is pushed in the screen shown in FIG. 32(a) (S901, YES in S902, NO in S903), a screen shown in FIG. 32(c) is displayed. In FIG. 32(c), "REMAINING TONER AMOUNT" is displayed.

In the ninth processes, a menu item registered in the user custom menu table can be displayed by pushing the direct calling key. In this case, custom menu items, setting of "ERROR REPORT PRINT" and "REMAINING TONER AMOUNT", can be called.

In the ninth processes, a menu item can be called up even if the image forming apparatus 1 is displaying another screen. In addition, when a menu item is registered in the user custom menu table, the menu item can be called by one click of the direct calling key.

In the ninth processes, when plural hard keys are provided and one of the plural hard keys is pushed, a menu item connecting to the pushed hard key is displayed. In order to realize the above, the user custom menu table is expanded, a direct calling key region is provided in the expanded user custom menu table, and a direct calling key in the direct calling key region is directly connected to each menu item.

In the ninth processes, as the direct calling keys, hard keys such as the F1 key, the F2 key, and the F3 key are used. However, the direct calling key can be one item on a touch panel. In addition, a method allocating a hard key to a direct calling key is not limited to the above, and the user A can arbitrarily allocate a hard key to a direct calling key.

In the ninth processes; when a menu item is not registered in a registration region corresponding to the pushed direct calling key in the user custom menu table (NO in S902), the process ends. However, as described in the first processes, when a menu item is not registered in the user custom menu table, the screen can be changed to the custom menu registration mode. In this case, the user A can register another menu item in the user custom menu table.

[Tenth Processes]

Figure 33:
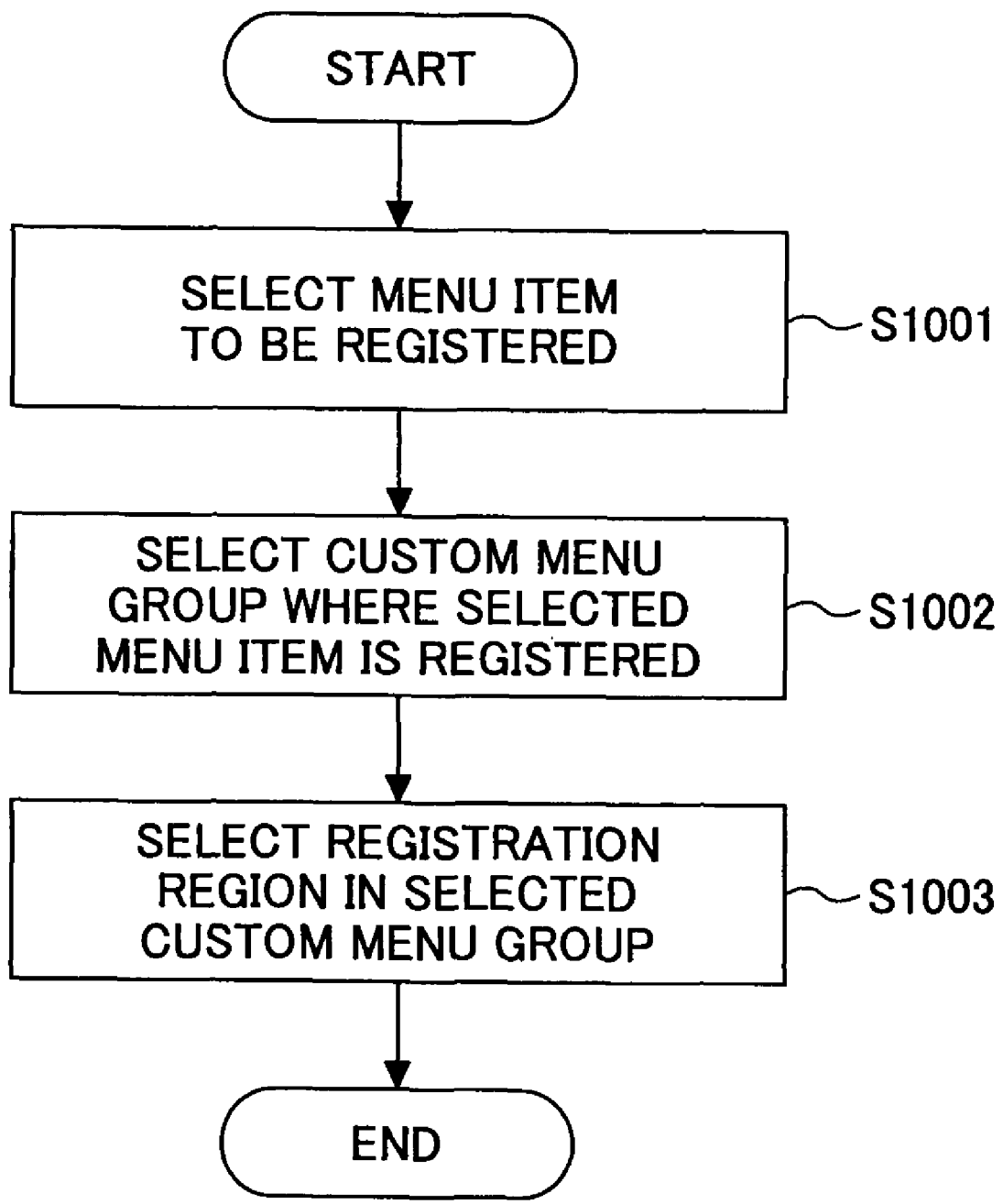
FIG. 33 is a flowchart showing tenth processes in the image forming apparatus according to the first embodiment of the present invention.
Figure 34:
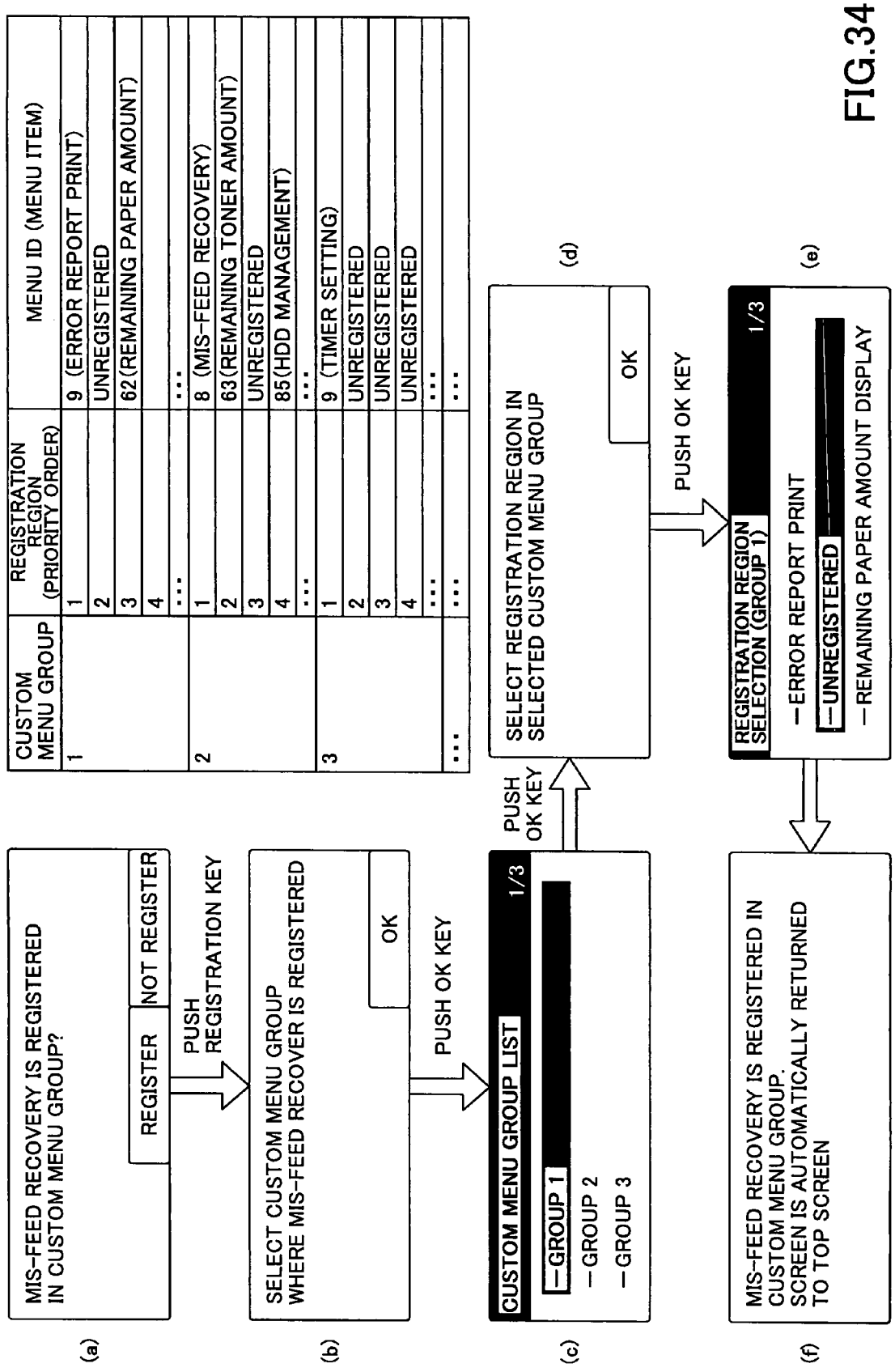
FIG. 34 is a diagram showing a screen change in the tenth processes shown in FIG. 33.

Referring to FIGS. 2 through 9, and 33 and 34, tenth processes in the image forming apparatus 1 according to the first embodiment of the present invention are described. FIG. 33 is a flowchart showing the tenth processes in the image forming apparatus 1 according to the first embodiment of the present invention. FIG. 34 is a diagram showing a screen change in the tenth processes.

First, referring to FIG. 33, the tenth processes in the image forming apparatus 1 according to the first embodiment of the present invention are described. In the tenth processes, user custom menu tables are classified into several custom menu groups and a menu item is registered in one of the custom menu groups.

First, the user A selects a menu item which the user A desires to register (S1001). In this, a menu item to be registered is selected by using any one of the methods described in the first through third processes. The operating section controller 120 receives information of the selected menu item.

Next, a custom menu group where the selected menu item is registered is selected (S1002). In detail, the user information managing section 170 extracts a custom menu group list from the user information storing section 184. The operating section controller 120 displays the extracted custom menu group list on the operating section 20. The user A selects one of the custom menu groups in the custom menu group list by using an up-and-down key and pushes an OK key. The operating section controller 120 receives information of the selected custom menu group and the push of the OK key.

A registration region in the selected custom menu group is selected (S1003). In this, a registration region is selected by using any one of the methods described in the fourth through sixth processes. The operating section controller 120 receives information of the selected menu item.

In the tenth processes, the menu items are registered in the corresponding custom menu groups.

[Screen Change in Tenth Processes]

Referring to FIGS. 33 and 34, a screen change in the tenth processes is described.

First, a screen shown in S1001 of FIG. 33 is shown in FIG. 34(a). In the screen shown in FIG. 34(a), for example, "MIS-FEED RECOVERY IS REGISTERED IN CUSTOM MENU GROUP?" is displayed. When the user A pushes "REGISTER", a screen shown in FIG. 34(b) is displayed. In the screen shown of FIG. 34(b), "SELECT CUSTOM MENU GROUP WHERE MIS-FEED RECOVERY IS REGISTERED" is displayed. When the user A pushes an OK key, as shown in FIG. 34(c), a screen of "CUSTOM MENU GROUP LIST" is displayed and the user A selects one of the custom menu groups (in this case, group 1) (S1002). When the user A pushes the OK key, as shown in FIG. 34(d), a screen "SELECT REGISTRATION REGION IN SELECTED CUSTOM MENU GROUP" is displayed. When the user A pushes the OK key, as shown in FIG. 34(e), a screen "REGISTRATION REGION SELECTION [GROUP 1]" is displayed. When the user A selects a registration region of "UNREGISTERED" (S1003), a screen show in FIG. 34(f) is displayed. In the screen shown in FIG. 34(f), "MIS-FEED RECOVERY IS REGISTERED IN CUSTOM MENU GROUP. SCREEN AUTOMATICALLY RETURNS TO TOP SCREEN" is displayed.

In the above processes, "MIS-FEED RECOVERY" is registered in the custom menu group 1.

In the tenth processes, the user A can classify menu items into corresponding custom menu groups.

In the tenth processes, after selecting a menu item to be registered, a custom menu group where the selected menu item is registered is selected. However, when the custom menu registration mode is provided, the custom menu group can be selected right after changing to the custom menu registration mode.

In the tenth processes, as the name of the custom menu group, for example, the group 1 or the group 2 is used. However, the user A can arbitrarily change the name of the group. In this case, a region for changing the name of the custom menu group is provided in the custom menu group.

[Eleventh Processes in First Embodiment]

Figure 35:
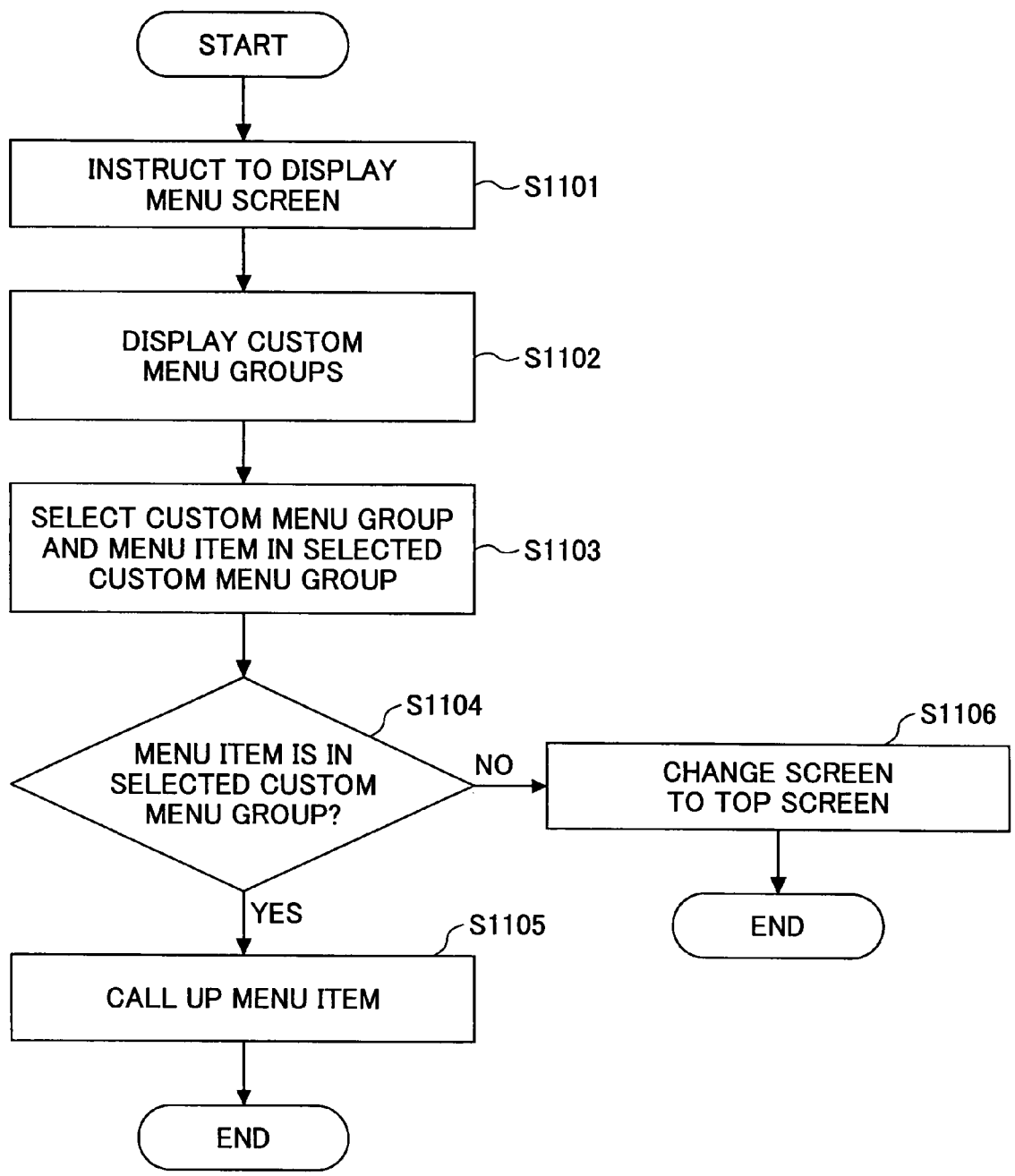
FIG. 35 is a flowchart showing eleventh processes in the image forming apparatus according to the first embodiment of the present invention.
Figure 36:
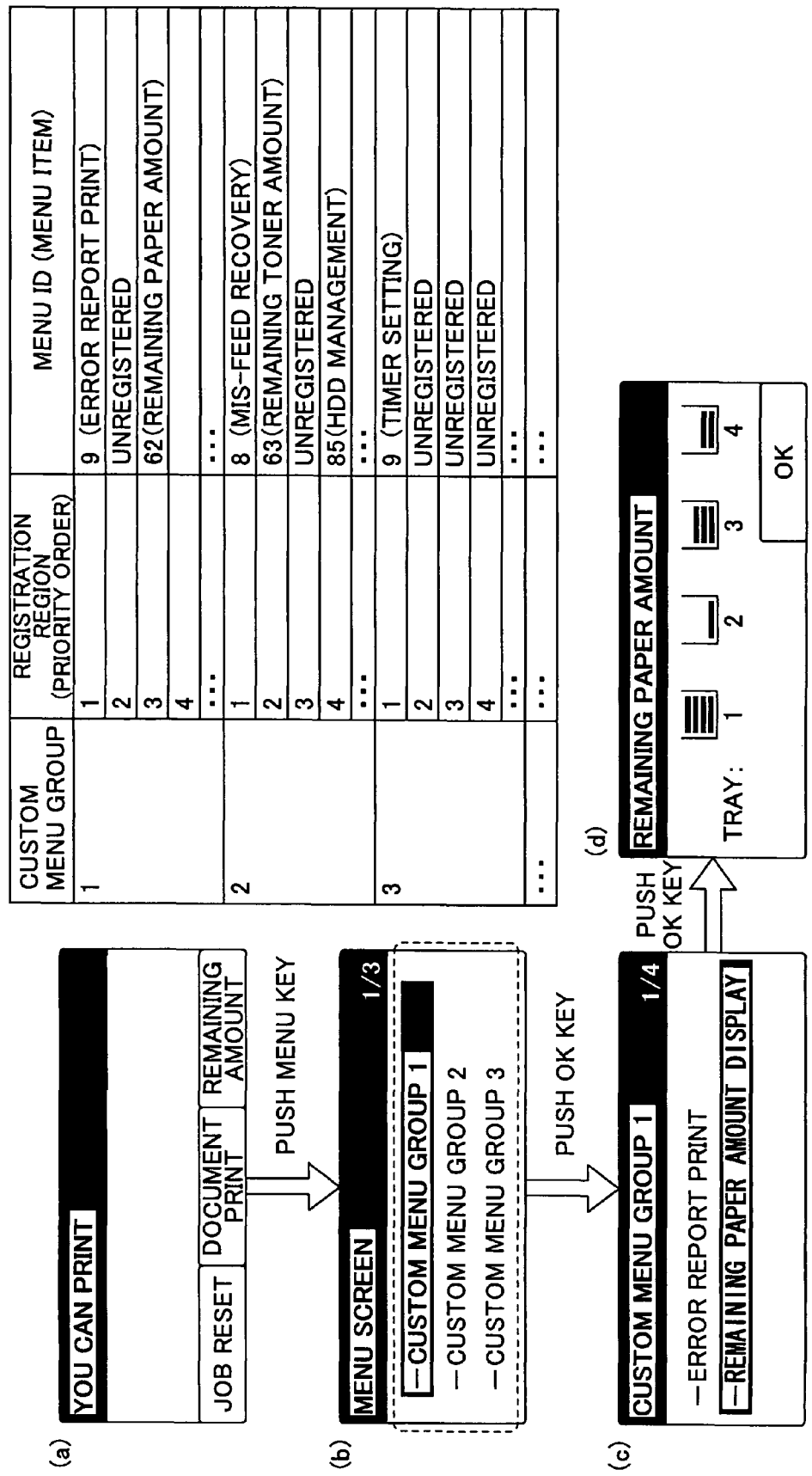
FIG. 36 is a diagram showing a screen change in the eleventh processes shown in FIG. 35.

Referring to FIGS. 2 through 9, and 35 and 36, eleventh processes in the image forming apparatus 1 according to the first embodiment of the present invention are described. FIG. 35 is a flowchart showing the eleventh processes in the image forming apparatus 1 according to the first embodiment of the present invention. FIG. 36 is a diagram showing a screen change in the eleventh processes.

First, referring to FIG. 35, the eleventh processes in the image forming apparatus 1 according to the first embodiment of the present invention are described. In the eleventh processes, a menu item registered in a custom menu group is selected. The custom menu group is described in the tenth processes.

First, the user A instructs to display a menu screen (S1101). In detail, the user A pushes a menu key on the operating section 20 and the menu screen is displayed on the operating section 20.

Next, the operating section controller 120 displays custom menu groups (custom menu group list) (S1102). In detail, the user information managing section 170 extracts the custom menu group list from the user information storing section 184. The menu managing section 160 extracts menu items in the custom menu groups from the menu item storing section 183. The operating section controller 120 displays the custom menu group and the menu items in the custom menu group in this order. The displaying order is not limited to the above.

The user A selects one of the custom menu groups and selects a menu item in the selected custom menu group and pushes the OK key (S1103). The operating section controller 120 receives information of the selected menu item and the push of the OK key.

The operating section controller 120 determines whether the selected menu item is in the custom menu group (S1104). When the selected menu item is in the custom menu group (YES in S1104), the menu item is called up (S1105). When the selected menu item is not in the custom menu group (NO in S1104), the screen is changed to the top screen (S1106).

In the eleventh processes, a menu item in a custom menu group is called up.

[Screen Change in Eleventh Processes]

Referring to FIGS. 35 and 36, a screen change in the eleventh processes is described.

First, a screen shown in S1101 of FIG. 35 is shown in FIG. 36(a). In the screen shown in FIG. 36(a), for example, "YOU CAN COPY" is displayed. When the user A pushes a menu key, as shown in FIG. 36(b), a menu screen is displayed. In the menu screen, custom menu groups (custom menu group List) are displayed (S1102). When the user A selects a custom menu group and pushes the OK key, as shown in FIG. 36(c), the custom menu group 1 and menu items in the custom menu group 1 are displayed. When the user A selects one of the menu items in the custom menu group 1 (S1103), since the selected menu item "PAPER REMAINING AMOUNT" is in the custom menu group 1 (YES in S1104), as shown in FIG. 36(d), "PAPER REMAINING AMOUNT" is displayed (S1105).

In the eleventh processes, the user A can select a menu item in a custom menu group without using a special key.

[Twelfth Processes in First Embodiment]

Figure 37:
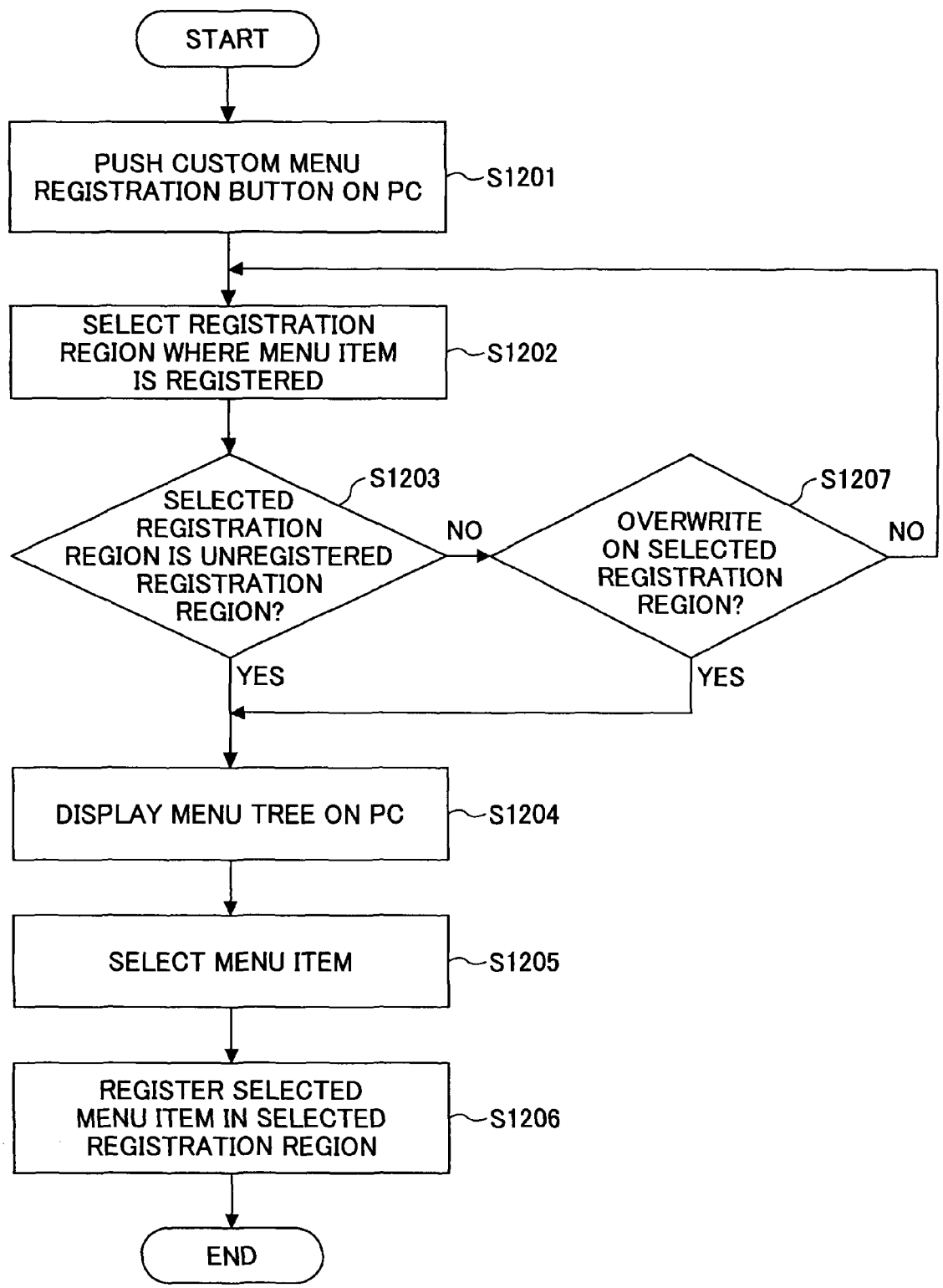
FIG. 37 is a flowchart showing twelfth processes in the image forming apparatus according to the first embodiment of the present invention.

Referring to FIGS. 2 through 9, and 37 through 39, twelfth processes in the image forming apparatus 1 according to the first embodiment of the present invention are described. FIG. 37 is a flowchart showing the twelfth processes in the image forming apparatus 1 according to the first embodiment of the present invention. FIG. 38 is a diagram showing a first screen in the twelfth processes. FIG. 39 is a diagram showing a second screen in the twelfth processes.

In the twelfth processes, the user A registers a menu item in a custom menu group in the image forming apparatus 1 by using a Web browser from the external device 2 (for example, a PC) connected to the image forming apparatus 1 via a network.

First, referring to FIG. 37, the twelfth processes are described. First, the user A pushes a custom menu registration button displayed on a screen of the PC 2 (S1201). Next, the user A selects a registration region where a menu item is registered in a custom menu group (S1202). It is determined whether the selected registration region is an unregistered registration region (S1203).

When the selected registration region is an unregistered registration region (YES in S1203), a menu tree of menu items is displayed on the screen of the PC 2 (S1204). The user A selects a menu item which the user A desires to register from the menu tree (S1205), and the selected menu item is registered in the selected registration region of the custom menu group (S1206). When the selected registration region is not an unregistered registration region (NO in S1203), it is determined whether the user A instructs to overwrite a menu item on a registered menu item (S1207). When the user A instructs to overwrite a menu item on a registered menu item (YES in S1207), the process goes to S1204. When the user A does not instruct to overwrite a menu item on a registered menu item (NO in S1207), the process returns to S1202.

In the twelfth processes, since the menu tree and the registration regions are displayed on the screen of the PC 2, a menu item and a registration region can be easily determined. In addition, the registration region can be selected by one click and the menu item can be selected by one click in the shortest period of time.

In addition, by using the Web browser, information items which can be displayed at one time are large. As shown in FIGS. 38 and 39, many information items can be displayed on one screen. In the first screen shown in FIG. 37, the custom menu groups 1 through 3 and menu items in the corresponding custom menu groups 1 through 3 are shown. In the second screen shown in FIG. 38, menu items in the tree structure are shown. The user A selects a registration region where a menu item is registered in the first screen shown in FIG. 38, and selects a menu item to be registered in the second screen shown in FIG. 39.

In the screens shown in FIGS. 38 and 39, many information items are displayed on one screen. However, the information items can be displayed in two or more screens by separating the information items into two or more screens.

As described above, according to the first embodiment of the present invention, a menu item to be registered and a registration region where the menu item is registered can be easily selected by individual users whose position (role) is different from each other, in different apparatuses in which buttons and information items to be displayed and so on are different from each other. Therefore, especially, in an apparatus which is used by plural users, menu items can be easily registered and called up by the corresponding plural users.

[Second Embodiment]

Next, referring to FIGS. 40 through 49, a second embodiment of the present invention is described. In an image forming apparatus of the second embodiment of the present invention, the network structure, the hardware structure, the functional structure, and the user information are the same as those in the image forming apparatus 1 of the first embodiment of the present invention. Therefore, the same description is omitted.

[Operating Section in Second Embodiment]

Figure 40:
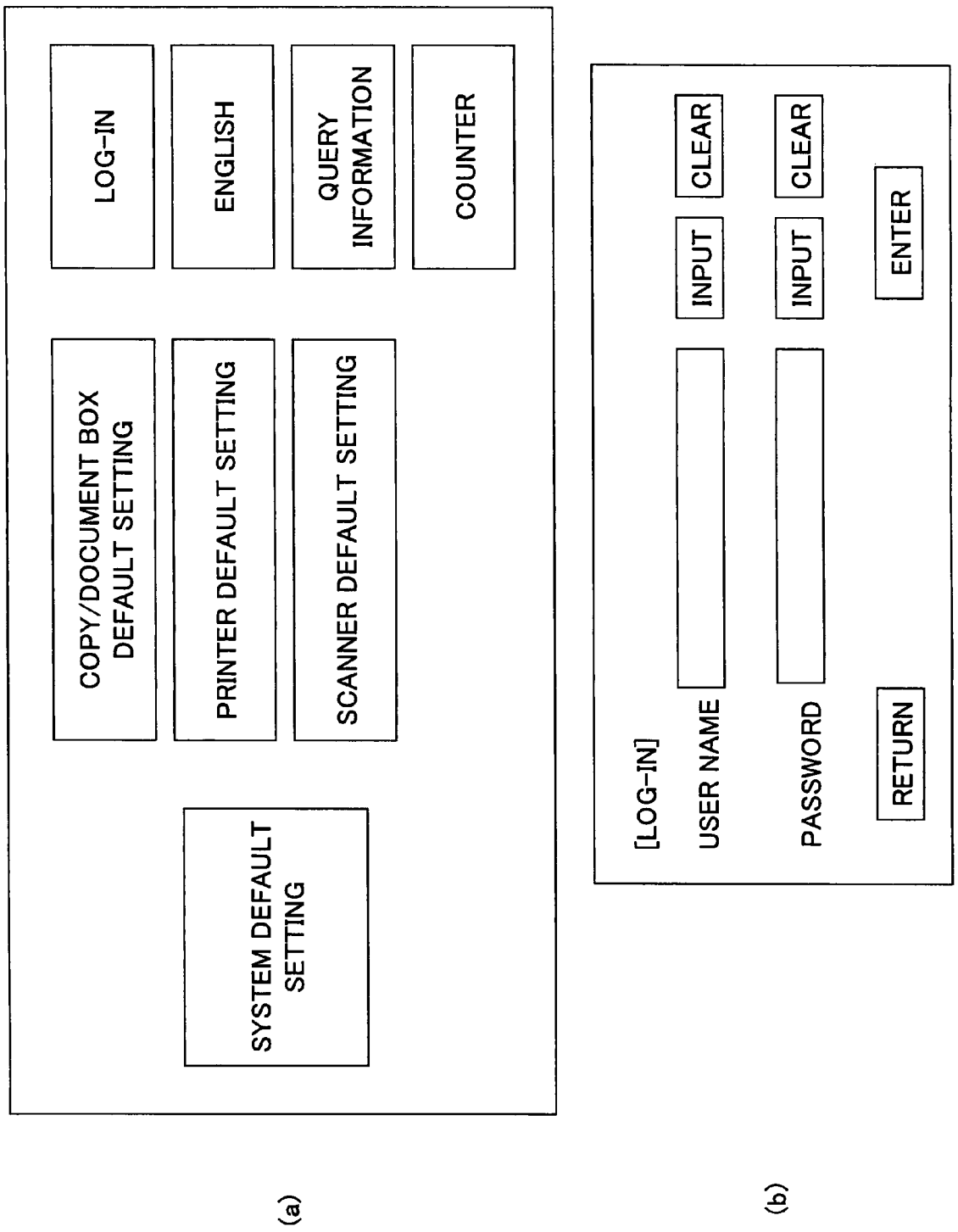
FIG. 40 is a diagram showing screens on an operating section in the image forming apparatus according a second embodiment of the present invention.

FIG. 40 is a diagram showing screens on the operating section 20 in the image forming apparatus 1 according to the second embodiment of the present invention. In FIG. 40, the screens are shown when a user is authenticated.

Referring to FIG. 40, the screens at the authentication of the user are described. In FIG. 40, (a) shows a first screen, and (b) shows a second screen after pushing a log-in key on the first screen.

First, the user A pushes a log-in key on the first screen shown in FIG. 40(a). Then the second screen shown in FIG. 40(b) is displayed. The user A inputs a user name and a password on the second screen shown in FIG. 40(b). The operating section controller 120 receives the user input information (user name and password) and sends the received input information to the authentication controller 130. The authentication controller 130 authenticates the user A by using the input information and user information which has been stored beforehand in the user information storing section 184. When the both information items match, the user A can operate the image forming apparatus 1 in a range permitted to the user A.

As described above, according to the second embodiment of the present invention, since the user A can operate the image forming apparatus 1 after the user A is authenticated, the security can be maintained.

In the image forming apparatus 1 according to the second embodiment of the present invention, the user information shown in FIG. 7 is registered from the external device 2 (for example, a host computer) via a network and a network interface. In detail, the user information managing section 170 receives a registration instruction from the external device 2 via the network controller 110, and registers the user information including the position of the user A in the user information storing section 184. In addition, the user information can be registered from the operating section 20.

The user ID of the user is different among users and each user has an individual position (role). Operations permitted for each user can be different among the users based on the position of the users.

[Menu Tree in Second Embodiment]

Figure 41:
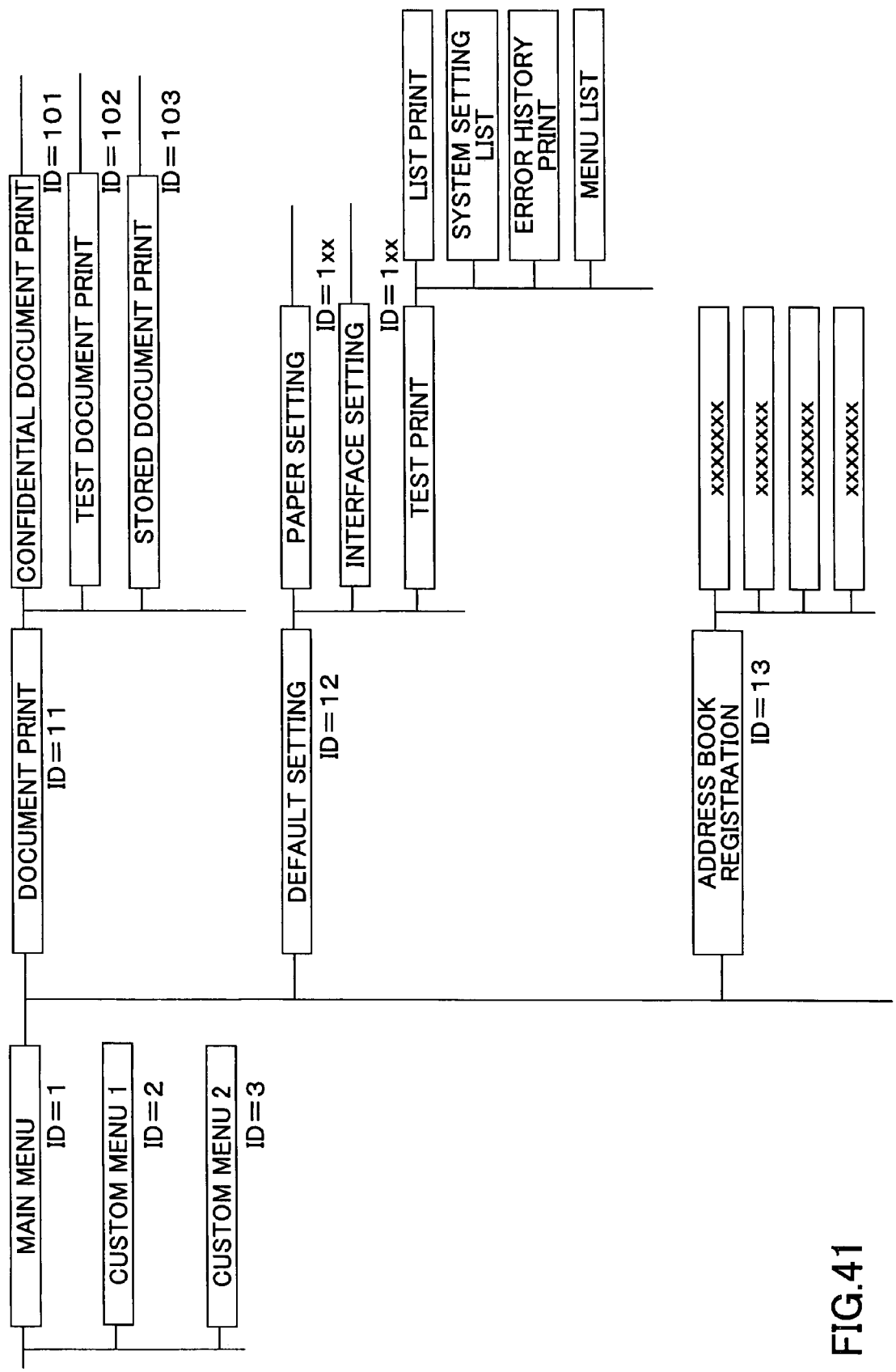
FIG. 41 is a diagram showing a menu tree of menu items in a menu item storing section according to the second embodiment of the present invention.

Referring to FIG. 41, a menu tree which is stored in the menu item storing section 183 according to the second embodiment of the present invention is described. FIG. 41 is a diagram showing the menu tree of menu items in the menu item storing section 183 according to the second embodiment of the present invention. The menu items can be arbitrarily stored in the menu item storing section 183 by the user A.

As shown in FIG. 41, menu items are categorized into a layered structure (tree structure). Each menu item has an ID for recognizing the menu item.

In the menu tree, menu items which are frequently used are registered as custom menu items in the uppermost layer, for example, in a custom menu 1. With this, the menu items which are frequently used can be easily determined without using large labor hours.

Figure 42:
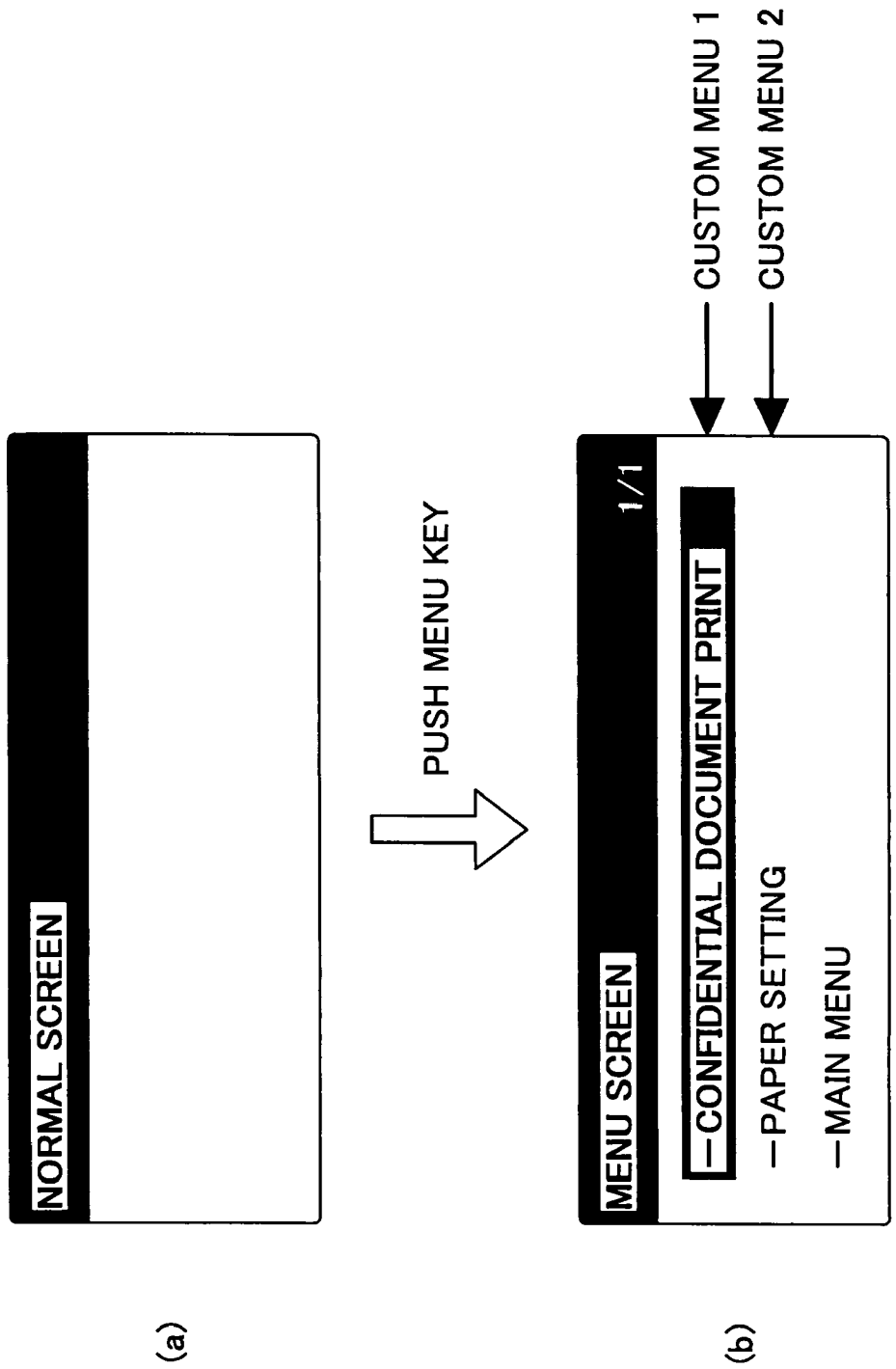
FIG. 42 is a diagram showing screens on the operating section when menu items are registered in corresponding custom menus according to the second embodiment of the present invention.

FIG. 42 is a diagram showing screens on the operating section 20 when menu items are registered in corresponding custom menus according to the second embodiment of the present invention. In FIG. 42, for example, a menu item of a confidential document print is registered in a custom menu 1, and a menu item of paper setting is registered in a custom menu 2. In addition, in FIG. 42, (a) shows a normal screen and (b) shows a menu screen.

When a menu key is pushed while the normal screen shown in FIG. 42(a) is being displayed, a screen shown in FIG. 42(b) is displayed. Since the menu items "CONFIDENTIAL DOCUMENT PRINT" and "PAPER SETTING" are registered in the corresponding custom menus 1 and 2, as shown in FIG. 42(b), the menu items "CONFIDENTIAL DOCUMENT PRINT" and "PAPER SETTING" are first displayed.

Generally, when the user A finds a menu item in a menu tree, the user A traces the menu tree from the upper layer to the lower layer by using an input unit such as an up-and-down key or a touch panel. In addition, the user A can trace the menu tree from the lower layer to the upper layer.

Referring to the drawings, user custom menu tables 1 through 4 are described. The user custom menu tables 1 through 4 are arbitrarily formed by the users by using several information items.

[First User Custom Menu Table]

Figure 43:
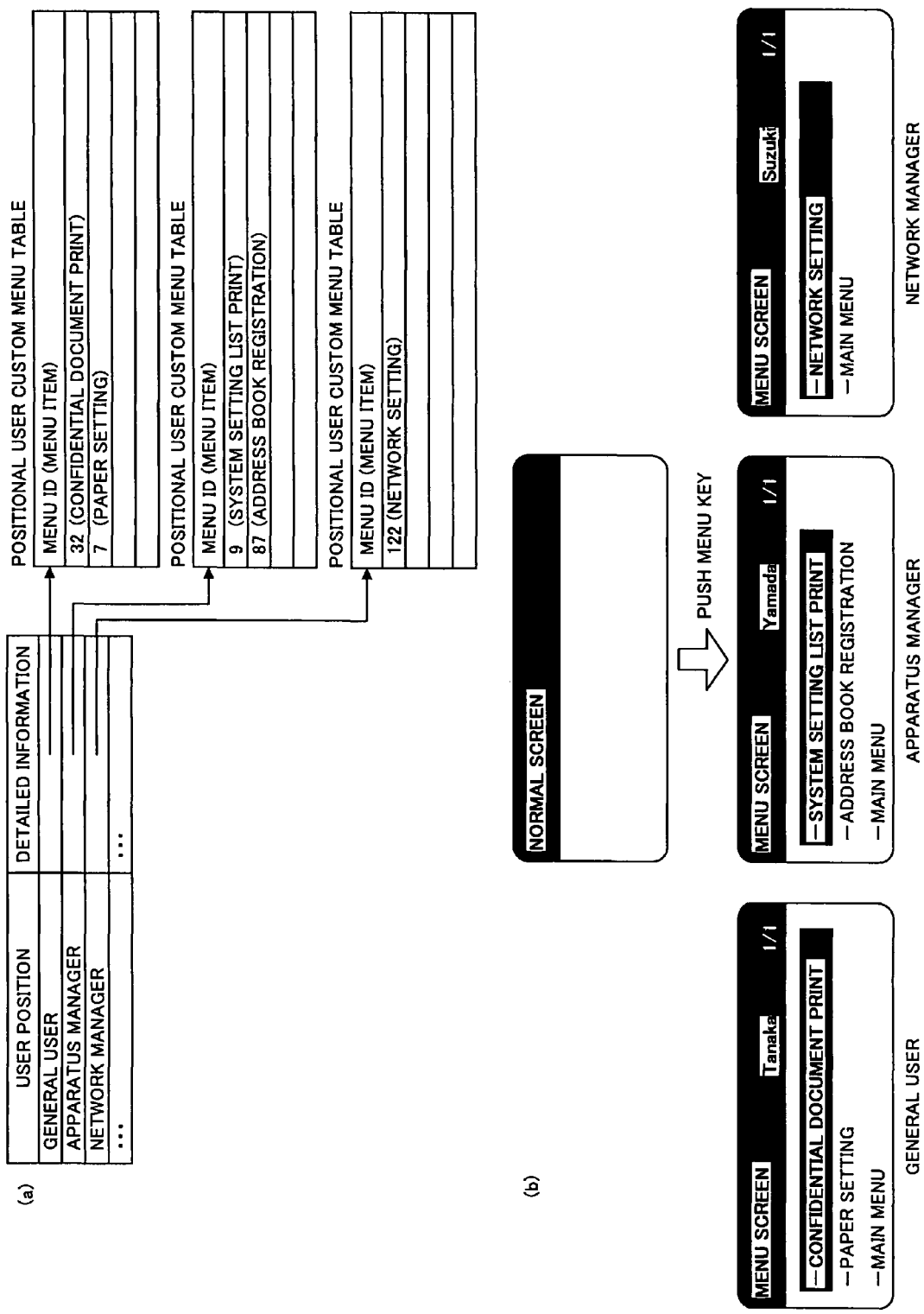
FIG. 43 is a diagram showing a first user custom menu table according to the second embodiment of the present invention.

FIG. 43 is a diagram showing a first user custom menu table according to the second embodiment of the present invention. Referring to FIG. 43, the first user custom menu table is described. In FIG. 43, (a) shows the first user custom menu table and (b) shows a screen change in the first user custom menu table.

As shown in FIG. 43(a), since menu items are registered in the position (role) of each user, the first user custom menu table can be called a positional user custom menu table. The position of the user is, for example, a general user, an apparatus manager, or a network manager, As shown in FIG. 43(b), when a normal screen is change by pushing a menu key, the logged in position of the user is recognized and a menu screen corresponding to the position of the user is displayed. In FIG. 43(b), the menu screens corresponding to the positions of the users are shown. In each menu screen, menu items registered in each positional user custom menu table are displayed. The positional user custom menu table is stored in the authentication controller 130. However, the positional user custom menu table can be stored in another section.

[Second User Custom Menu Table]

Figure 44:
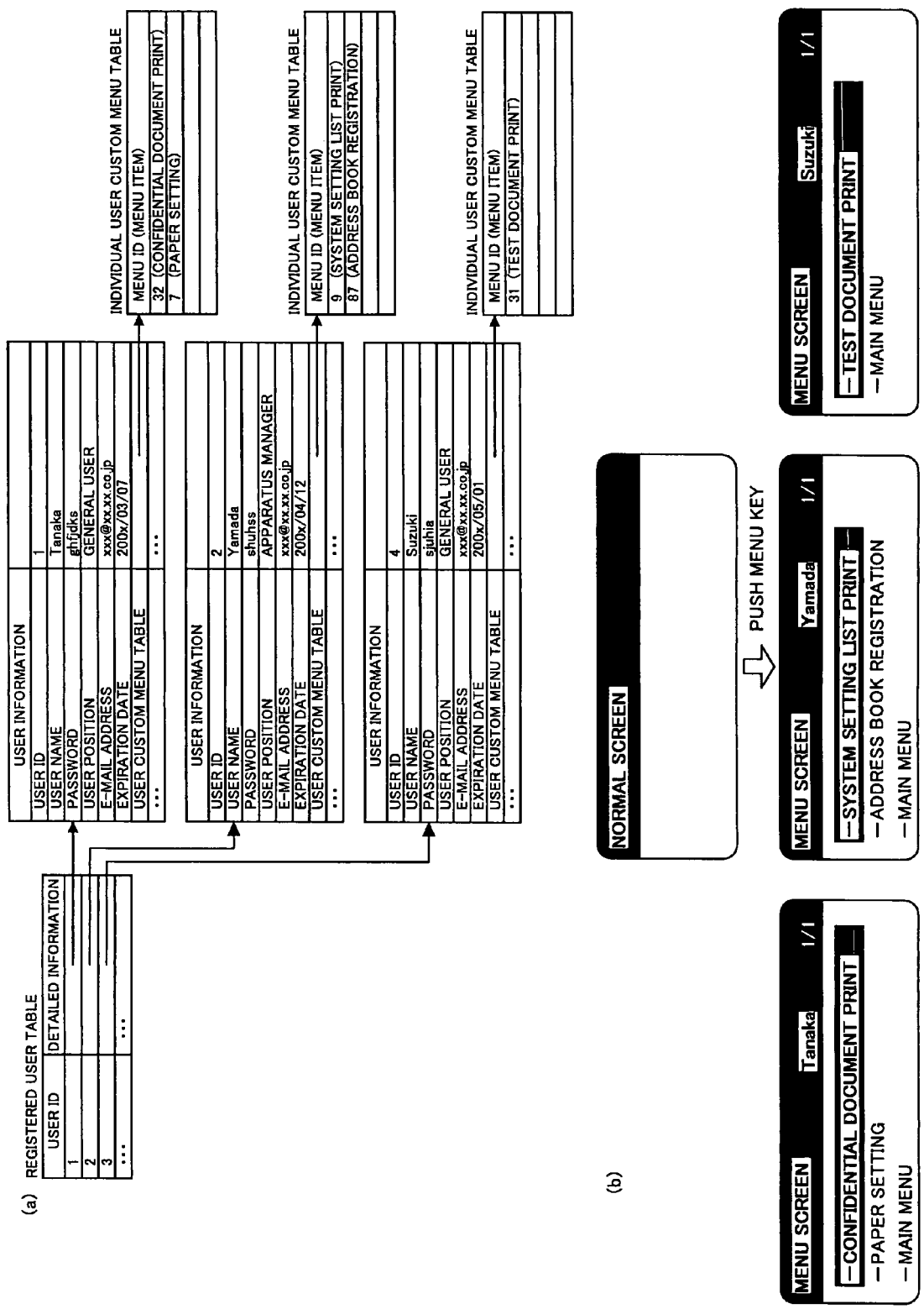
FIG. 44 is a diagram showing a second user custom menu table according to the second embodiment of the present invention.

FIG. 44 is a diagram showing a second user custom menu table according to the second embodiment of the present invention. Referring to FIG. 44, the second user custom menu table is described. In FIG. 43, (a) shows the second user custom menu table and (b) shows a screen change in the second user custom menu table.

As shown in FIG. 44(a), since menu items are registered in each user unit, the second user custom menu table can be called an individual user custom menu table. In addition, each menu item in the individual user custom menu table can be called an individual custom menu item.

As shown in FIG. 44(b), when a normal screen is change by pushing a menu key, the logged in user information is recognized and a menu screen corresponding to the user information is displayed. In FIG. 44(b), the menu screens corresponding to the user information are shown. In each menu screen, menu items registered in each individual user custom menu table are displayed. The individual user custom menu table is stored in the user information storing section 184 by the user information managing section 170. However, the individual user custom menu table can be stored in another section.

[Third User Custom Menu Table]

Figure 45:
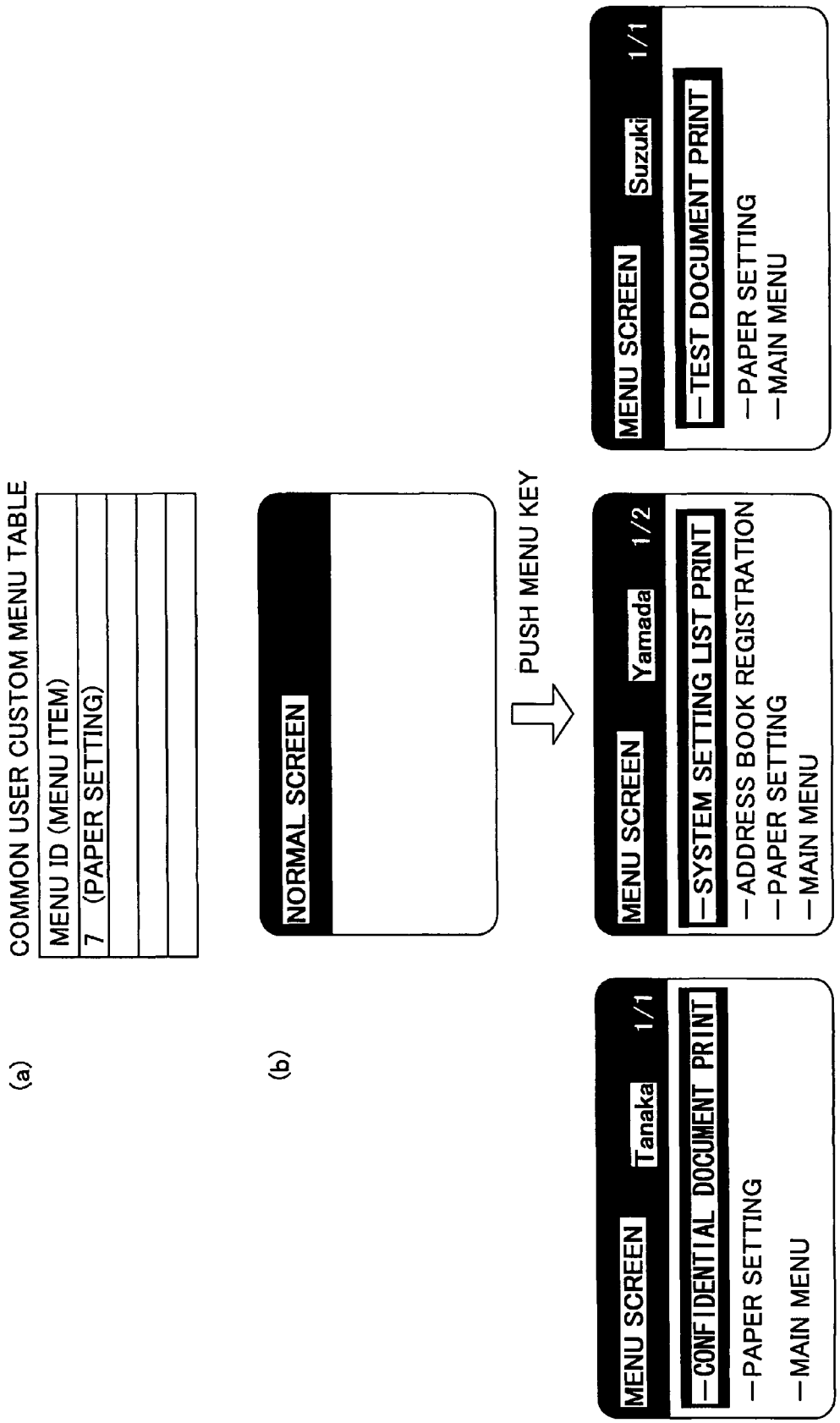
FIG. 45 is a diagram showing a third user custom menu table according to the second embodiment of the present invention.

FIG. 45 is a diagram showing a third user custom menu table according to the second embodiment of the present invention. Referring to FIG. 45, the third user custom menu table is described. In FIG. 45, (a) shows the third user custom menu table and (b) shows a screen change in the third user custom menu table.

As shown in FIG. 45(a), since common custom menu items which are common in all users are registered in the third user custom menu table, the third user custom menu table can be called a common user custom menu table. In addition, each menu item in the common user custom menu table can be called a common custom menu item.

As shown in FIG. 45(b), when a normal screen is change by pushing a menu key, regardless of a logged in user, the common custom menu items are displayed in the menu screen. In FIG. 45(b), in each menu screen, in addition to the common custom menu item, individual custom menu items of each user are displayed. The common user custom menu table is stored in the setting value storing section 181 of the apparatus setting managing section 140. However, the common user custom menu table can be stored in another section.

When the common custom menu items, the positional custom menu items, and the individual custom menu items have been registered, these custom menu items can be displayed at the same time. The displaying order of the custom menu items can be determined by the apparatus, or the priority order determined by each user. In addition, when the number of the custom menu items to be displayed is too large, the number can be determined by the apparatus.

In addition, a part of the common custom menu items, a part of the positional custom menu items, and a part of the individual custom menu items can be displayed at the same time. In this case, selection of the custom menu items to be displayed can be determined by the apparatus, or by each user by setting a value in which the number of the custom menu items is set. In addition, it can be changed from displaying all custom menu items to displaying a part of the custom menu items, and vice versa.

In default setting at delivering the apparatus, a menu item can be registered in the common user custom menu table. The registered menu item is displayed at the uppermost position in the menu screen until the user A registers a new menu item in the common user custom menu table. The menu item registered at the default setting can be stored in the apparatus, and the menu item can be returned in the common user custom menu table even after the user registers a new common user item.

In addition, a menu item used at the end can be automatically registered in the common user custom menu table.

In addition, the menu item automatically registered in the common user custom menu table can be used before the user A registers a new menu item in the common user custom menu table. In addition, a menu item used at the end can be automatically registered in the common user custom menu table.

In addition, instead of immediately registering the menu item used at the end in the common user custom menu table, the menu item used at the end can be stored, when the user A logs in the image forming apparatus 1. The above application is possible. When the menu item is stored, the menu item is stored with used time or the menu item used at the end is stored with the menu ID.

[Fourth User Custom Menu Table]

Figure 46:
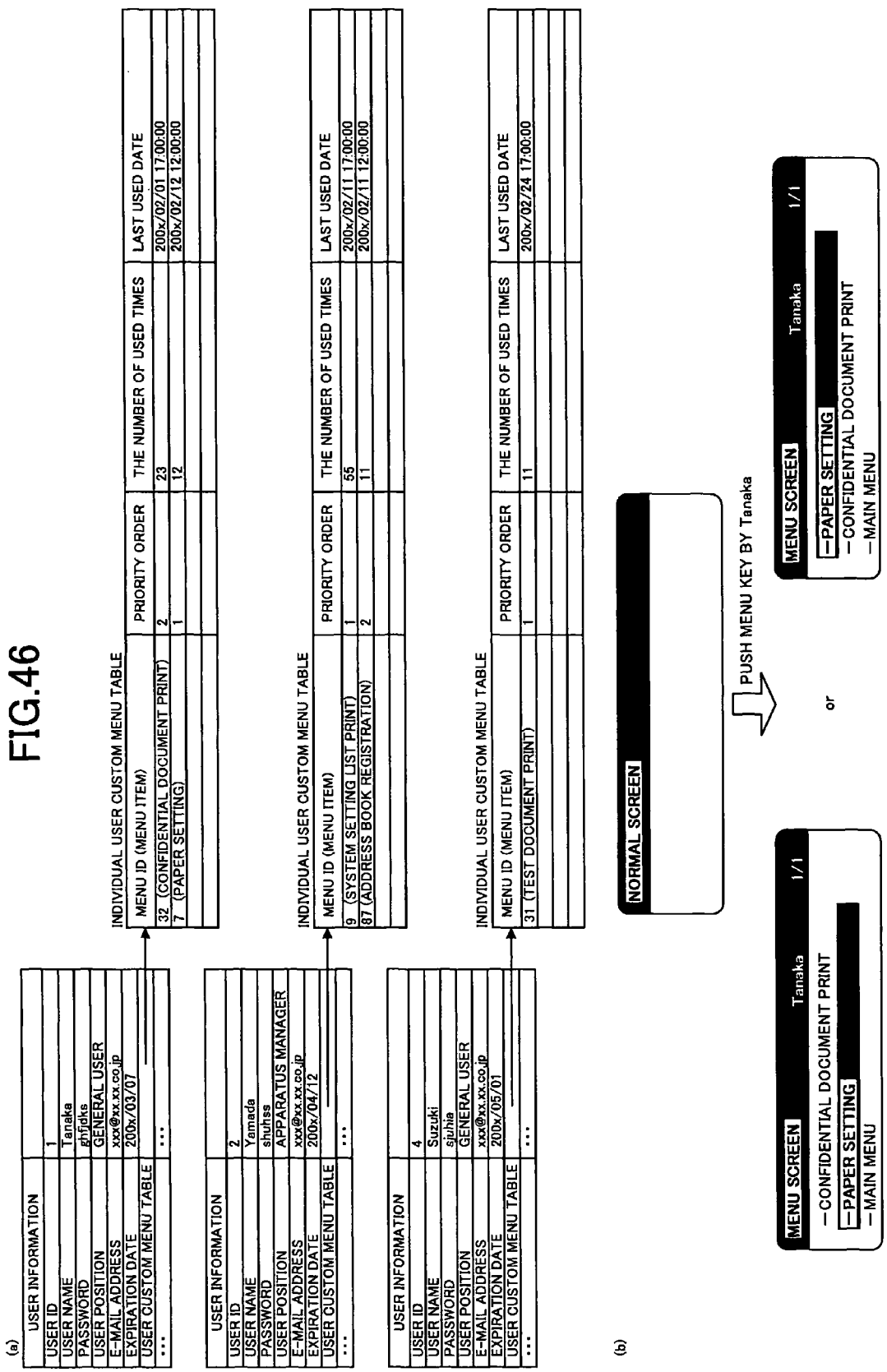
FIG. 46 is a diagram showing a fourth user custom menu table according to the second embodiment of the present invention.

FIG. 46 is a diagram showing a fourth user custom menu table according to the second embodiment of the present invention. Referring to FIG. 46, the fourth user custom menu table is described. In FIG. 46, (a) shows the fourth user custom menu table and (b) shows a screen change in the fourth user custom menu table.

As shown in FIG. 46(a), individual user custom menu tables are shown as the fourth user custom menu table. However, as the fourth user custom menu table, the positional user custom menu tables can be used. The individual user custom menu table shown in FIG. 46(a) is different from the individual user custom menu table shown in FIG. 44(a). As shown in FIG. 46(a), the individual user custom menu table includes a priority order registration region, a used number registration region, and a last used date registration region. The priority order can be registered by the user A. The used number is registered by counting the used times by a counter similar to that described in the sixth processes of the first embodiment of the present invention. The last used date is registered by using a last used date measuring unit (not shown) which measures the last used data of a custom menu item.

As shown in FIG. 46(b), when a normal screen is change by pushing a menu key, a menu screen is displayed. In this case, since Mr. Tanaka is the user, the menu screen for Mr. Tanaka is displayed. In the left side of FIG. 46(b), since the menu item "PAPER SETTING" is the first priority in the individual user customer table of Mr. Tanaka, the menu item "PAPER SETTING" is highlighted. In the menu screen of FIG. 46(b), as shown in the right side, the displaying order of the menu items is changed; that is, the menu item "PAPER SETTING" having the first priority is displayed at the uppermost position. That is, either one of the menu screens can be used.

The priority order can be set only for a menu item having the first priority instead of setting for all menu items. The priority order can be automatically set by the number of used times of each menu item instead of setting by the user A. Or the priority order can be automatically set by the last used time. In addition, the determination method of the priority order can be changed by settings.

In addition, by using the number of used times of each menu item shown in FIG. 46, a menu item which is used most frequently can be automatically registered in the common user custom menu table. It can be set that the menu item automatically registered in the common user custom menu table is used before the user A registers a new menu item in the common user custom menu table. In addition, automatic registration of the menu item can be set by the user A.

In addition, instead of registering the most frequently used menu item in the common user custom menu table, the most frequently used menu item is stored when the user A logs in on the image forming apparatus 1. The above application is possible. When the menu item is stored, the number of used times of each menu item is stored or the most frequently used menu item is stored.

One of the menu item automatically registering methods can be selected by the user A. A menu item which is supposed to be used most frequently can be registered at the default setting of the image forming apparatus 1.

When a user has plural positions, plural positional user custom menu tables can be displayed. In this case, the displaying order of the plural positional user custom menu tables can be set by the user, or set in the image forming apparatus 1 beforehand.

The common user custom menu table can be formed by a position unit such as a manager unit and a general user unit, or can be one in the image forming apparatus 1. Further, the common user custom menu table can be formed by a combination of the positions. The common user custom menu table is stored in the apparatus setting managing section 140; however, the table can be stored in another section.

[Processes in Second Embodiment]

Referring to drawings, processes in the second embodiment of the present invention are described. In the processes, an LCD capable of displaying four lines of letters is used as a displaying unit and hard keys are used as an inputting unit. However, the displaying unit and the inputting unit are not limited to the above devices; the displaying unit can have four lines or more or less depending on the required resolution, and the inputting unit can be a touch panel or another panel.

[First Processes in Second Embodiment]

Figure 47:
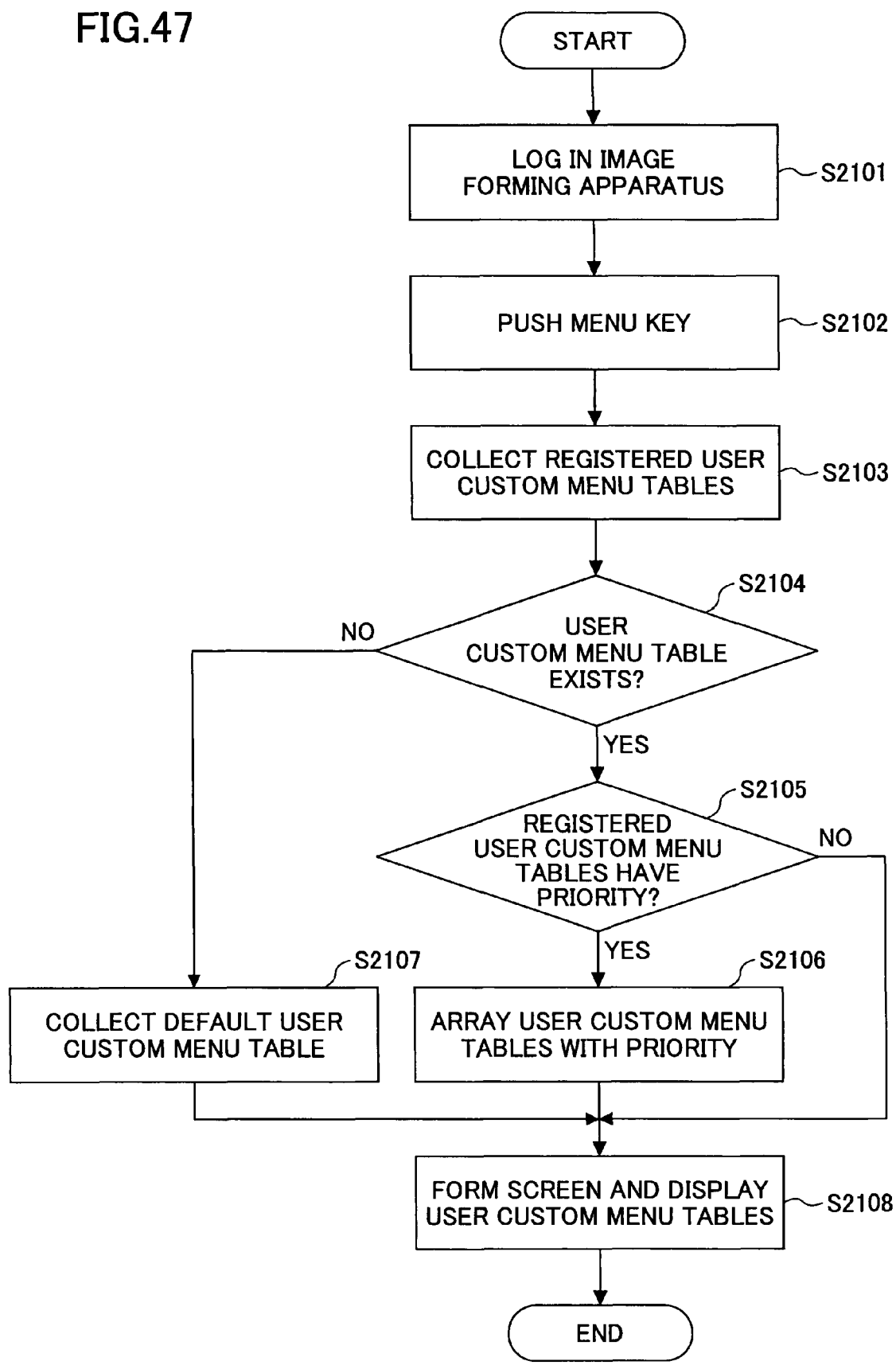
FIG. 47 is a flowchart showing first processes in the image forming apparatus according to the second embodiment of the present invention.
Figure 48:
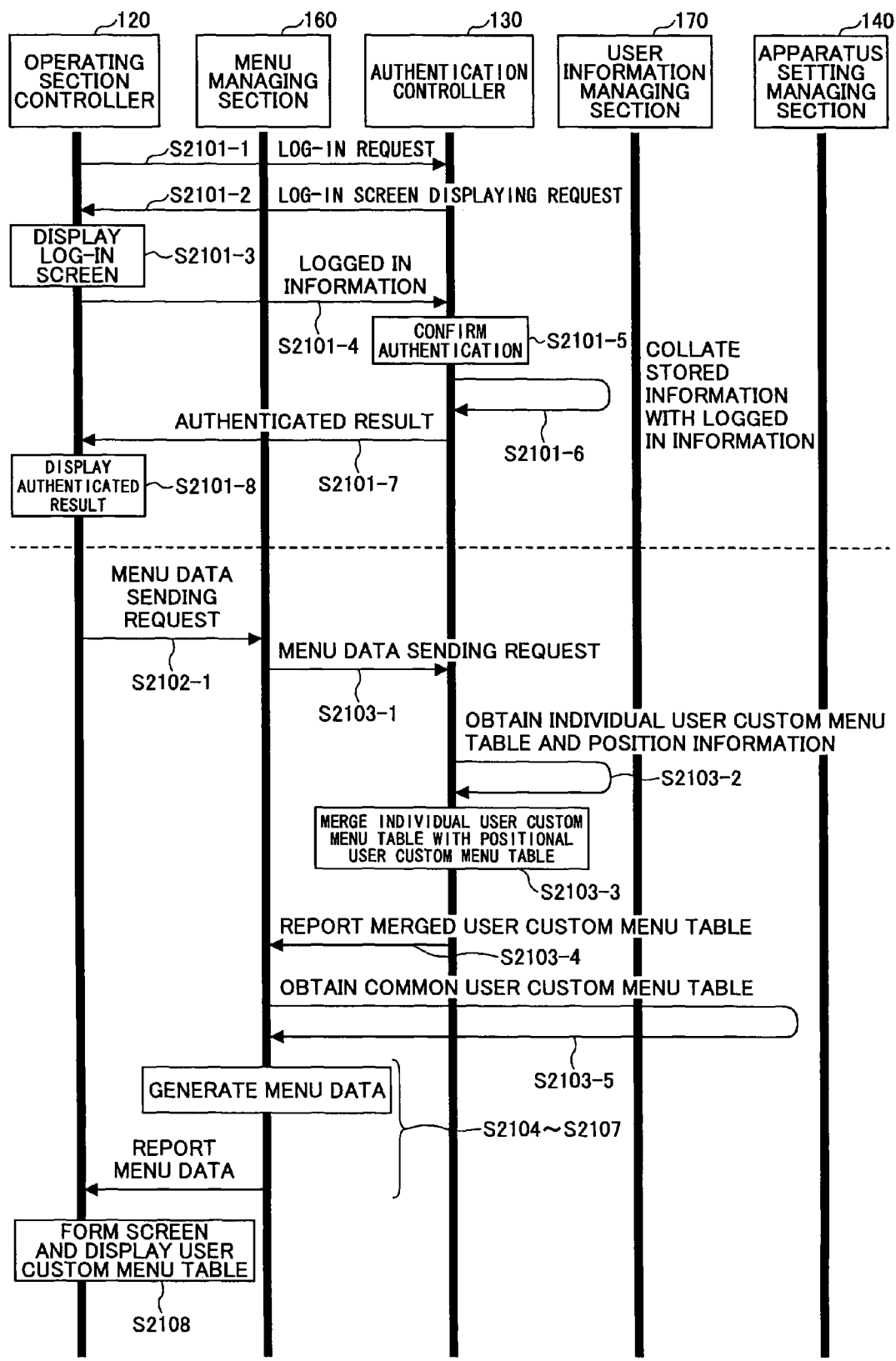
FIG. 48 is a sequence chart showing the first processes shown in FIG. 47.

Referring to FIGS. 2 through 9, and 47 and 48, first processes in the image forming apparatus 1 according to the second embodiment of the present invention are described. FIG. 47 is a flowchart showing the first processes in the image forming apparatus 1 according to the second embodiment of the present invention. FIG. 48 is a sequence chart showing the first processes in the image forming apparatus 1 according to the second embodiment of the present invention.

In the first processes, the user A logs in on the image forming apparatus 1 and displays a custom menu item. The custom menu item is a combined custom menu item in which custom menu items in the user custom menu tables 1 through 4 are combined. The combining method is described below in detail.

First, the user A logs in on the image forming apparatus 1 (S2101). In the following, a step number which has a number with a hyphen is shown in FIG. 48. In detail, the user A pushes the log-in key on the screen of the operating section 20 (FIG. 40(a)). The operating section controller 120 sends the log-in request of the user A to the authentication controller 130 (S2101-1). The authentication controller 130 requests the operating section controller 120 to display a log-in screen (S2101-2). The operating section controller 120 displays a log-in screen on the operating section 20 (FIG. 40(b)) (S2101-3).

When the user A inputs a user name and a password on the log-in screen of the operating section 20, the operating section controller 120 sends the input logged in information to the authentication controller 130 (S2101-4). The authentication controller 130 confirms the logged in information by collating information stored by the user information managing section 170 with the logged in information (S2101-5, S2101-6). When the authentication controller 130 confirms the logged in information, the authentication controller 130 reports the authenticated result to the operating section controller 120 (S2101-7). The operating section controller 120 displays the authenticated result on the operating section 20 (S2101-8).

Next, the user A pushes a menu key on the operating section 20 (S2102). The operating section controller 120 receives the push of the menu key. The operating section controller 120 requests the menu managing section 160 to send menu data so as to form a menu displaying screen.

The menu managing section 160 collects registered user custom menu tables (S2103). In detail, when an individual user custom menu table or a positional user custom menu table is effective, the menu managing section 160 requests the authentication controller 130 to send the individual user custom menu table or the positional user custom menu table (S2103-1). The authentication controller 130 obtains the individual user custom menu table and the position information of the user A from the user information managing section 170 (S2103-2). The authentication controller 130 merges the obtained individual user custom menu table with the positional user custom menu table corresponding to the position information of the user (S2103-3). The authentication controller 130 reports the merged user custom menu table to the menu managing section 160 (S2103-4)

When a common user custom menu table is effective, the menu managing section 160 requests the apparatus setting managing section 140 to send the common user custom menu table (S2103-5). This process can be executed soon after the process in S2103-1. The apparatus setting managing section 140 obtains the common user custom menu table from the setting value storing section 181 based on the obtaining request and reports the merged result to the menu managing section 160.

The menu managing section 160 generates a merged user custom menu table and reports the merged user custom menu table to the operating section controller 120 (S2104 through S2107). The operating section controller 120 forms a menu screen for displaying the merged user custom menu table and displays the merged user custom menu table on the operating section 20 (S2108).

In detail, the menu managing section 160 extracts a menu item stored in its own area and compares the extracted menu item with the collected custom menu item by using the menu IDs of the menu items. That is, the menu managing section 160 determined whether a registered custom menu item is the same as a menu item stored in the menu managing section 160 (S2104). When a registered custom menu item is not the same as a menu item stored in the menu managing section 160 (NO in S2104), default custom menu items are collected (S2107). When a registered custom menu item is the same as a menu item stored in the menu managing section 160 (YES in S2104), it is determined whether the registered custom menu item has priority (S2105). When the registered custom menu item has priority (YES in S2105), the registered menu item is displayed with priority (S2106).

That is, in (YES in S2104), a collected custom menu item is merged with a menu item stored in the menu managing section 160.

In S2106, the displaying order of the menu items is changed with priority. The priority order can be determined by the number of used times of the menu item, the used date of the menu item, or the apparatus itself. In addition, the default menu items can be determined by the apparatus, or by assuming the used times.

As described above, in the first processes in the second embodiment of the present invention, the merged user custom menu table is generated by combining the user custom menu tables 1 through 4.

[Second Processes in Second Embodiment]

Figure 49:
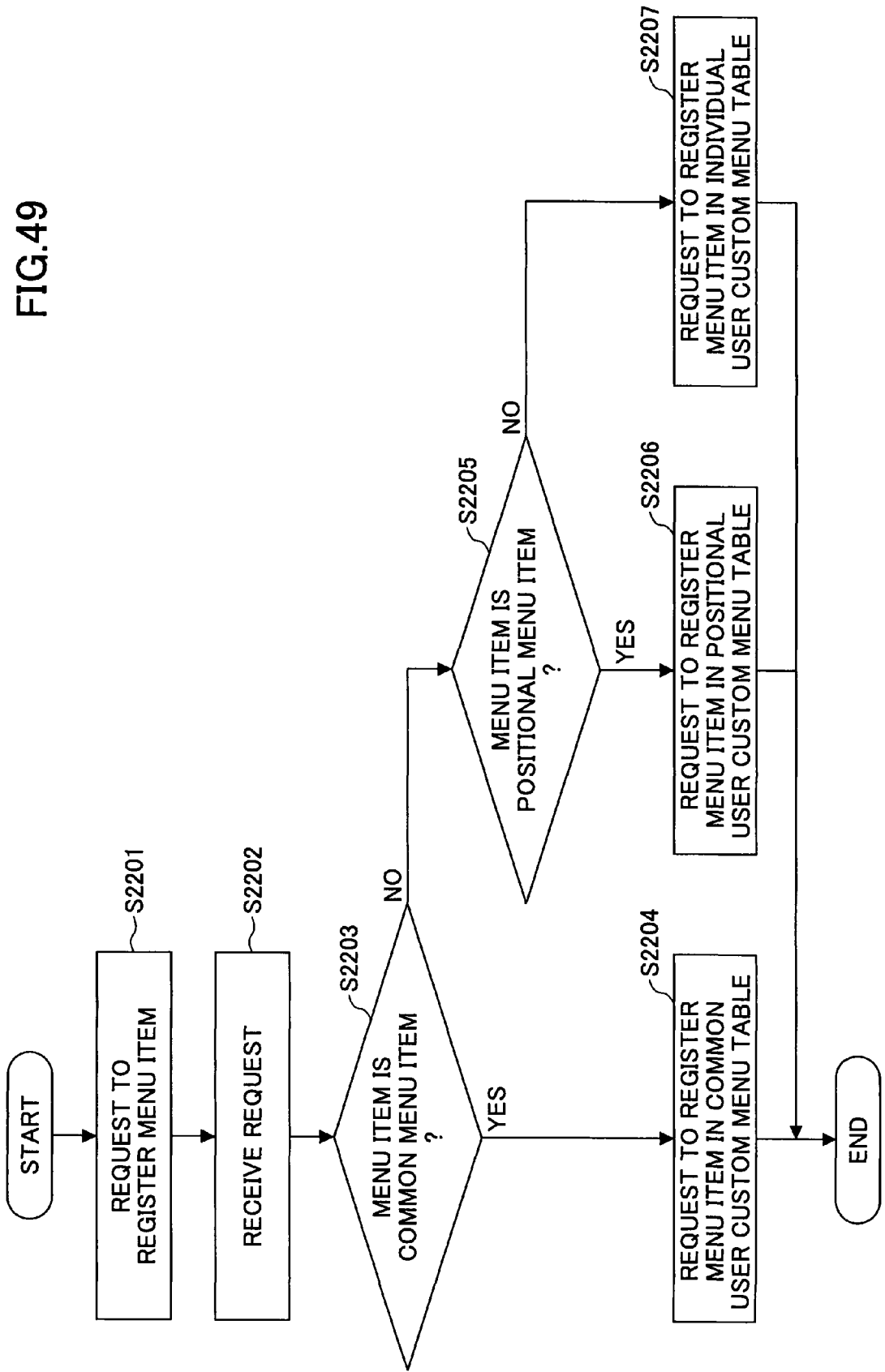
FIG. 49 is a flowchart showing second processes in the image forming apparatus according to the second embodiment of the present invention.

Referring to FIGS. 2 through 9, and 49, second processes in the image forming apparatus 1 according to the second embodiment of the present invention are described. FIG. 49 is a flowchart showing the second processes in the image forming apparatus 1 according to the second embodiment of the present invention.

In the second processes of the second embodiment of the present invention, the user log-in process is the same as that in the first processes; therefore, the user log-in process is omitted. Consequently, in the second processes, processes after the user log-in process are described.

First, the user A requests to register a menu item on the operating section 20 (S2201). The operating section controller 120 receives the request and sends the request to the menu managing section 160 (S2202).

The menu managing section 160 determines whether the menu item to be registered is a common menu item (S2203). When the menu item to be registered is a common menu item (YES in S2203), the menu managing section 160 requests the apparatus setting managing section 140 to register the menu item in the common user custom menu table (S2204).

When the menu item to be registered is not a common menu item (NO in S2203), the menu managing section 160 determines whether the menu item to be registered is a positional menu item (S2205). When the menu item to be registered is a positional menu item (YES in S2205), the menu managing section 160 requests the authentication controller 130 to register the menu item in a positional user custom menu table (S2205).

When the menu item to be registered is not a positional menu item (NO in S2205), that is, it is determined that the menu item is an individual menu item, the menu managing section 160 requests the user information managing section 170 to register the menu item in an individual user custom menu table (S2207).

When a menu item is registered, a unique menu ID is given to each menu item, and the menu item is registered in one of the user custom menu tables. The common user custom menu table is stored in the setting value storing section 181, the positional user custom menu table is stored in the authentication controller 130, and the individual user custom menu table is stored in the user information storing section 184. However, the storing sections of the user custom menu tables are not limited to the above sections.

As described above, in the second embodiment of the present invention, when the user A registers a menu item, the menu item is registered in a common user custom menu table, a positional user custom menu table, or an individual user custom menu table.

According to the second embodiment of the present invention, the image forming apparatus 1 is used by plural users, for example, a general user, an apparatus manager, and a network manager. Menu items frequently used by the corresponding users are different from each other. Menu items are registered in different user custom menu tables depending on the user positions; therefore, each of the plural users can easily access a desirable menu item through a user custom menu table.

That is, the positional user custom menu table, in which menu items capable of being accessed only by persons having special positions are registered; the individual user custom menu table, in which menu items capable of being accessed only by a specific person are registered; and the common user custom menu table, in which menu items capable of being accessed by any person are registered, are provided. Therefore, each user can easily access a desirable menu item by referring to one of the user custom menu tables.

In addition, in the plural user custom menu tables, a menu item which is used frequently can be displayed at the uppermost position on the screen, and a menu item which is used at the end can be automatically registered.

[Third Embodiment]

Next, referring to FIGS. 50 through 63, a third embodiment of the present invention is described.

[Network Structure]

Figure 50:
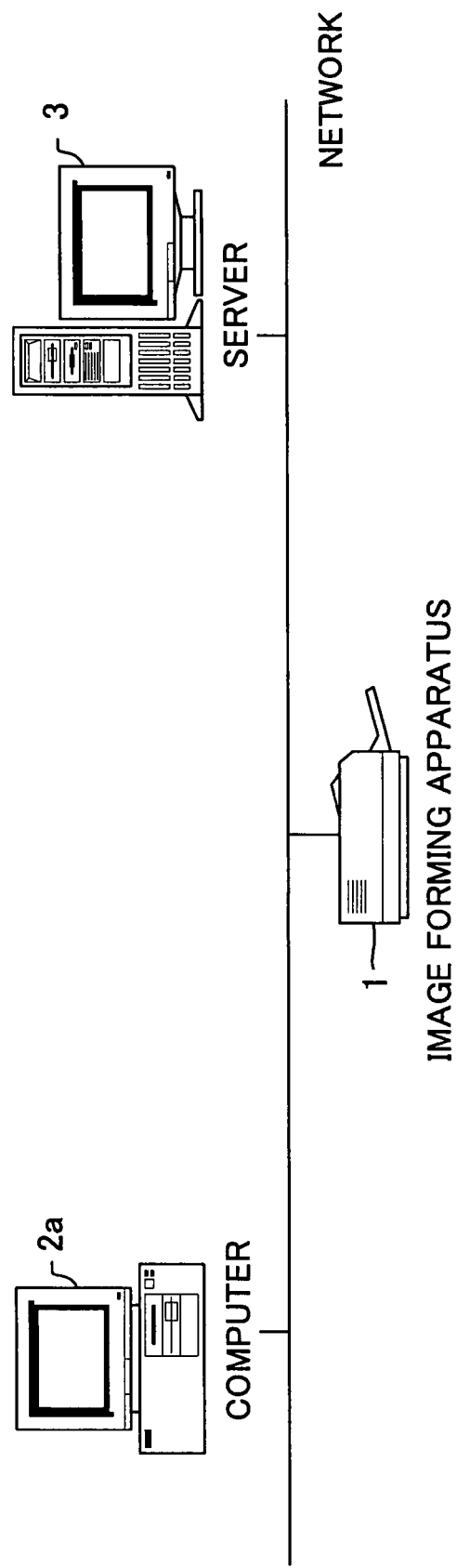
FIG. 50 is a diagram showing a network structure including an image forming apparatus according to a third embodiment of the present invention.

First, a network structure including an image forming apparatus according to the third embodiment of the present invention is described. FIG. 50 is a diagram showing the network structure including the image forming apparatus according to the third embodiment of the present invention.

As shown in FIG. 50, in the network structure, an image forming apparatus 1 is connected to a computer 2a and a server 3 via a network such as a LAN. The server 3 stores and manages various types of data. The reference number of the image forming apparatus in the third embodiment is the same as the reference number of the image forming apparatus in the first embodiment; however the structure of the image forming apparatus in the third embodiment is different from that of the image forming apparatus in the first embodiment.

In FIG. 50, the image forming apparatus 1 receives an image forming request, for example, an image printing request, from the computer 2a, and forms an image on a recording medium. The image forming apparatus 1 is an MFP, an information processing apparatus, or a printer. The computer 2a can be connected to the image forming apparatus 1 via an interface such as IEEE 1284 and USB instead of via the network. When the computer 2a is connected to the image forming apparatus 1 via the network, the computer 2a can operate the image forming apparatus 1 by using a Web browser.

[Hardware Structure]

Figure 51:
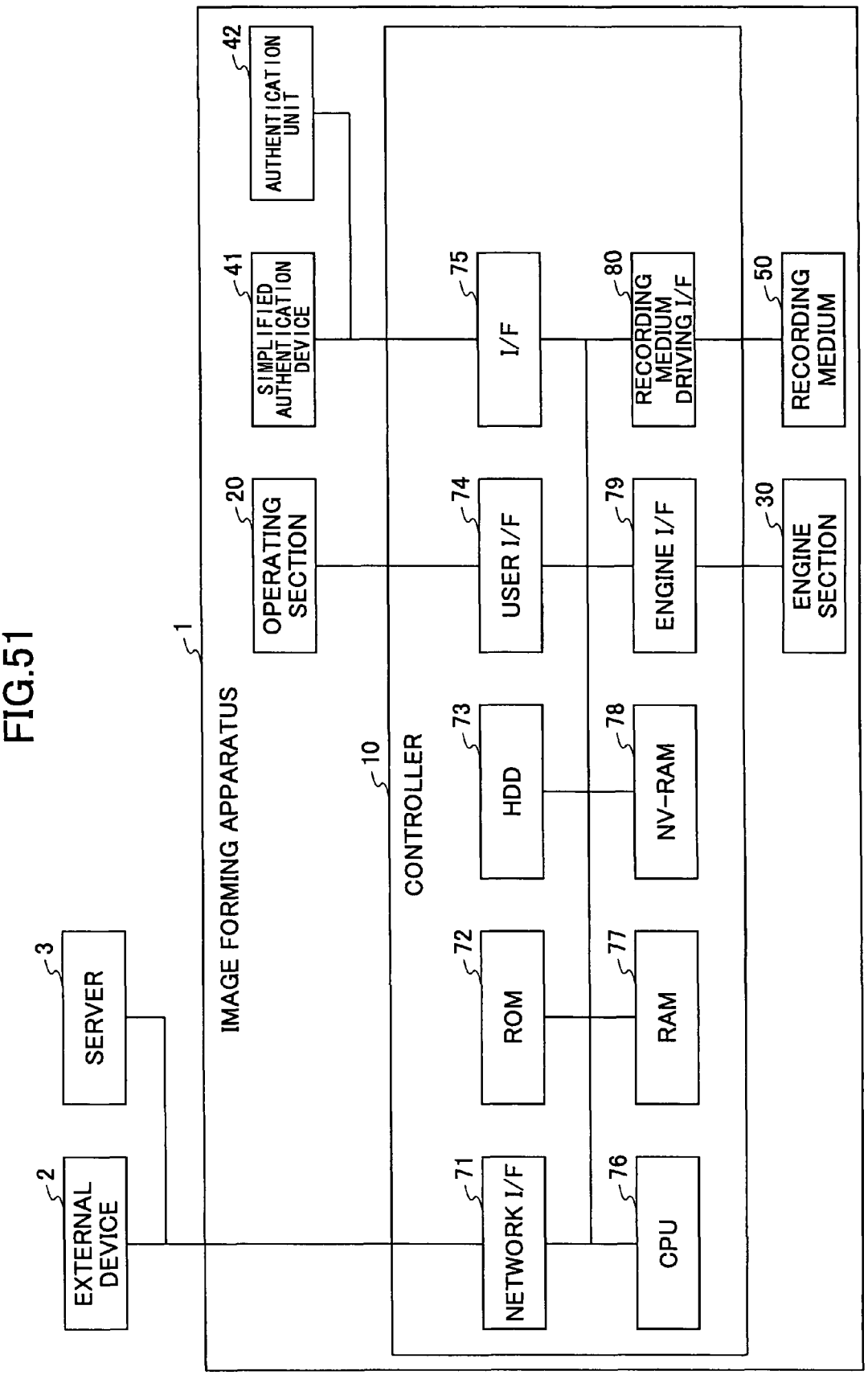
FIG. 51 is a diagram showing a hardware structure of the image forming apparatus according to the third embodiment of the present invention.

Next, referring to FIG. 51, a hardware structure of the image forming apparatus 1 is described. FIG. 51 is a diagram showing the hardware structure of the image forming apparatus 1 according to the third embodiment of the present invention.

As shown in FIG. 51, the image forming apparatus 1 includes a controller 10, an operating section 20, an engine section 30, a simplified authentication device 41, an authentication unit 42, and a recording medium 50. The controller 10 has the same reference number as in the first embodiment; however, the structure is different from the first embodiment. In addition, the operating section 20 has the same reference number as in the first embodiment; however, the structure is different from the first embodiment.

The controller 10 includes a network I/F 71, a ROM 72, an HDD 73, a user I/F 74, an I/F 75, a CPU 76, a RAM 77, a NV-RAM 78, an engine I/F 79, and a recording medium driving I/F 80. The above elements are connected with each other via a bus.

The network I/F 71, the ROM 72, the HDD 73, the user I/F 74, the CPU 76, the RAM 77, the NV-RAM 78, and the engine I/F 79 correspond to the network I/F 11, the ROM 12, then HDD 13, the user I/F 14, the CPU 15, the RAM 16, the NV-RAM 17, and the engine I/F 18, respectively. Therefore, the same description is omitted.

The I/F 75 receives/transmits data from/to the simplified authentication device 41 and/or the authentication unit 42.

The simplified authentication device 41 can be an external device which returns a simple signal such as ON/OFF by using a physical authentication device, for example, a key and a magnetic card as the authenticated result.

The authentication unit 42 can, be an external device which returns an authenticated result of a user by authenticating the user by using authentication such as fingerprint authentication and IC card authentication.

The recording medium driving I/F 80 drives the recording medium 50. For example, when the recording medium is a CD-ROM, the recording medium driving I/F 80 is a CD-ROM driver.

By the hardware structure shown in FIG. 51, the image forming apparatus 1 receives data, for example, an image forming request from the external device 2, for example, the computer 2a, by using the network I/F 11 via a network. In addition, the image forming apparatus 1 receives data input on the operating section 20 via the user I/F 74. The operating section 20 is described below in detail.

[Functional Structure]

Figure 52:
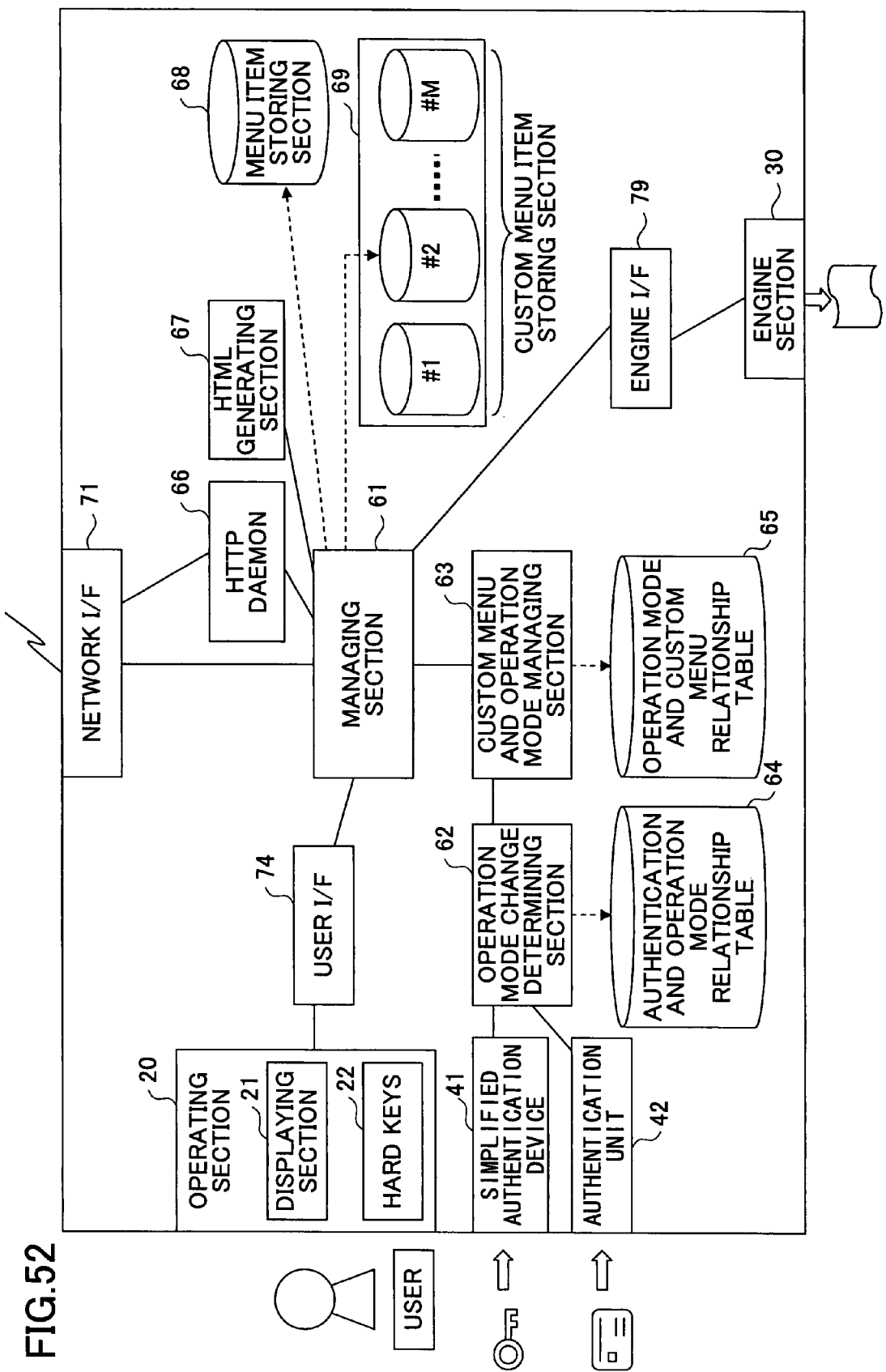
FIG. 52 is a diagram showing a functional structure of the image forming apparatus according to the third embodiment of the present invention.

Referring to FIG. 52, a functional structure of the image forming apparatus 1 is described. FIG. 52 is a diagram showing the functional structure of the image forming apparatus 1 according to the third embodiment of the present invention.

As shown in FIG. 52, the image forming apparatus 1 includes a managing section 61, an operation mode change determining section 62, a custom menu and operation mode managing section 63, an authentication and operation mode relationship table 64, an operation mode and custom menu relationship table 65, an HTTP daemon 66, an HTML generating section 67, a menu item storing section 68, and custom menu item storing sections 69.

A user operates the image forming apparatus 1 on the operating section 20. In addition, the user accesses the image forming apparatus 1 via the simplified authentication device 41 or the authentication unit 42. The operating section 20, connected to the user I/F 74, controls and manages the image forming apparatus 1.

The managing section 61 manages all elements in the image forming apparatus 1. The network I/F 71 connected to an external device (not shown) is connected to the engine section 30 via the engine I/F 79. The engine section 30 has a mechanism to form an image. The managing section 61 manages processes of receiving print data via the network I/F 71, forming an image from the print data, and printing the image on a recording medium (paper).

Figure 54:
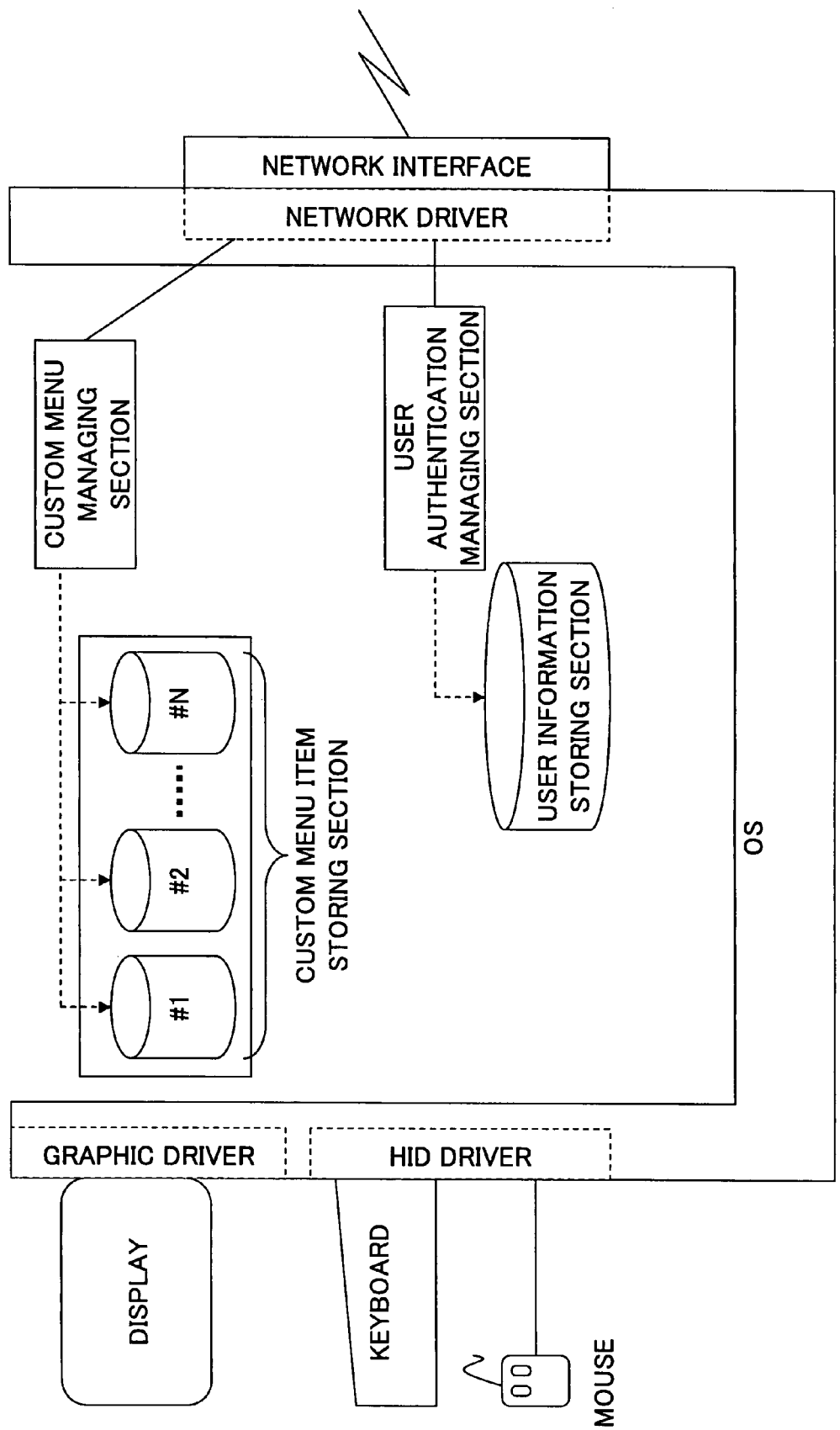
FIG. 54 is a diagram showing the functional structure of a server according to the third embodiment of the present invention.

In addition, the managing section 61 accesses the menu item storing section 68 and the custom menu item storing sections 69. The custom menu item storing section 69 includes plural custom menu item groups #1 through #M. The managing section 61 accesses selected one of the custom menu item groups #1 through #M, and manages the selected one of the custom menu item groups #1 through #M via the operating section 20. The selection of the custom menu item groups is described below. In FIG. 52, the image forming apparatus 1 includes the custom menu storing section 69. However, as shown in FIG. 54, the server 3 can include the custom menu storing section 69.

The image forming apparatus 1 can display information on the external device 2 (computer 2a) connected via the network I/F 71 by using HTTP and a Web browser, and the external device 2 can instruct the image forming apparatus 1.

In order to realize the above function, the managing section 61 receives an HTTP request via the HTTP daemon 66 from the external device 2 and accesses the menu item storing section 68 and the custom menu item storing section 69 corresponding to the received HTTP request. Then the managing section 61 sends the accessed result to the HTML generating section 67 and the HTML generating section 67 generates HTML and bitmap data necessary to be displayed on the external device 2. The generated data are transmitted to the external device 2 via the HTTP daemon 66 and the network I/F 71.

The operation mode change determining section 62 is connected to the simplified authentication device 41 or the authentication unit 42, and outputs operation mode change information. The custom menu and operation mode managing section 63 selects one of the custom menu item groups #1 through #M in the custom menu item storing section 69 based on the operation mode change information output from the operation mode change determining section 62 by referring to the operation mode and custom menu relationship table 65, and reports the selection to the managing section 61.

The authentication unit 42 sends an authentication ID which uniquely determines a user when the user is authenticated to the operation mode change determining section 62. The operation mode change determining section 62 relates the authentication ID with the operation mode by referring to the authentication and operation mode relationship table 64.

Information storing in the menu item storing section 68 and the custom menu item storing sections 69 is described below in detail in a menu tree and custom menu items. In addition, contents of the authentication and operation mode relationship table 64 and the operation mode and custom menu relationship table 65 are described below in detail.

[Functional Structure of External Device]

Figure 53:
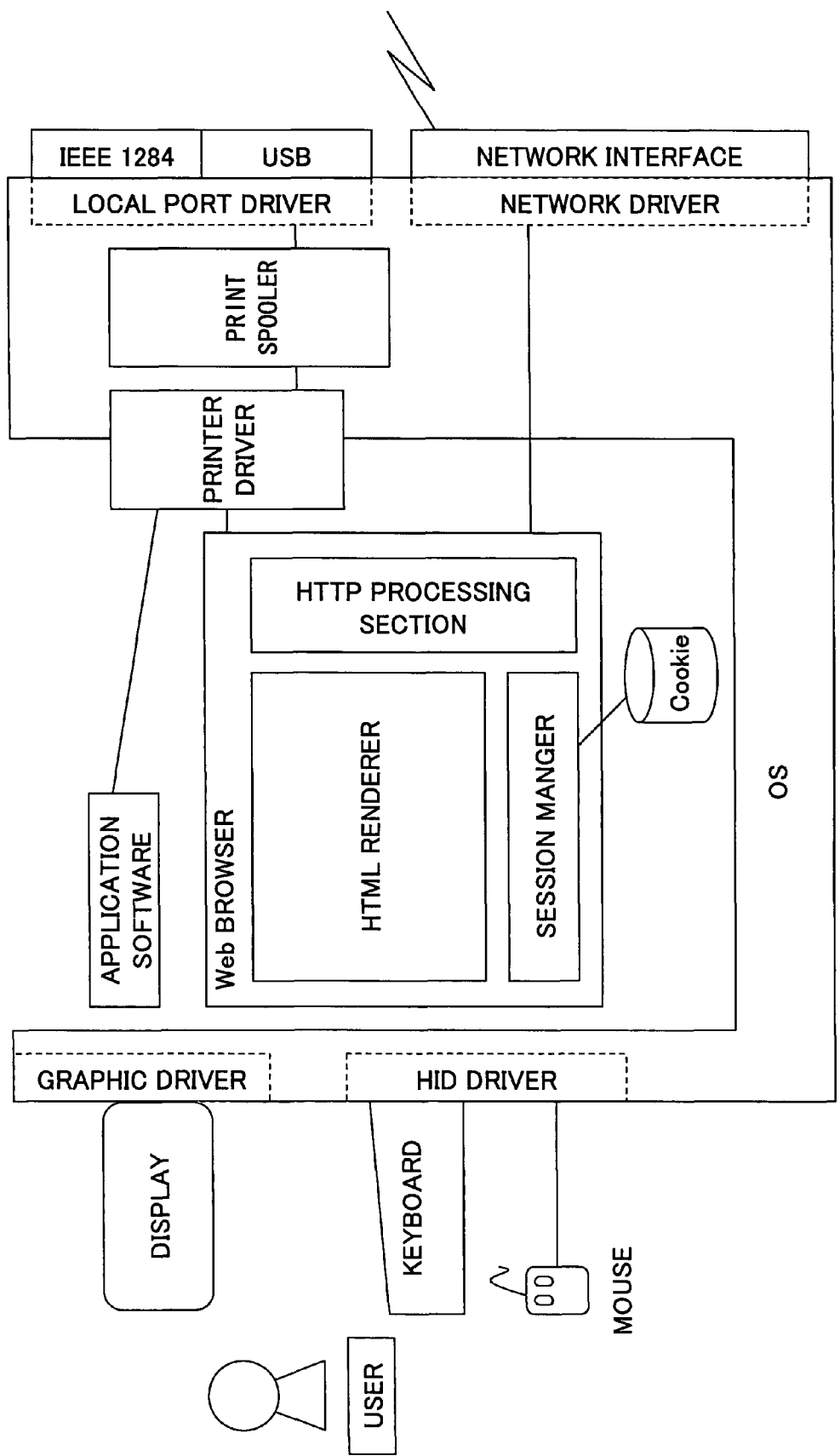
FIG. 53 is a diagram showing a functional structure of a computer according to the third embodiment of the present invention.

Next, referring to FIG. 53, a functional structure of the external device 2 (computer 2a) is described. FIG. 53 is a diagram showing the functional structure of the computer 2a according to the third embodiment of the present invention.

The computer 2a including an OS (operating system) is an existing device; therefore, the functional structure of the computer 2a is briefly described.

The user accesses the computer 2a via an operating unit, for example, a display, a keyboard, and a mouse. The keyboard and the mouse are driven by an HID (human interface devices) driver and controlled by the OS.

On the OS, many pieces of application software are operated. When a user requests to print an image, the application software drives the driver and generates image data suitable to form the image. The generated image data are temporarily stored in a print spooler and are transmitted to the image forming apparatus 1 via a local port driver or a network driver.

The Web browser is a piece of application software and mainly accesses information on WWW by the Internet by using HTTP. The image forming apparatus 1 displays information on the computer 2a by using HTTP, and instructs the computer 2a to operate. At this time, the Web browser is used.

When the computer 2a accesses the image forming apparatus 1 by using the Web browser, the HTTP processing section issues an HTTP request and the issued HTTP request is transmitted to the image forming apparatus 1 via a network interface. The image forming apparatus 1 interprets the HTTP request and generates HTML and bitmap data and transmits the HTML and the bitmap data to the computer 2a by using HTTP. The Web browser interprets the HTML and the bitmap data and displays the interpreted result.

The Web browser stores specific information by a request from the image forming apparatus 1. The specific information is called a Cookie. A session managing section in the Web browser manages Cookies.

[Functional Structure of Server]

Next, referring to FIG. 54, a functional structure of the server 3 is described. FIG. 54 is a diagram showing the functional structure of the server 3 according to the third embodiment of the present invention.

The server 3 including an OS is an existing device; therefore, the functional structure of the server 3 is briefly described.

The server 3 is a computer similar to the computer 2a. Operation units such as a display, a keyboard, and a mouse; the OS, a network driver, a network interface are similar to those in the computer 2a shown in FIG. 53. However, generally, a general user does not directly access the server 3.

When the server 3 receives a request to register/refer to/delete a menu item from the computer 2a via a network, a custom menu managing section receives the request. The custom menu managing section registers a menu item in a custom menu item storing section, or refers to/deletes a menu item stored in the custom menu item storing section in response to the request. As described above, the custom menu item storing section can be included in the server 3.

In addition, the server 3 can authenticate a user. When the server 3 receives a request to authenticate a user from the computer 2a via a network, a user authentication managing section receives the request. The user authentication managing section refers to user information stored in a user information storing section, collates the user information in the request with the user information stored in the user information storing section, and outputs an authenticated result to the computer 2a via the network. In the collation, for example, a user ID and a user password are collated.

[Screen on Computer]

Figure 55:
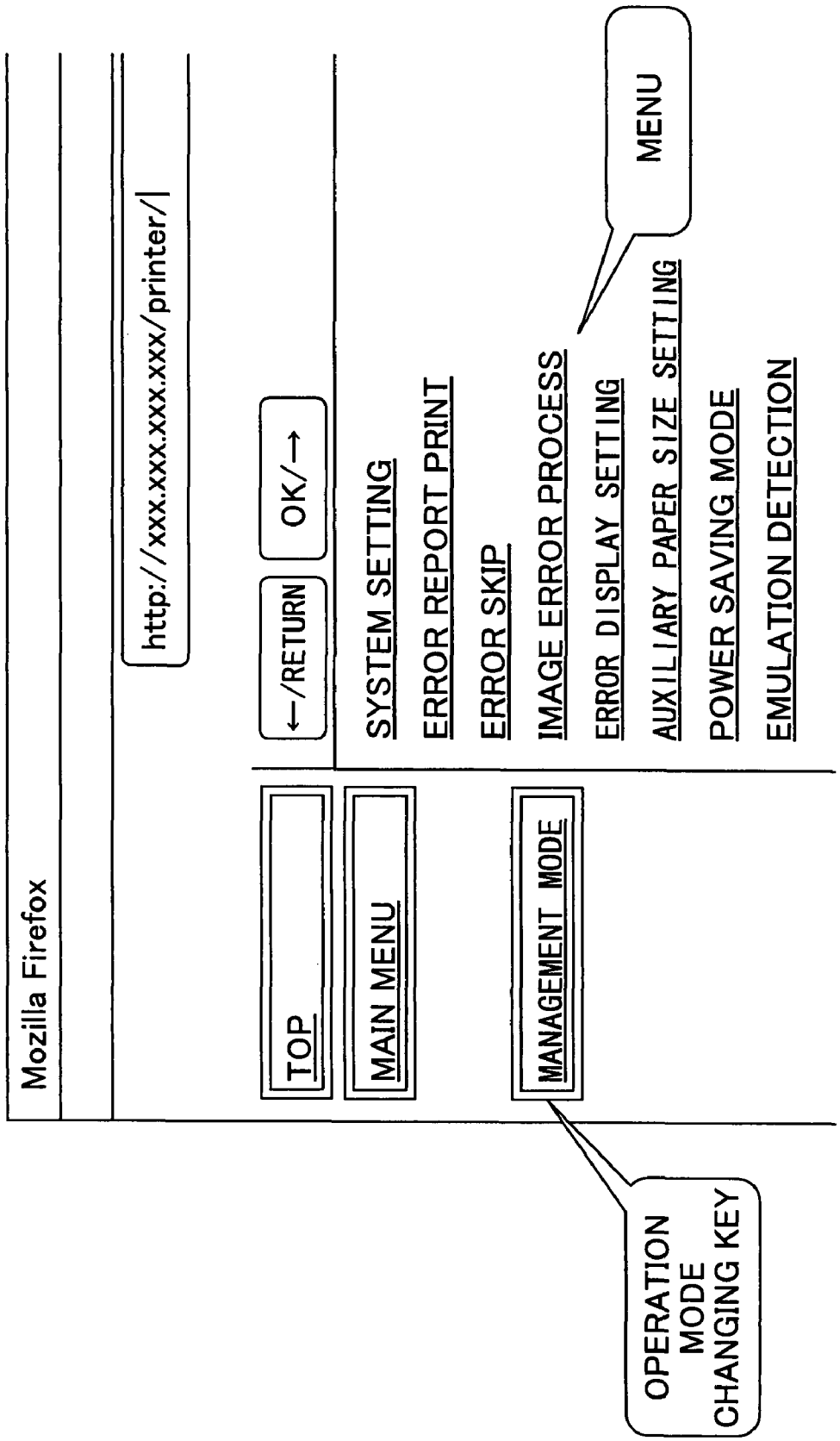
FIG. 55 is a diagram showing a screen on the computer when the computer accesses the image forming apparatus by using a Web browser according to the third embodiment of the present invention.

Referring to FIG. 55, a screen on the computer 2a is described when the computer 2a accesses the image forming apparatus 1 by using a Web browser. FIG. 55 is a diagram showing a screen on the computer 2a when the computer 2a accesses the image forming apparatus 1 by using a Web browser.

On the screen, an HTML image formed by the HTML generating section 67 of the image forming apparatus 1 is displayed by using a Web browser. The managing section 61 forms a menu by accessing the menu item storing section 68 and the custom menu item storing section 69, and the menu is mainly displayed on the screen. The left side of the screen is called a Sidebar, and items for specific operations are provided in the Sidebar regardless of the current operation. For example, when a user desires to link the top of a menu tree, the user pushes "TOP".

In FIG. 55, a user executes an operation mode change by using "MANAGEMENT MODE". However, "MANAGEMENT MODE" is one example for changing the operation mode.

[Operating Section]

Figure 56:
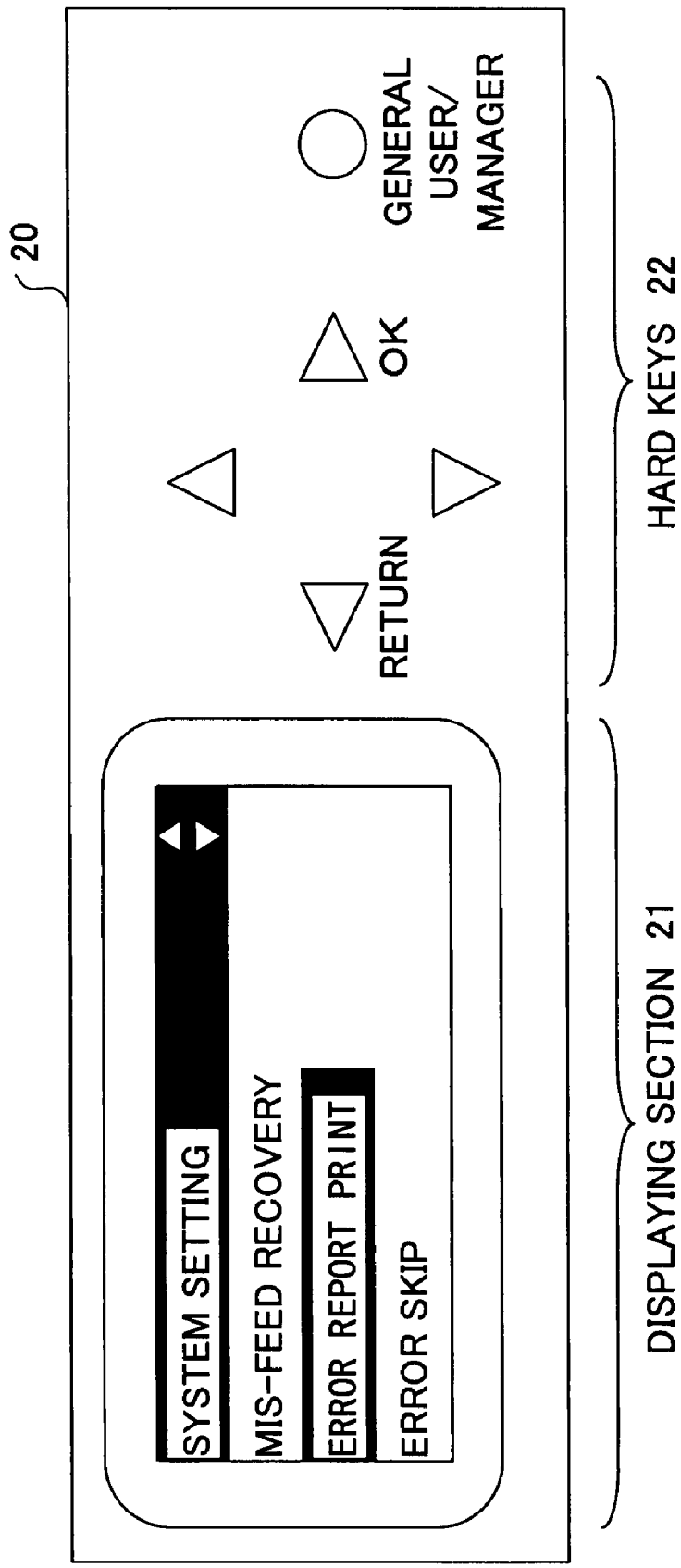
FIG. 56 is a diagram showing an operating section of the image forming apparatus according to the third embodiment of the present invention.

Referring to FIG. 56, the operating section 20 of the image forming apparatus 1 according to the third embodiment of the present invention is described. FIG. 56 is a diagram showing the operating section 20 of the image forming apparatus 1 according to the third embodiment of the present invention.

As shown in FIG. 56, the operating section 20 includes a displaying section 21 and hard keys 22.

The displaying section 21 is formed of, for example, an LCD (liquid crystal panel). As the displaying ability of the LCD, there are, for example, a 1-byte letter string displaying ability (JIS X0201), a 2-byte letter string displaying ability (JIS X0208), and a graphical image displaying ability. In the third embodiment of the present invention, an LCD having 4 lines of 2-byte letter string displaying ability is used.

A user, for example, selects and inputs a menu item by using the hard keys 22. In the third embodiment of the present invention, as the hard keys 22, arrow keys are simply used. In addition, as shown at the right side of the arrow keys, a "GENERAL USER/MANAGER" key can be included for changing the operation mode.

[Menu Tree and Custom Menu Items]

Figure 57:
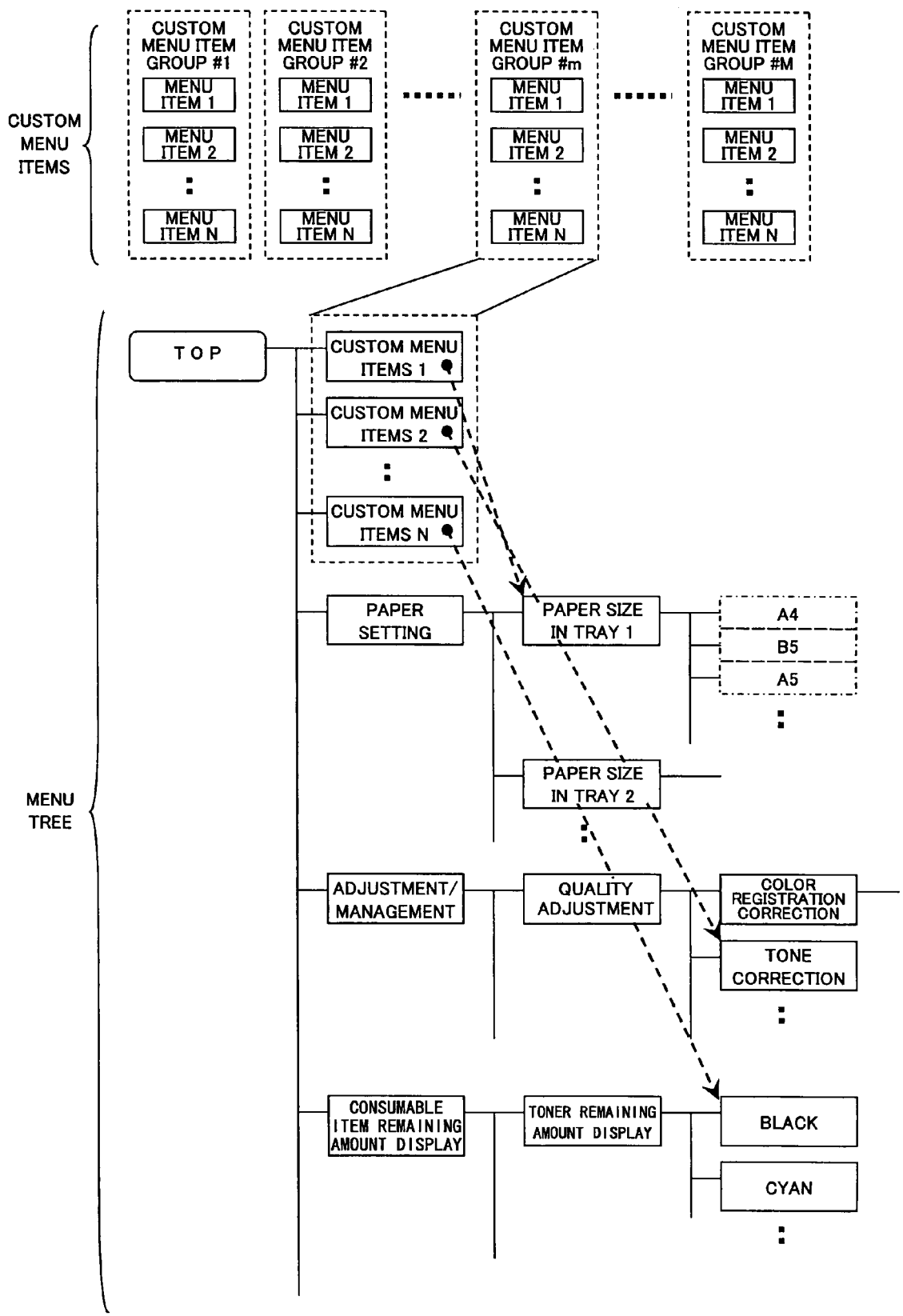
FIG. 57 is a diagram showing a menu tree and custom menu items according to the third embodiment of the present invention.

Next, referring to FIG. 57, a menu tree and custom menu items according to the third embodiment of the present invention are described. FIG. 57 is a diagram showing the menu tree and the custom menu items according to the third embodiment of the present invention. In FIG. 57, the custom menu item storing section 69 stores custom menu items #1 through #M in which menu items are stored as custom menu items, and the menu item storing section 68 stores menu items to be stored in the custom menu items #1 through #M and the menu tree.

As shown in FIG. 57, menu items are categorized into a layered structure (tree structure). In FIG. 57, the tree structure is a single tree structure. In the single tree structure, one menu item is disposed in an upper layer, plural menu items are disposed in a lower layer of the one menu item disposed in the upper layer, and an end menu item is uniquely determined. That is, a menu item does not exist multiple times in the upper layer, and when the tree structure is traced from an upper layer to a lower layer, a menu item disposed in the upper layer does not exist in the lower layer. In FIG. 57, the tree structure always expands from the left side to the right side.

As described above, the tree structure is stored in the menu item storing section 68. In the following, moving from the left to the right on the tree structure is called "layer descent" and moving from the right to the left on the tree structure is called "layer ascension". In addition, as described above, since a menu item "paper setting" has a menu item "paper size in tray 1" in the lower layer, the menu item "paper setting" is called a "branch type".

The tree structure shown in FIG. 57 can be simplified or made complicated depending on a need of the user.

In the tree structure shown in FIG. 57, an item, for example, in the custom menu items #m is disposed at the right under position of "TOP". That is, each custom menu item is linked in the tree structure, and the custom menu items are a set of the links.

The menu item storing section 68 and the custom menu item storing section 69 are, for example, the HDD 73; however, they can be a recording medium such as an SD memory card. Or the menu item storing section 68 and the custom menu item storing section 69 can be the custom menu item storing section in the server 3.

In the image forming apparatus 1 of the third embodiment of the present invention, the custom menu item storing section 69 stores the plural custom menu item groups #1 through #M each of which stores plural menu items 1 through N. One of the plural custom menu item groups #1 through #M is selected and the selected one is disposed under the top of the menu tree. The selecting method is described below in which one of the plural custom menu item groups #1 through #M is selected.

[Authentication and Operation Mode Relationship Table]

Next, referring to FIG. 58, the authentication and operation mode relationship table 64 according to the third embodiment of the present invention is described. FIG. 58 is a diagram showing the authentication and operation mode relationship table 64 according to the third embodiment of the present invention.

As shown in FIG. 58, an authentication ID of a user and an operation mode are shown in the authentication and operation mode relationship table 64 by being related to each other. Plural authentication IDs are allocated to one operation mode, and one authentication ID does not have plural operation modes.

[Operation Mode and Custom Menu Relationship Table]

Figure 59:
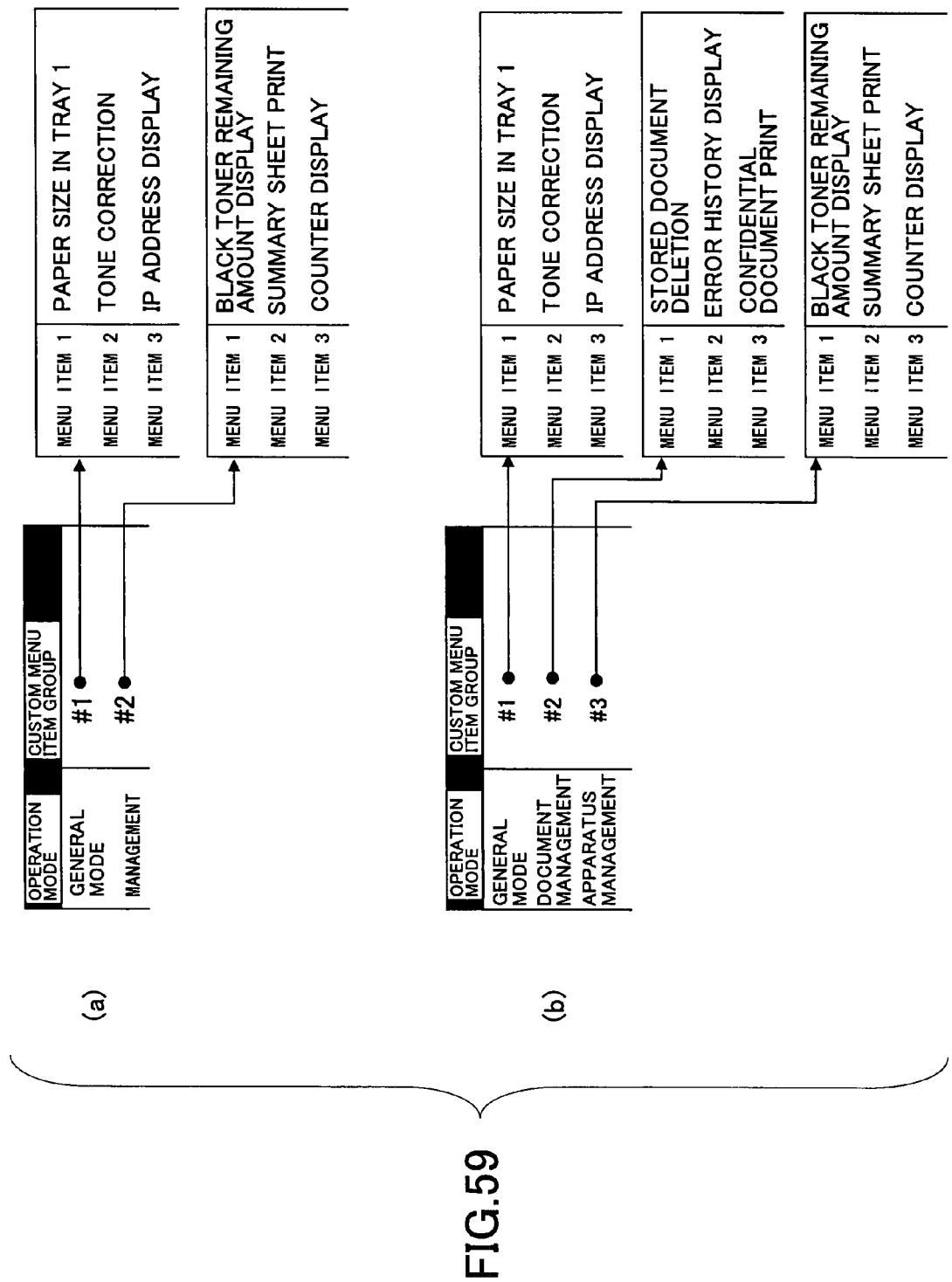
FIG. 59 is a diagram showing an operation mode and custom menu relationship table according to the third embodiment of the present invention.

Next, referring to FIG. 59, the operation mode and custom menu relationship table 65 according to the third embodiment of the present invention is described. FIG. 59 is a diagram showing the operation mode and custom menu relationship table 65 according to the third embodiment of the present invention.

As shown in FIG. 59, the operation mode and the custom menu item group are shown in the operation mode and custom menu relationship table 65 by being related to each other. In FIG. 59(*a*), a case where two operation modes exist is shown; that is, in the operation mode, two modes "GENERAL MODE" and "MANAGEMENT" are shown; and in the custom menu item group, the custom menu item group #1 is shown by being related to the operation mode "GENERAL MODE" and the custom menu group #2 is shown by being related to the operation mode "MANAGEMENT". In FIG. 59(*b*), a case where three operation modes exist is shown; that is, in the operation mode, three modes "GENERAL MODE", "DOCUMENT MANAGEMENT", and "APPARATUS MANAGEMENT" are shown, and in the custom menu item group, the custom menu item group #1 is shown by being related to the operation mode "GENERAL MODE", the custom menu group #2 is shown by being related to the operation mode "DOCUMENT MANAGEMENT", and the custom menu group #3 is shown by being related to the operation mode "APPARATUS MANAGEMENT".

[First Processes in Third Embodiment]

Figure 60:
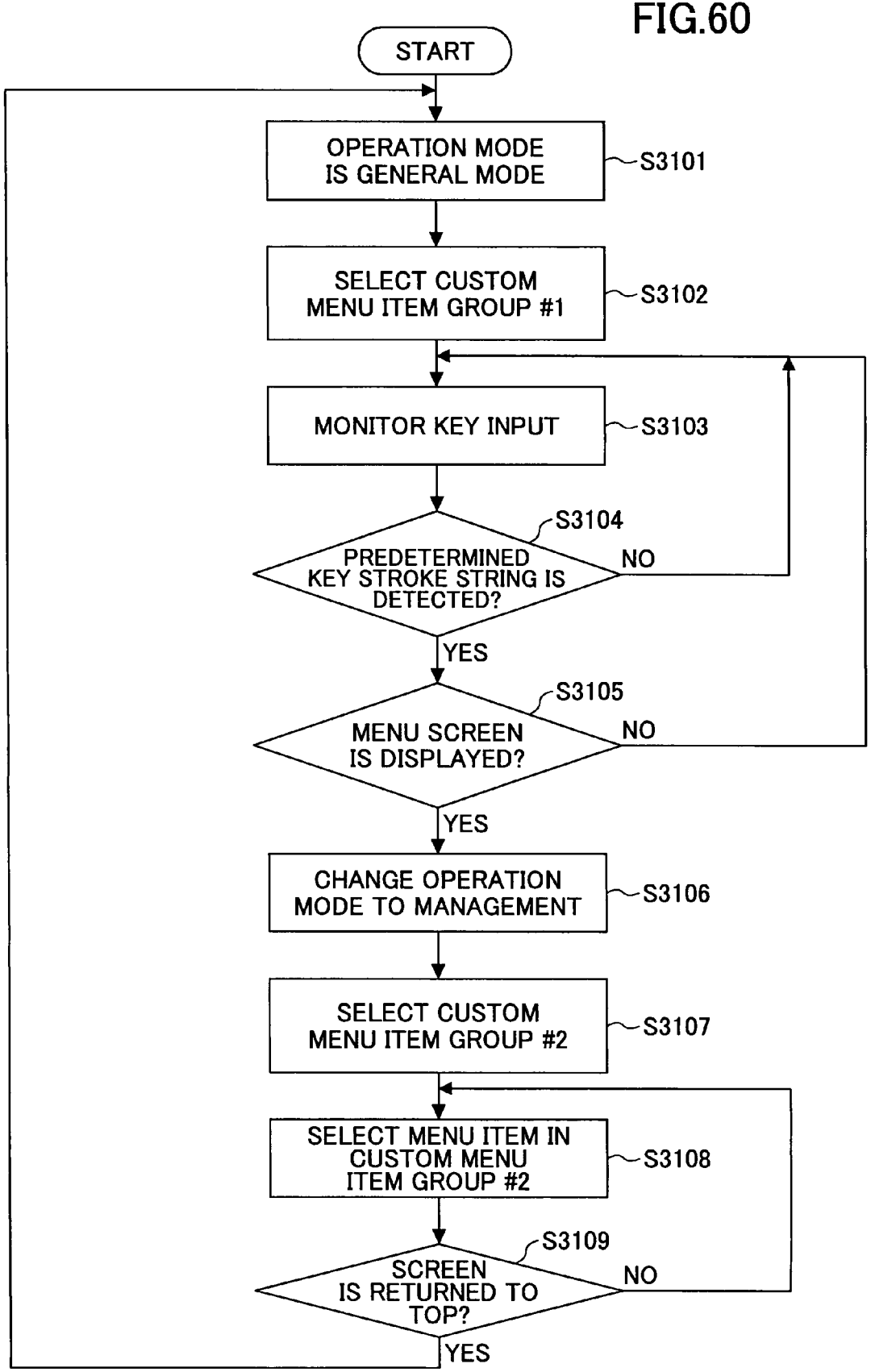
FIG. 60 is a flowchart showing first processes in the image forming apparatus according to the third embodiment of the present invention.

Referring to FIGS. 51 through 60, first processes in the image forming apparatus 1 according to the third embodiment of the present invention are described. FIG. 60 is a flowchart showing the first processes in the image forming apparatus 1 according to the third embodiment of the present invention.

In the first processes shown in FIG. 60, an operation mode is changed by using a special key on the operating section 20 of the image forming apparatus 1. In this, the operation mode is changed by the special key (general user/manager key) on the operating section 20 in the image forming apparatus 1, and one of the custom menu item groups #1 through #M is selected. In the first processes, it is assumed that information in the operation mode and custom menu relationship table 65 is information shown in FIG. 59(*a*). That is, the operation modes are two modes "GENERAL MODE" and "MANAGEMENT".

First, the operation mode is initially set as "GENERAL MODE" (S3101). The custom menu and operation mode managing section 63 selects the custom menu item group #1 by using the operation mode and custom menu relationship table 65 (S3102). The operation mode change determining section 62 monitors a key input on the operating section 20 via the user I/F 74 (S3103).

The operation mode change determining section 62 determines whether a predetermined key stroke string is detected (S3104). The predetermined key stroke string can be a simple key sequence, for example, pushing the arrow keys in a predetermined order, simultaneously pushing some keys, or pushing a predetermined key for a predetermined period, for example, when the operation mode is changed.

When a predetermined key stroke string is detected (YES in S3104), the managing section 61 determines whether a menu screen is displayed (S3105). When a menu screen is displayed (YES in S3105), the managing section 61 changes the operation mode from the general mode to the management mode (S3106). The custom menu and operation mode managing section 63 selects the custom menu item group #2 by using the operation mode and custom menu relationship table 65 (S3107). The user selects a menu item in the custom menu item group #2 (S3108). Then the managing section 61 determines whether the screen is returned to the top (S3109). When the menu tree is returned to the top (YES in S3109), the process returns to S3101. When the screen is not returned to the top (NO in S3109), the process returns to S3108.

When a predetermined key stroke string is not detected (NO in S3104), the process returns to S3103. When a menu screen is not displayed (NO in S3105), the process returns to S3103.

As described above, when a user executes special key processes, the operation mode is changed and a menu item is selected.

As described above, according to the first processes in the third embodiment of the present invention, a user can suitably select a custom menu item based on the operation mode of the user. In addition, when the operation mode is desired to be changed, the user can easily change the operation mode In the first processes of the third embodiment of the present invention, the operation mode is changed by the special key processes of the user. However, the operation mode can be changed by providing a special hard key which is used only for changing the operation mode, or by using a physical simplified authentication unit such as a switch which can be ON/OFF by a key. Further, a predetermined password is input on the operating section 20, when the input password is determined as effective by the operation mode change determining section 62, the operation mode is changed to the management mode. This is also possible.

[Second Processes in Third Embodiment]

Figure 61:
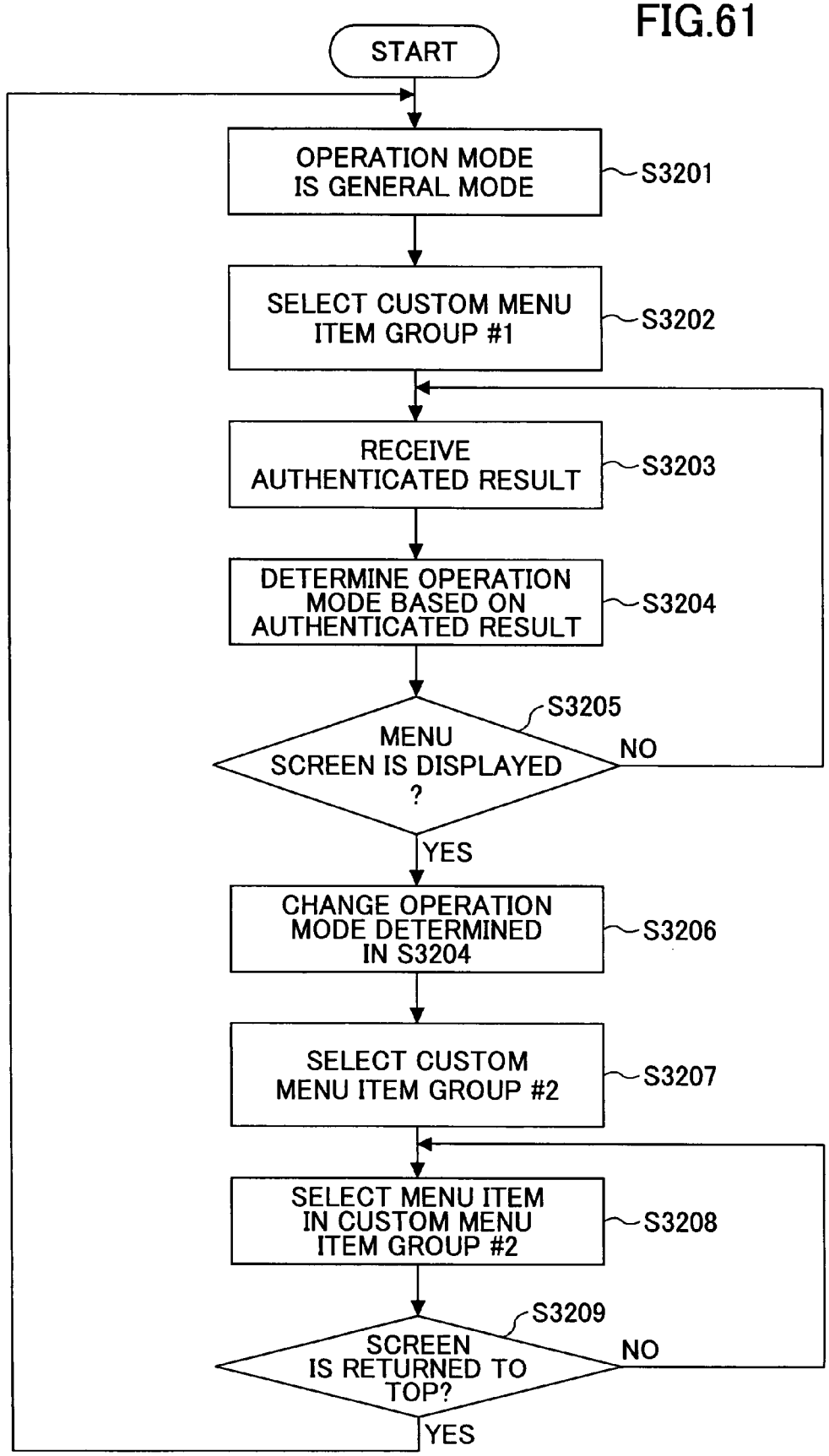
FIG. 61 is a flowchart showing second processes in the image forming apparatus according to the third embodiment of the present invention.

Referring to FIGS. 51 through 59, and 61, second processes in the image forming apparatus 1 according to the third embodiment of the present invention are described. FIG. 61 is a flowchart showing the second processes in the image forming apparatus 1 according to the third embodiment of the present invention.

In the second processes shown in FIG. 61, an operation mode is changed based on the user authentication by the authentication unit 42 of the image forming apparatus 1 and one of the custom menu item groups #1 through #M is selected. In the second processes, it is assumed that information in the operation mode and custom menu relationship table 65 is information shown in FIG. 59(b) and information in the authentication and operation mode relationship table 64 is information shown in FIG. 58. That is, the operation modes are three modes "GENERAL MODE", "DOCUMENT MANAGEMENT", and "APPARATUS MANAGEMENT".

First, the operation mode is initially set as "GENERAL MODE" (S3201). The custom menu and operation mode managing section 63 selects the custom menu item group #1 by using the operation mode and custom menu relationship table 65 (S3202).

The operation mode change determining section 62 receives an authenticated result by the authentication unit 42 as an authentication ID (S3203). The authentication ID is an ID uniquely determined by, for example, a combination of a user ID and a password, an IC card, or an authentication method using, for example, a fingerprint of the user. The user does not need to recognize how the user is authenticated.

The operation mode change determining section 62 determines an operation mode by referring to the authentication and operation mode relationship table 64 based on the received authentication ID (S3204). For example, when the authentication ID is "taro", the operation mode "GENERAL MODE" is determined, and when the authentication ID is "jiro", the operation mode "DOCUMENT MANAGEMENT" is determined.

The managing section 61 determines whether a menu screen is displayed (S3205). When a menu screen is displayed (YES in S3205), the managing section 61 changes the operation mode to the operation mode determined in S3204 (S3206).

The custom menu and operation mode managing section 63 selects the custom menu item group #2 by using the operation mode and custom menu relationship table 65 when the authentication ID is "jiro" in S3204 (S3207). The user selects a menu item in the custom menu item group #2 (S3208). Then the managing section 61 determines whether the screen is returned to the top (S3209). When the screen is returned to the top (YES in S3209), the process returns to S3201. When the screen is not returned to the top (NO in S3209), the process returns to S3208.

When a menu screen is not displayed (NO in S3205), the process returns to S3203.

As described above, according to the second processes in the third embodiment of the present invention, the operation mode is changed based on the authenticated result of the user by the authentication unit 42 and a menu item is selected. Since only a user having a key or a magnetic card can change the operation mode, the security can be maintained in selection of a menu item.

[Third Processes in Third Embodiment]

Figure 62:
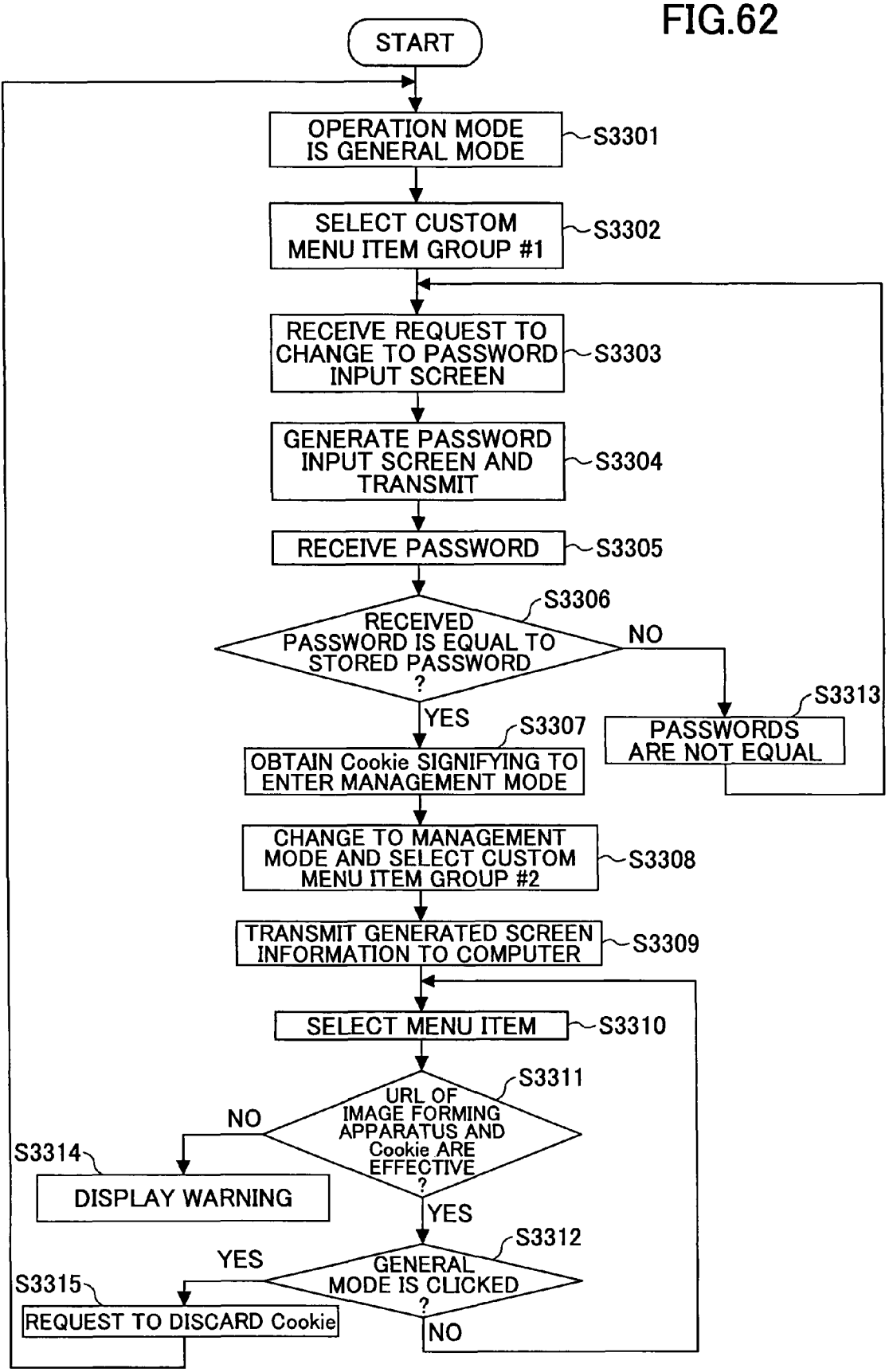
FIG. 62 is a flowchart showing third processes in the image forming apparatus according to the third embodiment of the present invention.

Referring to FIGS. 51 through 59, and 62 and 63, third processes in the image forming apparatus 1 according to the third embodiment of the present invention are described. FIG. 62 is a flowchart showing the third processes in the image forming apparatus 1 according to the third embodiment of the present invention. FIG. 63 is a diagram showing a screen change in the third processes.

In the third processes, an operation mode in the image forming apparatus 1 is changed by the computer 2a connected via a network by user operations such as a password input of a user by using a Web browser, and a menu item is selected as a custom menu item.

First, the operation mode is initially set as "GENERAL MODE" (S3301). The custom menu and operation mode managing section 63 selects the custom menu item group #1 by using the operation mode and custom menu relationship table 65 (S3302).

The managing section 61 receives a request in which a screen is changed to a password input screen from the computer 2a (S3303). In detail, the user pushes "MANAGEMENT MODE" on a screen of the computer 2a (FIG. 63(a)). In the screen on the computer 2a, "MANAGEMENT MODE" links to a password input screen. The computer 2a transmits a request for changing a screen to the password input screen to the image forming apparatus 1. The managing section 61 receives the request via the network I/F 71 and the HTTP daemon 68.

The managing section 61 generates the password input screen by HTML at the HTML generating section 67 and transmits the generated password input screen to the computer 2a (S3304). The Web browser of the computer 2a receives the password input screen and displays the password input screen (FIG. 63(b)).

The managing section 61 receives a password input from the computer 2a (S3305). In detail, the user inputs a password on the screen shown in FIG. 63(b) and pushes "OK". The computer 2a transmits a POST request to the image forming apparatus 1 based on the user input. The managing section 61 receives the input password.

The managing section 61 sends the received password to the operation mode change determining section 62. The operation mode change determining section 62 collates the received password with a password stored in a non-volatile memory, for example, the NV-RAM 78. The managing section 61 receives the collated result, and determines whether the received password is equal to the stored password (S3306).

When the received password is equal to the stored password (YES in S3306), the managing section 61 requests the Web browser of the computer 2a to obtain Cookie signifying to enter the management mode (S3307). The managing section 61 changes the mode to the management mode (S3308). In detail, the custom menu and operation mode managing section 63 selects the custom menu item group #2 by referring to the operation mode and custom menu relationship table 65. The managing section 61 enters the management mode based on the above selection. The managing section 61 makes the HTML generating section 67 generate screen information by HTML. The HTML generating section 67 generates the screen information by HTML by referring to the custom menu item group #2.

The managing section 61 transmits the generated screen information by HTML to the computer 2a (S3309). The computer 2a receives the screen information by HTML from the image forming apparatus 1 by using a Web browser (FIG. 63(c)). In this, the URL of the image forming apparatus 1 includes information that enters the management mode. With this, the current mode can be obtained from the URL.

Next, the user selects a menu item (S3310). It is determined whether the URL of the image forming apparatus 1 and the Cookie are effective (S3311). When the URL of the image forming apparatus 1 and the Cookie are effective (YES in S3311), the user clicks "GENERAL MODE" (S3312). When "GENERAL MODE" does not exist (NO in S3312), the process returns to S3310. When "GENERAL MODE" exists (YES in S3312), the user requests to discard the Cookie (S3315), and the process returns to S3301.

When the URL of the image forming apparatus 1 and the Cookie are not effective (NO in S3311), a warning is displayed due to a wrong operation (S3314).

In the processes S3310 through S3312, the image forming apparatus 1 continues to generate HTML information by the user operation on the computer 2a by using the Web browser. Since the user may change the URL, the Cookie is used together with the URL. When one of the URL and the Cookie is wrong, the warning is displayed, the Cookie is discarded, and the mode is changed to the general mode.

When the user clicks "GENERAL MODE", the Cookie is discarded and the mode is returned to "GENERAL MODE".

When the received password is not equal to the stored password (NO in S3306), a screen is displayed in which the passwords are not equal to each other (S3313), and the process returns to S3303. The managing section 61 makes the HTML generating section 67 generate a warning screen in which the passwords are not equal to each other and transmits the warning screen to the computer 2a. The computer 2a displays the warning screen by using the Web browser.

As described above, according to the third embodiment of the present invention, the user inputs information such as a password on the computer 2a connected to the image forming apparatus 1 via a network by using a Web browser. Then the user changes the operation mode of the image forming apparatus 1, and selects a menu item by using a Web browser. The mode can be arbitrarily changed by using the Web browser by managing the information in both the image forming apparatus 1 and the computer 2a. These processes are different from the processes on the operating section 20.

According to the third embodiment of the present invention, the user can select a suitable menu item depending on an operation using the image forming apparatus 1 by the user. In addition, the custom menu item groups #1 through #M can be used by plural users.

In addition, according to the third embodiment of the present invention, plural custom menu item groups #1 through #M are provided, plural operation modes capable of being changed are provided, and the operation mode and custom menu relationship table 65 are provided. Therefore, when an operation mode is selected depending on the position of a user, one of the custom menu item groups #1 through #M is automatically selected, and the user can easily select a menu item from the selected custom menu item group.

[Fourth Embodiment]

Next, referring to FIGS. 64 through 67, a fourth embodiment of the present invention is described.

In the sixth processes of the first embodiment of the present invention, when a new menu item is registered in a user custom menu table and a registration region for the new menu item does not exist, a menu item registered in a registration region is deleted which menu item is not used frequently. Then the new menu item is overwritten on the registration region where the menu item is deleted. In the fourth embodiment of the present invention, the menu item to be deleted is determined by the registered date, the number of used times, and the last used date. In addition, by using the number of used times, the number of used times in a predetermined period is calculated, that is, the used frequency in a predetermined period is calculated, and the used frequency is used.

In the fourth embodiment of the present invention, the network structure, the hardware structure, the functional structure, the menu tree and the menu items are the same those in the first embodiment. Therefore, the same description is omitted.

[User Custom Menu Table]

Figure 64:
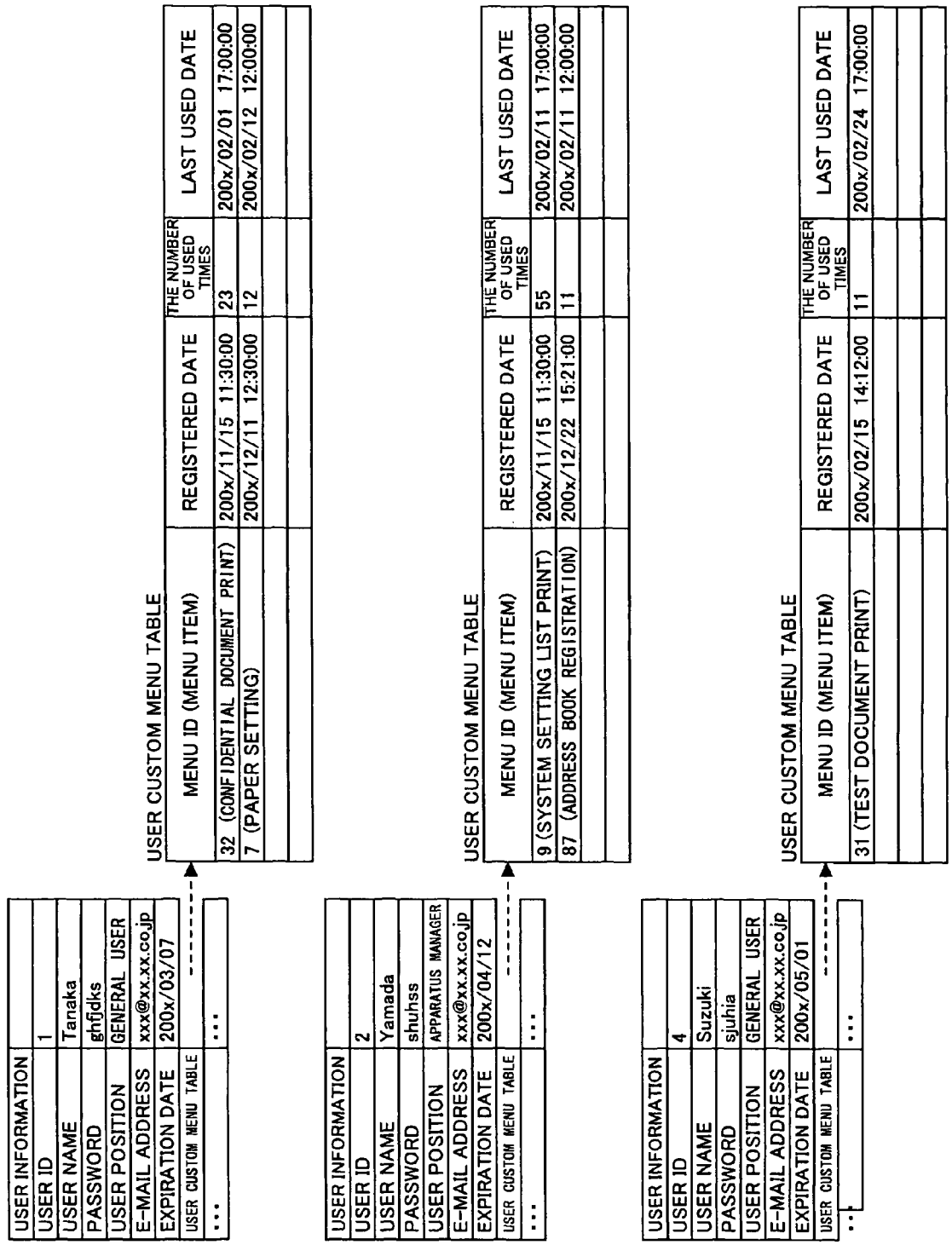
FIG. 64 is a diagram showing user custom menu tables according to a fourth embodiment of the present invention.

Referring to FIG. 64, user custom menu tables according to the fourth embodiment of the present invention are described. FIG. 64 is a diagram showing the user custom menu tables according to the fourth embodiment of the present invention. In FIG. 64, the user custom menu tables for corresponding individual users are stored in the user information storing section 184 (FIG. 3).

Similar to the user custom menu table as shown in FIG. 8 of the first embodiment of the present invention, the user custom menu table shown in FIG. 64 includes the menu ID (menu item) in the registration region. Further, the user custom menu table shown in FIG. 64 includes registration regions for registering the registered date including time, the number of used times, and the last used date including time. The registered date of a menu item is measured by a registered date measuring clock. The number of used times of the menu item is counted by a counting unit similar to the counter described in the first embodiment of the present invention. The last used date is measured by a date measuring unit.

[Individual User Custom Menu Table]

Referring to FIG. 65, an individual user custom menu table according to the fourth embodiment of the present invention is described. FIG. 65 is a diagram showing an individual user custom menu table according to the fourth embodiment of the present invention. The individual user custom menu table is stored in the user information storing section 184 (FIG. 3).

As shown in FIG. 65(a), in the individual user custom menu table, the menu ID and the menu item are connected to each other. In addition, as shown in FIG. 65(b), the individual user custom menu table can have an attribute region where an attribute for maintaining the security of the menu information is registered. When "MAINTAIN MENU INFORMATION" is "PRESENCE" in the attribute, the menu item is prevented from being overwritten.

[Processes in Fourth Embodiment]

Figure 66:
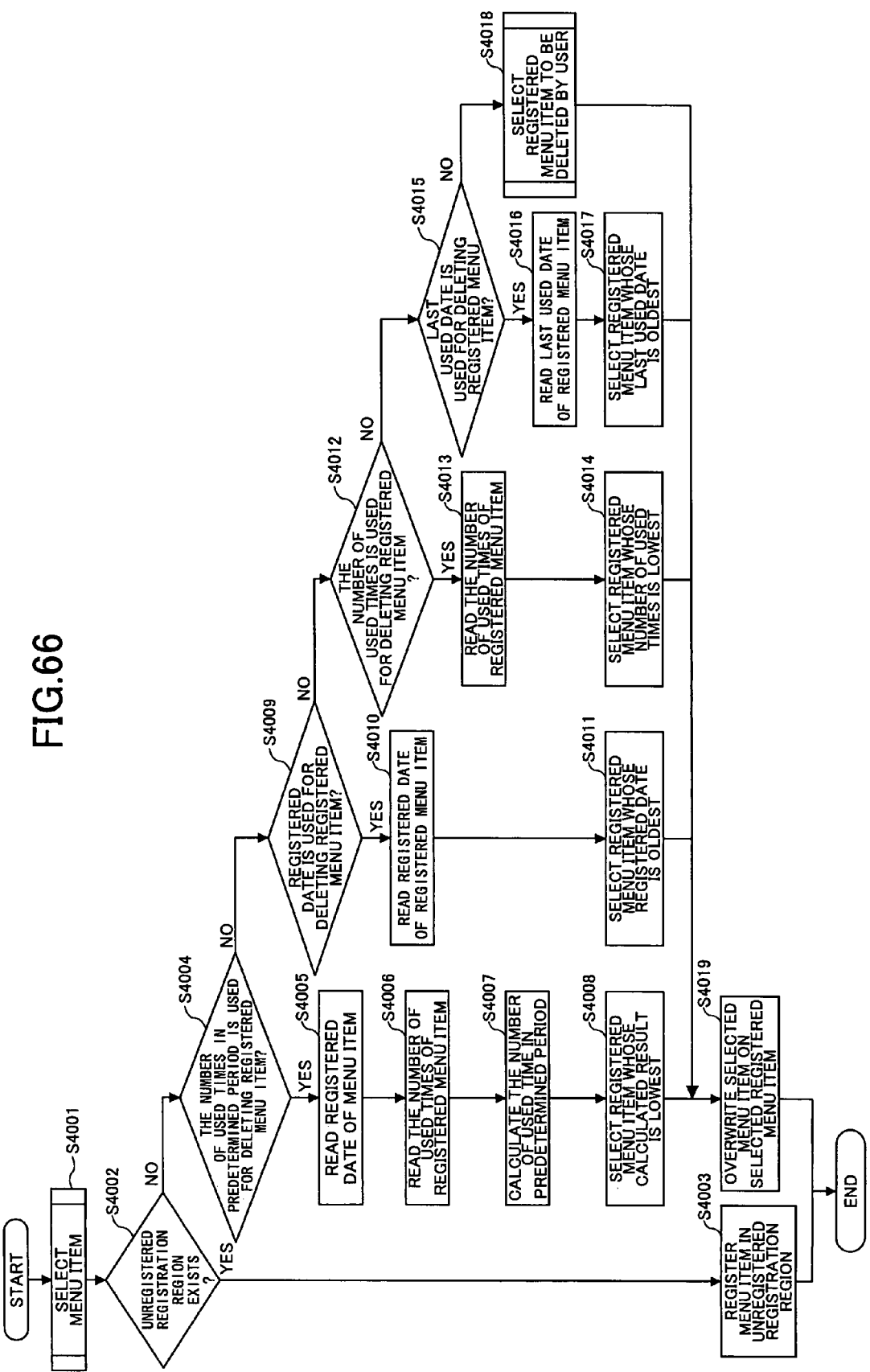
FIG. 66 is a flowchart showing processes in the image forming apparatus according to the fourth embodiment of the present invention.
Figure 67:
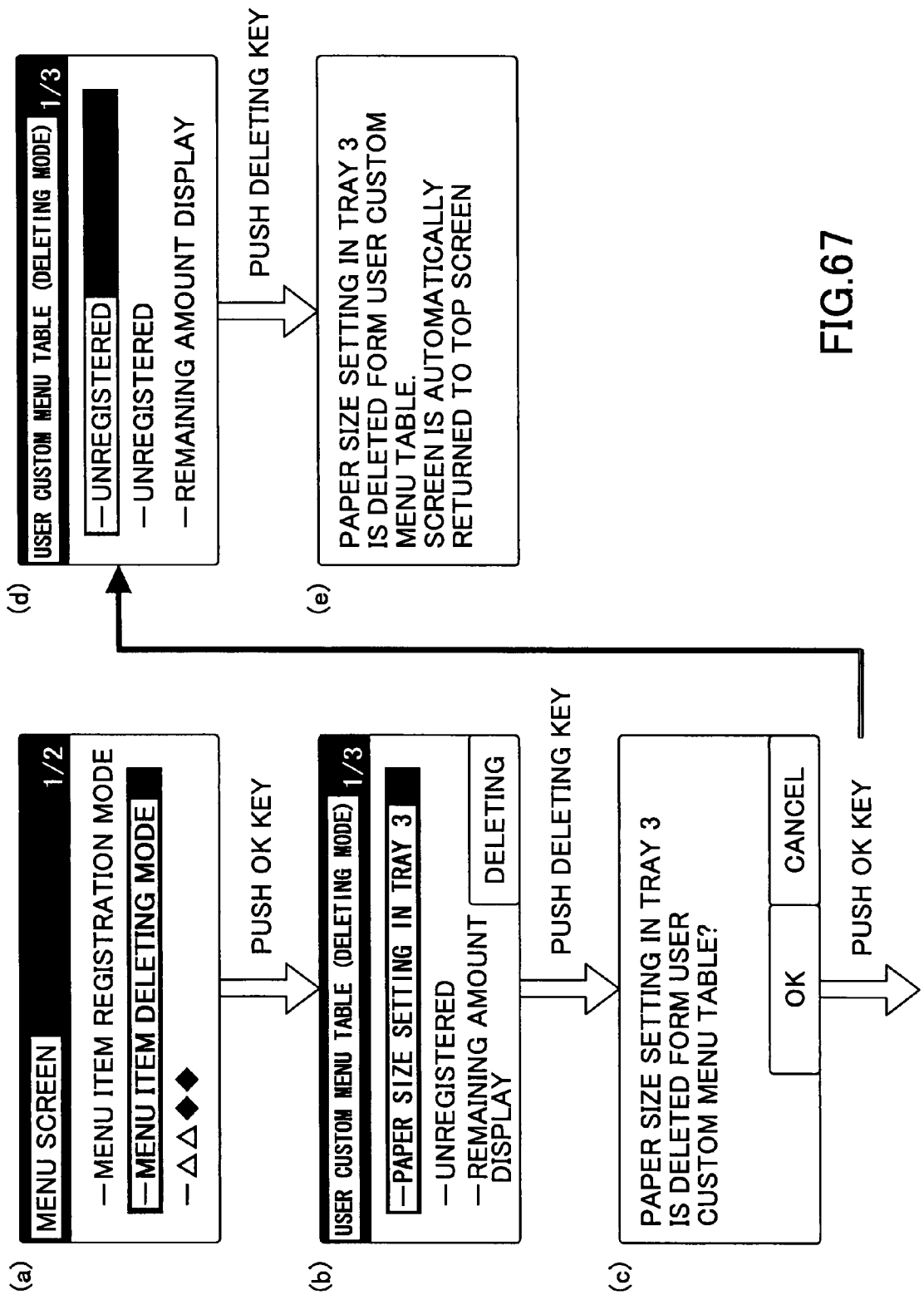
FIG. 67 is a diagram showing a screen change in the processes shown in FIG. 66.

Referring to FIGS. 3, 66, and 67, processes in the fourth embodiment of the present invention are described. FIG. 66 is a flowchart showing the processes in the image forming apparatus 1 according to the fourth embodiment of the present invention. FIG. 67 is a diagram showing a screen change in the processes.

As described above, when a new menu item cannot be registered in the individual user custom menu table due to no registration region for the new menu item, a menu item to be deleted is selected by using the number of used times in a predetermined period, the registered date, the number of used times, and the last used date. That is, a menu item whose number of used times in a predetermined period is lowest, whose registered date is oldest, whose number of used times is lowest, and whose last used date is oldest is selected. However, the menu item to be deleted can be selected any one or two of the above conditions.

First, a new menu item to be registered is selected (S4001). The operating section controller 120 receives information of the selected new menu item.

The user information managing section 170 determines whether an unregistered registration region exists (S4002). In detail, the user information managing section 170 determines whether an unregistered registration region exists by referring to the individual user custom menu table in the user information storing section 184.

When an unregistered registration region exists (YES in S4002), the new menu item is registered in the unregistered registration region (S4003). Then the processes end.

When an unregistered registration region does not exist (NO in S4002), it is determined whether a registered menu item to be deleted is determined by the number of used times of the registered menu item in a predetermined period (S4004). In the storing section 180, information of the number of used times of the registered menu item in a predetermined period is stored.

When a registered menu item to be deleted is determined by the number of used times of the registered menu item in a predetermined period (YES in S4004), the registered dates of the corresponding registered menu items are read from the storing section 180 (S4005).

Next, the number of used times of each registered menu item is read (S4006). Then, the number of used times of the registered menu item in a predetermined period is calculated for each registered menu item (S4007). In detail, the number of used times of the registered menu item is divided by the period from the first registered data to the present time. With this, the number of used times of the registered menu item in a predetermined period is calculated.

A registered menu item whose number of used times in a predetermined period is lowest is selected as a menu item to be deleted (S4008). Then, the new menu item is overwritten on the selected registered menu item to be deleted (S4019).

When a registered menu item to be deleted is not determined by the number of used times of the registered menu item in a predetermined period (NO in S4004), it is determined whether a registered menu item to be deleted is determined by the registered date of the registered menu item (S4009). The registered dates of the corresponding registered menu items have been stored in the storing section 180.

When a registered menu item to be deleted is determined by the registered date of the registered menu item (YES in S4009), the registered dates of the corresponding registered menu items are read (S4010). Then, a registered menu item whose registered date is oldest is selected as a registered menu item to be deleted (S4011). Then, the new menu item is overwritten on the selected registered menu item to be deleted (S4019).

When a registered menu item to be deleted is not determined by the registered date of the registered menu item (NO in S4009), it is determined whether a registered menu item to be deleted is determined by the number of used times of the registered menu item (S4012).

When a registered menu item to be deleted is determined by the number of used times of the registered menu item (YES in S4012), the number of used times of each registered menu item is read (S4013). A registered menu item whose number of used times is lowest is selected as a registered menu item to be deleted (S4014). Then, the new menu item is overwritten on the selected registered menu item to be deleted (S4019).

When a registered menu item to be deleted is not determined by the number of used times of the registered menu item (NO in S4012), it is determined whether a registered menu item to be deleted is determined by the last used date (S4015).

When a registered menu item to be deleted is determined by the last used date (YES in S4015), the last used dates of the corresponding registered menu items are read from the storing section 180 (S4016). Then a registered menu item whose last used date is oldest is selected as a registered menu item to be deleted (S4017). Then the new menu item is overwritten on the selected registered menu item to be deleted (S4019).

When a registered menu item to be deleted is not determined by the last used date (NO in S4015), the user selects a registered menu item to be deleted (S4018). Then the new menu item is overwritten on the selected registered menu item to be deleted (S4019).

As described above, in the processes of the fourth embodiment of the present invention, when a registration region for a new menu item does not exist, a registered menu item to be deleted is selected by the number of used times of the registered menu item in a predetermined period, the registered date of the registered menu item, the number of used times of the registered menu item, and/or the last used date of the registered menu item.

According to the fourth embodiment of the present invention, when a new menu item is registered in the individual user custom menu table and the storing section 180 does not have a free memory region for the new menu item, a registered menu item whose influence on the processes is least is selected as the registered menu item to be deleted, and the new menu item is overwritten on the selected registered menu item to be deleted. With this, the individual user custom menu table can be effectively formed in the limited memory region of the storing section 180.

In the fourth embodiment of the present invention, as described above, the four methods for selecting a registered menu item to be deleted are described. The user can select any one or more methods on the operating section 20 by the setting on the image forming apparatus 1.

In the fourth embodiment of the present invention, the processes are applied to the individual user custom menu table. The processes can be applied to the positional user custom menu table described in the first embodiment of the present invention. However, since the common user custom menu table is used in common among users, the processes are not applied to the common user custom menu table described in the first embodiment of the present invention.

However, when a user desires to register a new menu item in the common user custom menu table in no free region in the storing section 180, the user can register the new menu item on the operating section 20 by deleting a registered menu item. However, as described in FIG. 65(*b*), when "PRESENCE" of "MAINTAIN MENU INFORMATION" is in the attribute region, the menu item cannot be deleted.

[Screen Change]

Next, referring to FIG. 67, a screen change in the fourth embodiment of the present invention is described. In FIG. 67, the screen change in the process S4018 shown in FIG. 66 is described.

As shown in FIG. 67, a user can delete a registered menu item on a user custom menu table. In FIG. 67, for example, a registered menu item "PAPER SIZE SETTING IN TRAY 3" is deleted.

First, as shown in FIG. 67(*a*), in a menu screen, "MENU ITEM REGISTRATION MODE" and "MENU ITEM DELETING MODE" are displayed, and "MENU ITEM DELETING MODE" is highlighted. When the user pushes the OK key, as shown in FIG. 67(*b*), "USER CUSTOM MENU TABLE (DELETING MODE)" is displayed and "PAPER SIZE SETTING IN TRAY 3" is highlighted. When the use pushes the deleting key, as shown in FIG. 67(*c*), "PAPER SIZE SETTING IN TRAY 3 IS DELETED FROM USER CUSTOM MENU TABLE?" is displayed. When the user pushes the OK key, as shown in FIG. 67(*d*), in "USER CUSTOM MENU TABLE (DELETING MODE)", the registration region of "PAPER SIZE SETTING IN TRAY 3" is changed to "UNREGISTERED". When the user pushes the OK key, as shown in FIG. 67(*e*), "PAPER SIZE SETTING IN TRAY 3 IS DELETED FROM USER CUSTOM MENU TABLE. SCREEN IS RETURNED TO TOP SCREEN" is displayed.

Actually, as shown in FIG. 67(*b*), when "UNREGISTERED" exists, "PAPER SIZE SETTING IN TRAY 3" is not required to be deleted. However, in order to describe the processes, the screen change shown in FIG. 67 is used.

The processes in the fourth embodiment of the present invention can be applied to the third embodiment of the present invention. That is, a registered menu item can be deleted by an external device (the computer 2*a*) connected to the image forming apparatus 1 via a network.

In addition, as described in FIG. 65(*b*), when a menu item has the attribute "PRESENCE" of "MAINTAIN MENU INFORMATION", the menu item is not displayed on the screen of the custom menu deleting mode.

In addition, when the image forming apparatus 1 has a printing unit, the user custom menu table can be printed on a recording medium by an instruction of the user on the operating section 20. With this, the user can recognize the present set contents in the user custom menu table before changing the contents. In a case where the displaying ability of the screen has a limitation, when the user prints the contents of the user custom menu table, the user can recognize the contents of the user custom menu table, easily register a new menu item, and delete a registered menu item.

Further, the present invention is not limited to the specifically disclosed embodiments, and variations and modifications may be made without departing from the scope of the present invention.

The present invention is based on Japanese Priority Patent Application No. 2006-278083, filed on Oct. 11, 2006, with the Japanese Patent Office, the entire contents of which are hereby incorporated herein by reference.

What is claimed is:

1. An image forming apparatus, comprising:
a displaying unit which displays a number of menu items from a plurality of menu items on a screen, the display of the menu items corresponding to one layer of a plurality of layers from a hierarchical layer structure;
an inputting unit which selects a menu item from the menu items displayed on the screen by the displaying unit; and
a storing unit which registers the menu item selected by the input unit in at least one of a plurality of user custom menu tables associated with one or more users from a plurality of users, the menu item being registered by pushing a special key for longer than a set time period, the user custom menu tables having registration regions where a number of the menu items are stored;
a storing unit controller which controls writing data/reading data to/from the storing unit; and
a screen generating unit which generates the screen to be displayed by the displaying unit, wherein
the storing unit is configured to store a registered user table including user tables, each of the user tables being assigned to at least one of the plurality of the user custom menu tables corresponding to one or more of the users,
each of the user custom menu tables is registered as one of a plurality of information items included in each of the user tables,
if the special key is not pushed for longer than the set period of time, the display unit displays a menu item list corresponding to a layer lower than the one layer or a controller executes a process assigned to the menu item,
the storing unit controller registers the selected menu item in a registration region of the user custom menu table when the registration region is an unregistered registration region, if the menu item selected by the inputting unit is registered in the user custom menu table for each user, and
in a case where the menu item selected by the inputting unit is registered in the user custom menu table, when the unregistered registration region does not exist in the user custom menu table and the selected menu item is overwritten on a registration region where a menu item has been registered, the screen generating unit generates a screen which queries a user to select a registration region where a menu item has been registered as a registration region where the selected menu item is overwritten.

2. The image forming apparatus as claimed in claim 1, further comprising:
a counting unit which counts the number of used times of each menu item registered in the user custom menu table stored in the storing unit; wherein
the storing unit has a region where the number of used times of each menu item is stored;
in a case where the menu item selected by the inputting unit is registered in the user custom menu table, when the unregistered registration region does not exist in the user custom menu table and the selected menu item is overwritten on a registration region where a menu item has been registered,
the screen generating unit generates a screen which urges a user to select a registration region where a menu item whose number of used times is lowest has been registered as a registration region where the selected menu item is overwritten.

3. The image forming apparatus as claimed in claim 1, further comprising:
a registered date and time measuring unit which measures a registered date and time of each menu item registered in the user custom menu table stored in the storing unit; wherein
the storing unit has a region where the registered date and time of each menu item is stored;
in a case where the menu item selected by the inputting unit is registered in the user custom menu table, when the unregistered registration region does not exist in the user custom menu table and the selected menu item is overwritten on a registration region where a menu item has been registered,
the screen generating unit generates a screen which urges a user to select a registration region where a menu item whose registered date and time is oldest has been registered as a registration region where the selected menu item is overwritten.

4. The image forming apparatus as claimed in claim 1, further comprising:
a last used date and time measuring unit which measures a last used date and time of each menu item registered in the user custom menu table stored in the storing unit; wherein
the storing unit has a region where the last used date and time of each menu item is stored;
in a case where the menu item selected by the inputting unit is registered in the user custom menu table, when the unregistered registration region does not exist in the user custom menu table and the selected menu item is overwritten on a registration region where a menu item has been registered, the screen generating unit generates a screen which urges a user to select a registration region where a menu item whose last used date and time is oldest has been registered as a registration region where the selected menu item is overwritten.

5. The image forming apparatus as claimed in claim 1, further comprising:

a calculating unit which calculates the number of used times in a predetermined period of each menu item registered in the user custom menu table stored in the storing unit; wherein the storing unit has a region where the number of used times in a predetermined period of each menu item is stored;

in a case where the menu item selected by the inputting unit is registered in the user custom menu table, when the unregistered registration region does not exist in the user custom menu table and the selected menu item is overwritten on a registration region where a menu item has been registered, the screen generating unit generates a screen which urges a user to select a registration region where a menu item whose number of used times in a predetermined period is lowest has been registered as a registration region where the selected menu item is overwritten.

6. The image forming apparatus as claimed in claim 1, wherein:

when the menu items registered in the user custom menu table are displayed on the screen, the screen generating unit generates a screen where the menu items are displayed in a predetermined priority order.

7. The image forming apparatus as claimed in claim 2, wherein:

when the menu items registered in the user custom menu table are displayed on the screen, the screen generating unit generates a screen where the menu items are displayed in a priority order in which the higher the number of used times is, the higher on the screen the menu item is displayed.

8. The image forming apparatus as claimed in claim 3, wherein:

when the menu items registered in the user custom menu table are displayed on the screen, the screen generating unit generates a screen where the menu items are displayed in a priority order in which the newer the registered date and time is, the higher on the screen the menu item is displayed.

9. The image forming apparatus as claimed in claim 4, wherein:

when the menu items registered in the user custom menu table are displayed on the screen, the screen generating unit generates a screen where the menu items are displayed in a priority order in which the newer the last used date and time is, the higher on the screen the menu item is displayed.

10. The image forming apparatus as claimed in claim 5, wherein:

when the menu items registered in the user custom menu table are displayed on the screen, the screen generating unit generates a screen where the menu items are displayed in a priority order in which the higher the number of used times in a predetermined period is, the higher on the screen the menu item is displayed.

11. The image forming apparatus as claimed in claim 1, wherein:

when a menu item registered in the user custom menu table is an information displaying type menu item and the menu item is used;

the screen generating unit generates a screen where the contents of information of the menu item are displayed.

12. The image forming apparatus as claimed in claim 1, further comprising:

a controlling unit which controls the user custom menu table stored in the storing unit when a menu item is registered or the registered menu item is read based on user information received from an external device connected to the image forming apparatus via a network.

13. The image forming apparatus as claimed in claim 1, wherein:

the user custom menu table has an individual user custom menu table, a positional user custom menu table, and a common user custom menu table;

an individual user registers menu items in the individual user custom menu table and uses the registered menu items;

only specific users having corresponding specific positions in an organization register menu items in the positional user custom menu table and uses the registered menu items; and when the user custom menu table is used in common by all users, all the users register menu items in the common user custom menu table and use the registered menu items.

14. The image forming apparatus as claimed in claim 1, further comprising:

an output unit which outputs the menu item registered in the user custom menu table.

15. A control method in an image forming apparatus, comprising the steps of:

displaying a number of menu items from a plurality of menu items on a screen, the display of the menu items corresponding to one layer of a plurality of layers from a hierarchical layer structure;

selecting a menu item from the menu items displayed on the screen;

registering the selected menu item in a registration region of at least one of a plurality of user custom menu tables associated with one or more users from a plurality of users, the menu item being registered by pushing a special key for longer than a set time period, the user custom menu tables having registration regions where a number of the menu items are registered;

displaying a menu item list corresponding to a layer lower than the one layer or executing a process assigned to the menu item, if the special key is not pushed for longer than the set period of time;

selecting a menu item registered in the registration region of the user custom menu table; and executing a job of the selected menu item, wherein the registering stores a registered user table including user tables, each of the user tables being assigned to at least one of the plurality of users, each of the user tables is assigned to at least one of the plurality of the user custom menu tables corresponding to one or more of the users, each of the user custom menu tables is registered as one of a plurality of information items included in each of the user tables, the registering stores the menu item selected in a registration region of the user custom menu table when the registration region is an unregistered registration region, if the menu item selected is registered in the user custom menu table for each user, and in a case where the menu item selected is registered in the user custom menu table, when the unregistered registration region does not exist in the user custom menu table and the selected menu item is overwritten on a registration region where a menu item has been registered, the displaying displays a screen which queries a user to select a registration region where a menu item has been registered as a registration region where the selected menu item is overwritten.

16. The control method in the image forming apparatus, as claimed in claim 15, further comprising the steps of:

when the registration region where the selected menu item is registered is not an unregistered region in the user custom menu table for each user, selecting a registration region where a menu item whose number of used times is lowest is stored; and overwriting the selected menu item on the selected registration region; or selecting a registration region where a menu item whose registered date and time is oldest is stored; and overwriting the selected menu item on the selected registration region; or selecting a registration region where a menu item whose last used date and time is oldest is stored; and overwriting the selected menu item on the selected registration region; or selecting a registration region where a menu item whose number of used times in a predetermined period is lowest is stored; and overwriting the selected menu item on the selected registration region.

17. A non-transitory computer-readable recording medium storing a control program in an image forming apparatus, the control program includes the steps of:

displaying a number of menu items from a plurality of menu items on a screen, the display of the menu items corresponding to one layer of a plurality of layers from a hierarchical layer structure;

selecting a menu item from the menu items displayed on the screen;

registering the selected menu item in a registration region of at least one of a plurality of user custom menu tables associated with one or more users from a plurality of users, the menu item being registered by pushing a special key for longer than a set time period, the user custom menu tables having registration regions where a number of the menu items are registered;

displaying a menu item list corresponding to a layer lower than the one layer or executing a process assigned to the menu item, if the special key is not pushed for longer than the set period of time;

selecting a menu item registered in the registration region of the user custom menu table; and executing a job of the selected menu item, wherein the registering stores a registered user table including user tables, each of the user tables being assigned to at least one of the plurality of users, each of the user tables is assigned to at least one of the plurality of user custom menu tables corresponding to one or more of the users, each of the user custom menu tables is registered as one of a plurality of information items included in each of the user tables, the registering stores the menu item selected in a registration region of the user custom menu table when the registration region is an unregistered registration region, if the menu item selected is registered in the user custom menu table for each user, and in a case where the menu item selected is registered in the user custom menu table, when the unregistered registration region does not exist in the user custom menu table and the selected menu item is overwritten on a registration region where a menu item has been registered, the displaying displays a screen which queries a user to select a registration region where a menu item has been registered as a registration region where the selected menu item is overwritten.

18. The non-transitory computer-readable recording medium storing the control program in the image forming apparatus as claimed in claim 17, the control program further includes the steps of:

when the registration region where the selected menu item is registered is not an unregistered region in the user custom menu table for each user, selecting a registration region where a menu item whose number of used times is lowest is stored; and overwriting the selected menu item on the selected registration region; or selecting a registration region where a menu item whose registered date and time is oldest is stored; and overwriting the selected menu item on the selected registration region; or selecting a registration region where a menu item whose last used date and time is oldest is stored; and overwriting the selected menu item on the selected registration region; or selecting a registration region where a menu item whose number of used times in a predetermined period is lowest is stored; and overwriting the selected menu item on the selected registration region.

* * * * *